(12) United States Patent
Bhattacharyya et al.

(10) Patent No.: US 12,547,961 B2
(45) Date of Patent: Feb. 10, 2026

(54) DATA DRIVEN SYSTEMS AND METHODS FOR OPTIMIZATION OF A TARGET BUSINESS

(71) Applicant: Amplo Global Inc., Piscataway, NJ (US)

(72) Inventors: Anirban Bhattacharyya, Edison, NJ (US); Himanshu Misra, Tracy, CA (US); Navaneeth Seshadri, Piscataway, NJ (US); Pooja Soni, Piscataway, NJ (US); Sonia Banerjee, Piscataway, NJ (US); Srinivas Kancharla, Piscataway, NJ (US); Shilpa Singh, Piscataway, NJ (US)

(73) Assignee: Amplo Global Inc., Piscataway, NJ (US)

( * ) Notice: Subject to any disclaimer, the term of this patent is extended or adjusted under 35 U.S.C. 154(b) by 125 days.

(21) Appl. No.: 18/208,130

(22) Filed: Jun. 9, 2023

(65) Prior Publication Data

US 2023/0401513 A1    Dec. 14, 2023

Related U.S. Application Data

(62) Division of application No. 17/006,828, filed on Aug. 29, 2020, now Pat. No. 11,720,845.
(Continued)

(51) Int. Cl.
*G06Q 10/0637* (2023.01)
*G06F 16/334* (2025.01)
(Continued)

(52) U.S. Cl.
CPC ... *G06Q 10/06375* (2013.01); *G06F 16/3344* (2019.01); *G06F 40/279* (2020.01);
(Continued)

(58) Field of Classification Search
None
See application file for complete search history.

(56) References Cited

U.S. PATENT DOCUMENTS

| 5,890,133 A | 3/1999 | Ernst |
| 6,738,933 B2 | 5/2004 | Fraenkel et al. |

(Continued)

FOREIGN PATENT DOCUMENTS

| WO | WO-2004059555 A1 * | 7/2004 | ....... G06Q 10/06393 |
| WO | WO-2005103977 A2 * | 11/2005 | ............. G06Q 10/00 |

(Continued)

OTHER PUBLICATIONS

Jukka et al "Benchmarking Logistics Performance With an Application of the Analytic Hierarchy Process", Aug. 1996, IEEE Transaction on Engineering Management, vol. 43, No. 3, pp. 323-333. (Year: 1996).*

(Continued)

*Primary Examiner* — Romain Jeanty
(74) *Attorney, Agent, or Firm* — Morrison & Foerster LLP

(57) ABSTRACT

The present disclosure is directed to a system and associated methods for assessing, evaluating a target business, and leveraging insights from the assessment and evaluation to provide strategy recommendations to optimize the performance of the target business. In some embodiments, the system may identify a benchmark competitor and determine a performance score for the benchmark competitor. In some embodiments, the system may determine a domain score of an identified benchmark competitor. In some embodiments, the system determines an updated performance score based on provided capability process data. In some embodiments, the system recommends solutions and/or key performance indicators (KPI) to solve a provided problem. In some embodiments, the system provides a platform to enable (Continued)

stakeholders, (e.g., users) in the target business to perform a design thinking process.

20 Claims, 60 Drawing Sheets

Related U.S. Application Data

(60) Provisional application No. 62/894,400, filed on Aug. 30, 2019.

(51) Int. Cl.
| | | |
|---|---|---|
| G06F 40/279 | (2020.01) | |
| G06F 40/30 | (2020.01) | |
| G06N 5/02 | (2023.01) | |
| G06Q 10/0631 | (2023.01) | |
| G06Q 10/0639 | (2023.01) | |
| G06Q 10/067 | (2023.01) | |
| G06Q 10/101 | (2023.01) | |
| G06V 20/40 | (2022.01) | |
| G06V 40/16 | (2022.01) | |

(52) U.S. Cl.
CPC .............. *G06F 40/30* (2020.01); *G06N 5/02* (2013.01); *G06Q 10/063112* (2013.01); *G06Q 10/06393* (2013.01); *G06Q 10/06395* (2013.01); *G06Q 10/067* (2013.01); *G06Q 10/101* (2013.01); *G06Q 30/02015* (2025.08); *G06V 20/40* (2022.01); *G06V 40/174* (2022.01)

(56) References Cited

U.S. PATENT DOCUMENTS

| | | | | |
|---|---|---|---|---|
| 7,584,117 | B2* | 9/2009 | Bubner | G06Q 10/0637 |
| | | | | 705/7.36 |
| 8,065,410 | B1 | 11/2011 | Breen et al. | |
| 8,548,843 | B2* | 10/2013 | Folk | G06Q 10/06 |
| | | | | 705/7.41 |
| 8,781,881 | B2* | 7/2014 | Olives | G06Q 30/0201 |
| | | | | 705/7.38 |
| 11,720,845 | B2 | 8/2023 | Bhattacharyya et al. | |
| 2005/0021396 | A1* | 1/2005 | Pearch | G06Q 30/0273 |
| | | | | 705/14.69 |
| 2005/0091093 | A1 | 4/2005 | Bhaskaran et al. | |
| 2008/0183552 | A1* | 7/2008 | O'Hagan | G06Q 30/00 |
| | | | | 705/7.34 |
| 2009/0099902 | A1 | 4/2009 | Chatter et al. | |
| 2009/0228572 | A1 | 9/2009 | Wall et al. | |
| 2010/0095208 | A1 | 4/2010 | White et al. | |
| 2014/0297399 | A1* | 10/2014 | Douglas | G06Q 30/0201 |
| | | | | 705/14.42 |
| 2015/0332147 | A1 | 11/2015 | Anastas et al. | |
| 2018/0365590 | A1 | 12/2018 | Cucci | |
| 2019/0103102 | A1 | 4/2019 | Tseretopoulos | |

FOREIGN PATENT DOCUMENTS

| | | | | |
|---|---|---|---|---|
| WO | WO-2014193389 | A2 * | 12/2014 | ....... G06Q 10/06393 |
| WO | 2017180671 | A1 | 10/2017 | |
| WO | 2018085353 | A1 | 5/2018 | |

OTHER PUBLICATIONS

Final Office Action mailed Oct. 5, 2022, for U.S. Appl. No. 17/006,828, filed Aug. 29, 2020, nineteen pages.
International Preliminary Report on Patentability and Written Opinion mailed Mar. 10, 2022, for PCT Application No. PCTUS2020048656, nine pages.
International Search Report and Written Opinion mailed Oct. 16, 2020, for PCT Application No. PCT/US2020/048656, thirteen pages.
Mutabazi, Patrick. (Aug. 9, 2019). "How to Choose the Right key Performance Indicators (KPIs) for Your Business—Strategy", SmartCards and Technology Solutions Consulting—Innovation, Management & Technology, pp. 1-53 (Year: 2019).
Non-Final Office Action mailed Jun. 9, 2022, for U.S. Appl. No. 17/006,828, filled Aug. 29, 2020, ten pages.
Notice of Allowance malled Apr. 14, 2023, for U.S. Appl. No. 17/006,828, filed Aug. 29, 2020, ten pages.
Parker, John E. (Feb. 19, 2014). "KPIs for Agile Project Managers and Business Analysts", Powering Business Value, pp. 1-66. (Year: 2014).
Written Opinion dated Jan. 21, 2025, for Singapore Patent Application No. 11202201820U, 6 pages.
Indian Office Action dated Apr. 22, 2025, for IN Application numbered 202217011108, with English translation, seven pages.

* cited by examiner

| Name | Country | Overall | Teaching | Research | Citations | Industry_Income | International_Outlook |
|---|---|---|---|---|---|---|---|
| University of Oxford | United Kingdom | 95.4 | 90.5 | 99.6 | 98.4 | 65.5 | 96.4 |
| California Institute of Technology | United States | 94.5 | 92.1 | 97.2 | 97.9 | 88 | 82.5 |
| University of Cambridge | United Kingdom | 94.4 | 91.4 | 98.7 | 95.8 | 59.3 | 95 |
| Stanford University | United States | 94.3 | 92.8 | 96.4 | 99.9 | 66.2 | 79.5 |
| Massachusetts Institute of Technology | United States | 93.6 | 90.5 | 92.4 | 99.5 | 86.9 | 89 |
| Princeton University | United States | 93.2 | 90.3 | 96.3 | 98.8 | 58.6 | 81.1 |
| Harvard University | United States | 93 | 89.2 | 98.6 | 99.1 | 47.3 | 76.3 |
| Yale University | United States | 91.7 | 92 | 94.8 | 97.3 | 52.4 | 68.7 |
| University of Chicago | United States | 90.2 | 89.1 | 91.4 | 96.7 | 52.7 | 76 |
| Imperial College London | United Kingdom | 89.8 | 84.5 | 87.6 | 97 | 69.9 | 97.1 |
| University of Pennsylvania | United States | 89.6 | 87.5 | 90.4 | 98.2 | 74 | 65 |

What i liked was the striking environment and the involvement of the students. For first year physics lab they had us run through a few standard labs just to experience and then they turned us loose to do other labs. One of our labs was with two friends. We managed to get a key to the old astronomy building where a solar telescope was removed leaving a many storied hole in the building. We managed to rig a pendulum to measure the latitude. It was fascinating. We were measuring the precession but got an interesting effect. The pendulum which started as a line drag showed that it was an eclipse with an increasing minor axis. Not a perfect result but one which required learning a lot. Where else would they just give a bunch of teens the keys to play with the building.

Four years at Caltech were a unique experience. I was there in the early 60s and it is hard to explain the effect of sitting around and talking with Richard Feymen. He was a unique individual.

Unethical without integrity Harvard steals taxpayer dollars when they have a 40 billion dollar endowment from the small business loans offered in the care's act. Not sure how they can live with themselves.

Honestly I was a really hard worker, considered myself top of the class, gave as much as anyone back to the university but oh can I tell you they did not give back. Currently I am working at pizza hut in Boston. This is the biggest waste of money. Coming into Harvard I had hopes of fast cars, fast boats, hot ladies, the occasional P.J..., and a luxurious lifestyle. BUT INSTEAD I DRIVE A 96' HONDA

FIG. 13B

| Domain | Keywords |
|---|---|
| academics | ['result','individual','people','code','students','technology','engineering','classes','research','faculty','resources','science','field','grade'] |
| facilities | ['environment','lab','laboratory','building','nurses','care','campus','houses','tennis','court','sports','playground','room','facilities','labo] |
| placement | ['opportunity','opportunities','project','Entrepreneurship','jobs','placement','recruit','recruitment','money','package','pay','skill','work',] |

FIG. 15

| reviews | Keywords | Type | Domain | Rating |
|---|---|---|---|---|
| Four years at Caltech were a unique experience | ['years','Caltech','experience'] | 1 | placement | 5 |
| We were given the opportunity to see current p | ['opportunity','projects','JPL','mars'] | 1 | placement | 5 |
| Work is insane. | ['Work'] | 1 | placement | 5 |
| My experience so far at Caltech has been that y | ['experience','Caltech','rumors'] | 1 | placement | 5 |
| However, if you are willing to put in the work, y | ['Work'] | 1 | placement | 5 |
| Caltech is a very work hard play hard mentality. | ['Caltech','work','play','mentality'] | 1 | placement | 5 |
| Alumni agree that any job after graduation pale | ['Alumni','job','graduation','pales','co] | 1 | placement | 5 |
| Caltech isn't perfect, but it'll challenge you acac | ['Caltech','job','graduation'] | 1 | placement | 5 |
| As a freshman in the second term, the experien | ['freshman','term','experience'] | 1 | placement | 5 |

FIG. 17A

| Reviews | Keywords | Type | Domain | Rating |
|---|---|---|---|---|
| For first year Physics lab they had us run through a few | ['year','Physics','lab','labs','labs'] | 1 | facilities | 3 |
| We managed to get a key to the old astronomy building | ['key','astronomy','building','telescope',''] | 1 | facilities | 3 |
| Where else would they just give a bunch of teens the k | ['bunch','teens','keys','building'] | 1 | facilities | 3 |
| Nurses here take care of you super well, especially if y | ['Nurses','care','freshman','lot','school'] | 1 | facilities | 3 |
| I loved the campus, it was so beautiful. | ['campus'] | 1 | facilities | 3 |
| The houses each had their own personality, and cool | ['houses','personality','traditions'] | 1 | facilities | 3 |
| I got to play tennis on the courts there and stay with s | ['tennis','courts','girls','houses'] | 1 | facilities | 3 |
| We staying in flemming house and spent a lot of time | ['house','lot','time','room'] | 1 | facilities | 3 |
| We also were able to tour the academic facilities and | ['facilities','Jet','Propulsion','Laboratory', | 1 | facilities | 3 |
| The size and academic rigor of this institution makes it | ['size','rigor','institution','place','student'] | 1 | facilities | 3 |
| The collaborative environment here is amazing and I a | ['environment','lot'] | 1 | facilities | 3 |

FIG. 17B

| Reviews | Keywords | Type | Domain | Rating |
|---|---|---|---|---|
| What I liked was the striking environme | ['environment','involvement','students'] | 1 | academics | 1 |
| Not a perfect result but one which req | ['result','lot'] | 1 | academics | 1 |
| He was a unique individual. | ['individual'] | 1 | academics | 1 |
| Some of the best (and worse) people y | ['people'] | 1 | academics | 1 |
| The emphasis on honor code makes th | ['emphasis','code','school'] | 1 | academics | 1 |
| California Institute of Technology is de | ['California','Institute','Technology','dream',''] | 1 | academics | 1 |
| The engineering classes seem very inte | ['engineering','classes'] | 1 | academics | 1 |
| Great research opportunities, faculty a | ['Great','research','opportunities','faculty','re | 1 | academics | 1 |
| But it is the incredible people around t | ['people','experience'] | 1 | academics | 1 |
| The challenge is there, but for people | ['challenge','people','sciences','school','re | 1 | academics | 1 |
| You have all the access to the top of th | ['access','top','top','field'] | 1 | academics | 1 |
| You are going to take the same class w | ['class','year','grad','students','year'] | 1 | academics | 1 |
| By the time you finish your four year in | ['time','year','inmate','life','school','subjects' | 1 | academics | 1 |

FIG. 17C

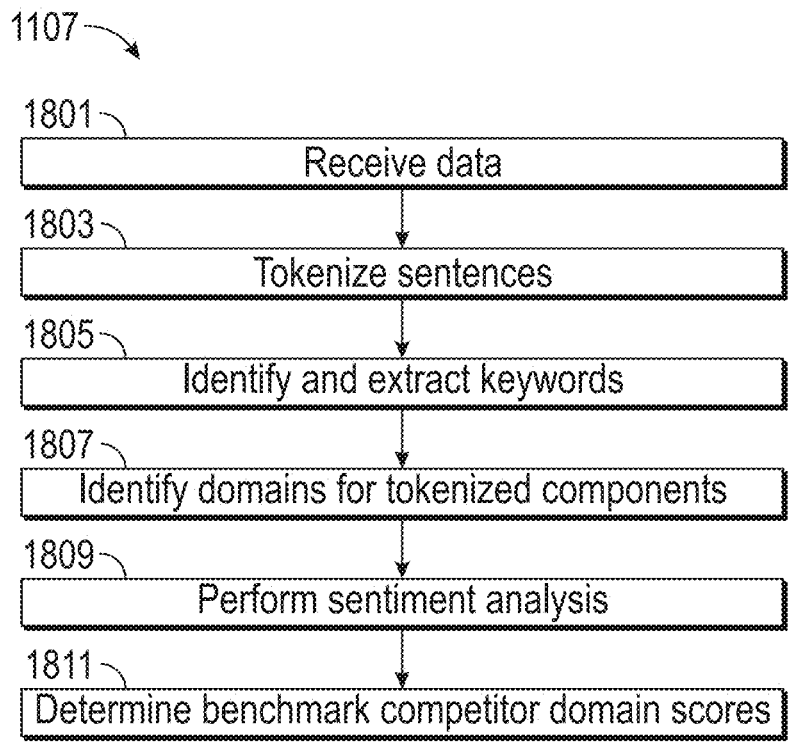

Stanford alumni have founded numerous companies, which combined produce more than $2.7 trillion in annual revenue and have created 5.4 million jobs as of 2011, roughly equivalent to the 7th largest economy in the world (as of 2020)

Stanford is the alma mater of one president of the United States (Herbert Hoover), 30 living billionaires, and 17 astronauts. It is also one of the leading producers of members of the United States Congress.

Stanford University Admissions

Stanford University admissions is most selective with an acceptance rate of 4%. Half the applicants admitted to Stanford University have an SAT score between 1420 and 1570/1600 or an ACT score of 32 and 35/36. However, one quarter of admitted applicants achieved scores above these ranges and one quarter scored below these ranges.

FIG. 19

| DomainName | QuestionID | Benchmark Question | Resp | Benchmark OptionDescription |
|---|---|---|---|---|
| Procurement | 1001 | How well does your organization procure the mo | 3 | Integrated-The organization has initiated integration of technology driven procurement list maintenance in order to ensure continuous access to products. |
| Procurement | 1002 | How well does your organization select reliable s | 4 | Managed-Reliable suppliers of high-quality products are pre-selected on the basis of strategic guidelines and additional active quality assurance programs involving both surveillance and testing, across the drugs spectrum. |
| Procurement | 1003 | How well does your organization ensure timely d | 4 | Maximum-Optimal delivery time have been secured from the suppliers with such a delivery mechanism in place so that direct drop-shipment to the retail outlets/hospital pharmacies as needed are possible. |
| Inventory | 1012 | How well does the Pharmacy maintain Inventory | 3 | Initiated-Pharmacy has initiated to use technology to drive in best practises and monitoring for inventory storage |

FIG. 23

| A | B | C | D | E | F |
|---|---|---|---|---|---|
| Inventory | 1013 | How good is your Inventory to Cash conversion cy | 1 | Ad-hoc-No formal Inventory to cash approach has been initiated. |
| Inventory | 1014 | Does the Inventory Replenishment Planning, foll | 2 | Initiated-The Inventory Replenishment Planning is sometimes using the Economic Order Quantity (EOQ) model |
| Compliance | 1026 | To what extent are inventory records maintained | 3 | Initiated-System monitored inventory is maintained centrally in the organization |
| Compliance | 1027 | To what extent doese the organization maintain | 4 | Maximum-The processes are documented and maintained in the knowledge share repository |
| Compliance | 1028 | To what extent is store product tracing document | 4 | Maximum-The store product tracing documentation is maintained through a well developed technology set up |
| Compliance | 1029 | Does the security of the drug supply chain follow | 5 | Best-in-place-Comprehensive and highly effective supply chain procedures are in place , which ensures the FDA security guidelines are followed to the T and ensures there are no breaches in the organization |
| Compliance | 1030 | Does the regulation and security of controlled su | 5 | Best-in-place-Comprehensive and highly effective controlled substances procedures are in place, which ensures the DEA security and regulations are followed to the T and ensures there are no breaches in the organization |

FIG. 23
(Continued)

| Process Level 1 Title | Process Level 2 Title | Process Level 3 Title | Process Level 4 Title | Process Level 5 Title | Process Scores | Process_id | Domain_Level | Domain_Found |
|---|---|---|---|---|---|---|---|---|
| Risk & Compliance | Risk & Compliance | Review Legislative Changes from Prior Year | | | 3.8 | 0 | 2 | 3 |
| Risk & Compliance | Risk & Compliance | Review Proposed Legislative Changes from Current Year | | | 3.8 | 0 | 2 | 3 |
| Risk & Compliance | Risk & Compliance | Review Upcoming Legislative Proposals | | | 3.8 | 0 | 2 | 3 |
| Risk & Compliance | Risk & Compliance | Review Changes to Accreditation Standards | | | 3.8 | 0 | 2 | 3 |
| Risk & Compliance | Risk & Compliance | Review Changes to Payor Requirements | | | 3.8 | 0 | 2 | 3 |
| Risk & Compliance | Risk & Compliance | Review Annual Operational Compliance | | | 3.8 | 0 | 3 | 3 |
| Risk & Compliance | Risk & Compliance | Review Citations, Fin Perform Gap Analysis | | | 3.8 | 0 | 2 | 3 |
| Risk & Compliance | Risk & Compliance | Review Citations, Fin Perform Risk Assessment | | | 3.8 | 0 | 2 | 3 |
| Risk & Compliance | Risk & Compliance | Review Citations, Fin Determine Scope and Effort for Each Gap Iden | | | 3.8 | 0 | 2 | 3 |
| Risk & Compliance | Risk & Compliance | Review Citations, Fin Prioritize by Severity and Scope of Division af | | | 3.8 | 0 | 2 | 3 |
| MOR (Monthly Final | Review Hospital Phar | Director Review Drug Actively Engage Clinical Manage/Staff on any | | | 4 | 1 | 0 | 0 |
| MOR (Monthly Final | Review Hospital Phar | Director Review Drug Conduct Biweekly Review of Spend with Buyer | | | 4 | 1 | 4 | 1 |
| MOR (Monthly Final | Review Hospital Phar | Director Review Drug Buyer to Review Utilization Report, Review with | | | 4 | 1 | 4 | 1 |
| MOR (Monthly Final | Review Hospital Phar | Director Review Drug Buyer to Report Variance and Finding to Director | | | 4 | 1 | 4 | 1 |
| MOR (Monthly Final | Review Hospital Phar | Director Determine Drivers of Drug Spend Using Information from D | | | 4 | 1 | 0 | 0 |
| MOR (Monthly Final | Review Hospital Phar | Directors Review Qtrly Trend of Identied Drivers of Drug Spend | | | 4 | 1 | 0 | 0 |
| MOR (Monthly Final | Review Labor Spend | Directors Review Qtrly Trend of Identied Drivers of Drug Spend | | | 4 | 1 | 0 | 0 |
| MOR (Monthly Final | Review Labor Spend | Director Review Productive Spend, Premium Pay and Non Productive | | | 4 | 1 | 0 | 0 |
| MOR (Monthly Final | Review Labor Spend | Director Determine Review Schedule or with Scheduler to Determine | | | 4 | 1 | 4 | 2 |

FIG. 26

| Domain Name | Question | Cost_Occ | Quality_Occ | Time_Occ | Cost_Weight | Quality_Weight | Time_Weight | Domain_Score |
|---|---|---|---|---|---|---|---|---|
| Procurement | How well does your organization p | 0 | 0 | 0 | 0.33 | 0.33 | 0.33 | 3.2 |
| Procurement | How well does your organization s | 1 | 1 | 1 | 0.33 | 0.33 | 0.33 | 3.2 |
| Procurement | How well does your organization e | 1 | 0 | 0 | 0.5 | 0.25 | 0.25 | 3.2 |
| Procurement | To what extent is data analytics use | 1 | 0 | 1 | 0.4 | 0.2 | 0.4 | 3.2 |
| Inventory | How well do you manage shelf life | 0 | 0 | 1 | 0.25 | 0.25 | 0.5 | 2.5 |
| Inventory | How well does the Pharmacy main | 0 | 0 | 1 | 0.25 | 0.25 | 0.5 | 2.5 |
| Inventory | How good is your Inventory to Cash | 0 | 1 | 0 | 0.25 | 0.5 | 0.25 | 2.5 |
| Compliance | Does the regulation and security o | 0 | 0 | 0 | 0.33 | 0.33 | 0.33 | 3.8 |
| Compliance | Does the management of pharmacy | 0 | 0 | 1 | 0.25 | 0.25 | 0.5 | 3.8 |
| Compliance | To what extent does the organization | 0 | 0 | 0 | 0.33 | 0.33 | 0.33 | 3.8 |

FIG. 27

| Process 1 Scores | Processs | Domain_Found | Cost_Occ | Quality_Occ | Time_Occ | Cost_weight | Quality_weight | Time_weight |
|---|---|---|---|---|---|---|---|---|
| 3.8 | 0 | 3 | 0 | 0 | 1 | 0.25 | 0.25 | 0.5 |
| 3.8 | 0 | 3 | 0 | 0 | 1 | 0.25 | 0.25 | 0.5 |
| 3.8 | 0 | 3 | 0 | 0 | 0 | 0.33 | 0.33 | 0.33 |
| 3.8 | 0 | 3 | 0 | 0 | 0 | 0.33 | 0.33 | 0.33 |
| 3.8 | 0 | 3 | 0 | 0 | 1 | 0.33 | 0.33 | 0.33 |
| 3.8 | 0 | 3 | 0 | 0 | 0 | 0.25 | 0.25 | 0.5 |
| 3.8 | 0 | 3 | 0 | 0 | 1 | 0.33 | 0.33 | 0.33 |
| 3.8 | 0 | 3 | 1 | 1 | 1 | 0.33 | 0.33 | 0.33 |
| 3.8 | 0 | 3 | 1 | 0 | 0 | 0.25 | 0.25 | 0.5 |
| 4 | 1 | 0 | 1 | 0 | 0 | 0.33 | 0.33 | 0.33 |
| 4 | 1 | 1 | 1 | 0 | 1 | 0.4 | 0.2 | 0.4 |
| 4 | 1 | 1 | 0 | 0 | 0 | 0.5 | 0.25 | 0.25 |
| 4 | 1 | 1 | 0 | 0 | 0 | 0.5 | 0.25 | 0.25 |
| 4 | 1 | 0 | 0 | 0 | 1 | 0.5 | 0.25 | 0.25 |
| 4 | 1 | 0 | 0 | 0 | 0 | 0.25 | 0.25 | 0.5 |
| 4 | 1 | 0 | 0 | 0 | 0 | 0.33 | 0.33 | 0.33 |
| 4 | 1 | 0 | 0 | 0 | 0 | 0.33 | 0.33 | 0.33 |
| 4 | 1 | 2 | 1 | 0 | 1 | 0.4 | 0.2 | 0.4 |

FIG. 28 (Continued)

| Problems | Problem Process Title | Problem Process FPM Function | Problem Process FPM Phase |
|---|---|---|---|
| Purchase of Bad Quality Raw Materials | Procurement Quality Management | Inventory Planning | Strategy and Planning |
| Late Delivery of Raw Materials | Purchase Time | Demand Planning | Monitoring & Management |
| Buying Process is Time Consuming | Buying Lead Time | Procurement | Strategy and Planning |
| Inventory Reconciliation Process is Very Cumbersome | Order Management | Information Technology | Monitoring & Management |
| The Approval of Purchase Order is Mismanaged | Order Approval | Sales Management | Execution |

FIG. 31

| Pain-Points 3202 | Function 3204 | Root Cause 3206 | Solutions 3208 |
|---|---|---|---|
| Manual Procurement Process is Tedious | Procurement | Lack of Clearly Defined Approval Hierarchy for Product Categories | Approval Hierarchy Need to be Clearly Defined by Product Categories as well as Value of the Purchase Order |
| Manual Procurement Process is Tedious | Procurement | Lack of Proper and Consistent Process Across Product Categories | Streamlined and Consistent Processes Need to be Drawn Across Product Categories |
| Manual Procurement Process is Tedious | Information Technology | Lack of Adequate IT Systems Across Product Categories | Create Robust IT System Integration Across Product Categories |
| Manual Procurement Process is Tedious | Information Technology | Supplier are not IT Enabled | Pursue Supplier for IT Enablement |
| Procurement of Low Quality Product | Inventory Planning | Too Many SKU's for Procurement | Check Feasibility of Optimizing the SKU's in the Organization |
| Procurement of Low Quality Product | Inventory Planning | Product Mix Changing Frequently | Attempt to have more Standardized Product Mix |
| Procurement of Low Quality Product | Procurement | Incomptent Supplier Base | Create Competent and Professional Supplier Base |
| Procurement of Low Quality Product | Inventory Planning | Fragile Product Packing | Analyze the Packaging Process and ensure there are no Loopholes Causing Quality Degradation |

FIG. 32

| Pain-Points | Pain-Point KPI Recommendation |
|---|---|
| Manual Procurement Process is tedious | Purchase Order Cycle Time |
| Procurement of Low Quality Product | Quality Metrics |
| Inefficient Supplier Selection Process | PO Accuracy |
| Untimely Delivery of Raw Material | Purchase Order Cycle Time |
| No Economies of Scale for Volume Purchases | Procurement ROI |
| Inventory Discrepancies | Inventory Management |

FIG. 34

| PROBLEMS | FUNCTION | ROOT CAUSE | SOLUTIONS | SOLUTION KPI RECOMMENDATION POINT | KPI RECOMMENDATION |
|---|---|---|---|---|---|
| PURCHASE OF BAD QUALITY | INVENTORY PLANNING | TOO MANY SKU'S FOR PROCUREMENT | CHECK FEASIBILITY OF OPTIMIZING THE SKU'S IN THE ORGANIZATION | SUPPLIER DEFECT RATE | QUALITY METRICS |
| | INVENTORY PLANNING | PRODUCT MIX CHANGING FREQUENTLY | ATTEMPT TO HAVE MORE STANDARDIZED PRODUCT MIX | | |
| | PROCUREMENT | INCOMPETENT SUPPLIER BASE | CREATE COMPETENT AND PROFESSIONAL SUPPLIER BASE | | |
| | INVENTORY MANAGEMENT | FRAGILE PRODUCT PACKAGING | ANALYZE THE PACKAGING PROCESS AND ENSURE THERE ARE NO LOOPHOLES CAUSING QUALITY DEGRADATION | ORDER PICKING/PACKING | |
| LATE DELIVERY OF RAW | DEMAND PLANNING | INACCURATE FORECAST | DEEP DOWN INTO DEMAND PLANNING TO DIVISE EFFICIENT METHODOLOGY FOR FORECASTING | FORECASTING METRICS | PURCHASE ORDER CYCLE TIME |
| | DEMAND PLANNING | UNTIMELY SHARING OF FORECAST WITH SUPPLIER | ENSURE THE FORECAST IS SHARED AT RIGHT INTERVAL AND IN TIMELY FASHION TO SUPPLIER | | |
| | PROCUREMENT | INCOMPETENT SUPPLIER BASE | ANALYZE PERFORMANCE OF SUPPLIERS FREQUENTLY AND TALLY AGAINST PRODUCT QUALITY TO DISENGAGE WITH INCOMPETENT SUPPLIERS | SUPPLIER LEAD TIME | |
| | DEMAND PLANNING | UNPLANNED DEMAND SURGE | MAKE PROCESS AMENDMENT TO HANDLE SCENARIOS OF SUDDEN DEMAND SURGE | SUPPLIER AVAILABILITY | |
| BUYING PROCESS IS TIME | PROCUREMENT | LACK OF CLEARLY DEFINED APPROVAL HIERARCHY | APPROVAL HIERARCHY NEED TO BE CLEARLY DEFINED BY PRODUCT CATEGORIES AS WELL AS VALUE OF THE PURCHASE ORDER | | PURCHASE ORDER CYCLE TIME |
| | PROCUREMENT | LACK OF PROPER AND CONSISTENT PROCESS ACROSS | STREAMLINED AND CONSISTENT PROCESSES NEED TO BE DRAWN ACROSS PRODUCT CATEGORIES | | |
| | INFORMATION TECHNOLOGY | LACK OF ADEQUATE IT SYSTEM ACROSS PRODUCT | CREATE ROBUST IT SYSTEM INTEGRATION ACROSS PRODUCT CATEGORIES | | |
| | INFORMATION TECHNOLOGY | SUPPLIER ARE NOT IT ENABLED | PURSUE SUPPLIER FOR IT ENABLEMENT | | |

DATA DRIVEN SYSTEMS AND METHODS FOR OPTIMIZATION OF A TARGET BUSINESS

CROSS-REFERENCE TO RELATED APPLICATIONS

This application is a divisional of U.S. application Ser. No. 17/006,828, filed Aug. 29, 2020, which claims priority to U.S. Provisional Application No. 62/894,400, filed Aug. 30, 2019, which are hereby incorporated by reference in their entirely.

FIELD OF THE DISCLOSURE

The present disclosure relates generally to a system and associated methods for assessing, evaluating a target business, and leveraging insights from the assessment and evaluation to provide strategy recommendations to improve the performance of the target business.

BACKGROUND OF THE DISCLOSURE

In order to maintain a competitive edge, improve efficiency, and gain market share, businesses typically identify areas of improvement. For example, identifying areas of improvement may include, but are not limited to, identifying inefficiencies in the lifecycle of a process, identifying individuals that act as a bottleneck to processes, identifying weak key performance indicators (KPIs), and the like. Businesses may sometimes internally identify areas improvement and identify possible solutions. Other times, businesses may hire costly third party firms to identify areas of improvement and identify possible solutions. Both of these systems (internal and external) are subject to human biases. Accordingly, a data driven efficient system for identifying business problem areas and recommending a path forward would be advantageous to businesses.

SUMMARY OF THE DISCLOSURE

The present disclosure is directed to a system and associated methods for assessing, evaluating a target business, and leveraging insights from the assessment and evaluation to provide strategy recommendations to optimize the performance of the target business. In some embodiments, the system may identify a benchmark competitor and determine a performance score for the benchmark competitor. In some embodiments, the system may determine a domain score of an identified benchmark competitor. In some embodiments, the system determines an updated performance score based on provided capability process data. In some embodiments, the system recommends solutions and/or KPI to solve a provided problem. In some embodiments, the system provides a platform to enable stakeholders, (e.g., users) in the target business to perform a design thinking process.

BRIEF DESCRIPTION OF THE DRAWINGS

FIG. 7 illustrates an exemplary data, according to embodiments of this disclosure.

FIGS. 13A-13B illustrate exemplary data, according to embodiments of this disclosure.

FIG. 15 illustrates an exemplary file, according to embodiments of this disclosure.

FIGS. 17A-17C illustrate exemplary data, according to embodiments of this disclosure.

FIG. 18 illustrates a flowchart of an exemplary competitor assessment process, according to embodiments of this disclosure.

FIG. 19 illustrates exemplary data, according to embodiments of this disclosure.

FIG. 23 illustrates an exemplary data, according to embodiments of this disclosure.

FIG. 26 illustrates an exemplary data, according to embodiments of this disclosure.

FIG. 27 illustrates an exemplary data, according to embodiments of this disclosure.

FIG. 31 illustrates an exemplary data, according to embodiments of this disclosure.

FIG. 32 illustrates an exemplary data, according to embodiments of this disclosure.

FIG. 34 illustrates an exemplary KPI, according to embodiments of this disclosure.

FIG. 35 illustrates an exemplary recommendation file, according to embodiments of this disclosure.

FIG. 39 illustrates an exemplary user interface, according to embodiments of this disclosure.

FIG. 44 illustrates an exemplary map, according to embodiments of this disclosure.

FIG. 49 illustrates an exemplary collaboration environment, according to embodiments of this disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1:
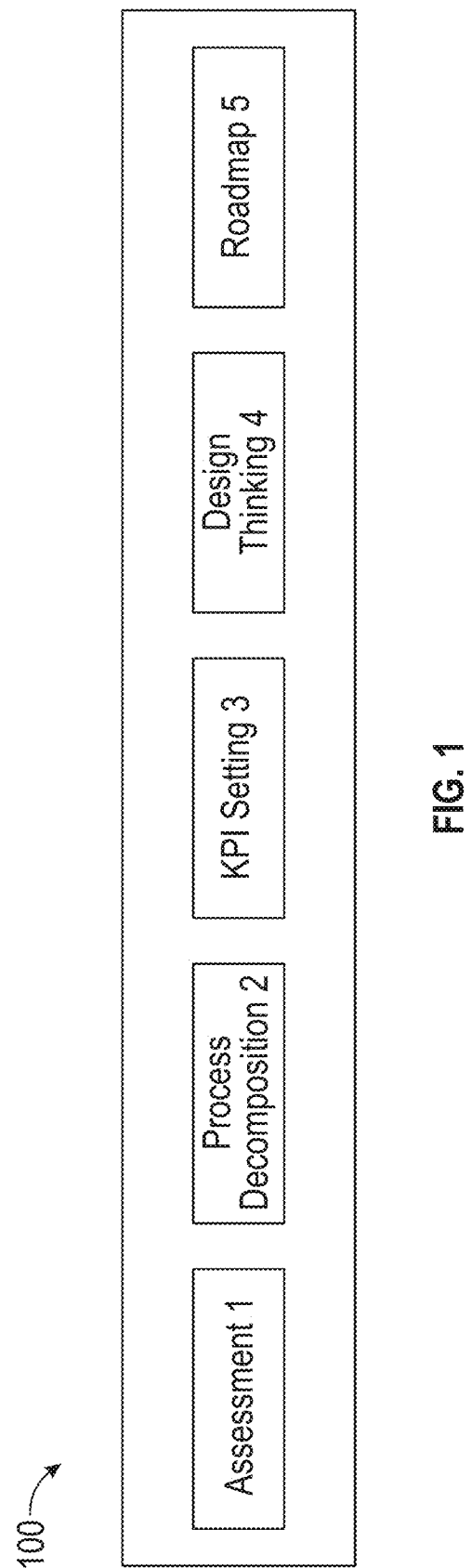
FIG. 1 illustrates a system, according to embodiments of this disclosure.

Embodiments of this disclosure relate to a system for improving multiple areas, such as strategy, operations, risk management, and regulation compliance, of a target business. FIG. 1 illustrates a block diagram of a system 100, according to embodiments of this disclosure. The system 100 may provide different functionalities to achieve these improvements. For example, the system 100 may include functionality to provide one or more initial scores of a target business, assess one or more process capabilities of the target business, set one or more KPIs, set one or more business goals, provide a collaboration platform for stakeholders in the target business, and provide a roadmap for achieving one or more business goals. These functionalities may be performed by one or more of the processes discussed below.

The functionality of the system 100 may be grouped into different high-level functions, such as assessment 1, process decomposition 2, KPI setting 3, design thinking 4, and roadmap 5. The high-level functions can be presented to a user using a user interface (UI), for example.

Exemplary Process for Providing One or More Initial Scores

The system 100 may be configured to provide an assessment of business practices and processes for a target business. In some embodiments, the assessment may be based on a comparison between the target business against a benchmark competitor. The assessment may be used by a user, such as a business leader of the target business, for example. The user may use the assessment information to determine areas of growth and improvement for the target business.

As discussed in more detail below, the system 100 may perform one or more of: determining an initial performance score of the target business, identifying a benchmark competitor (e.g., the industry leader), and determining a benchmark performance score of the benchmark competitor.

Figure 2:
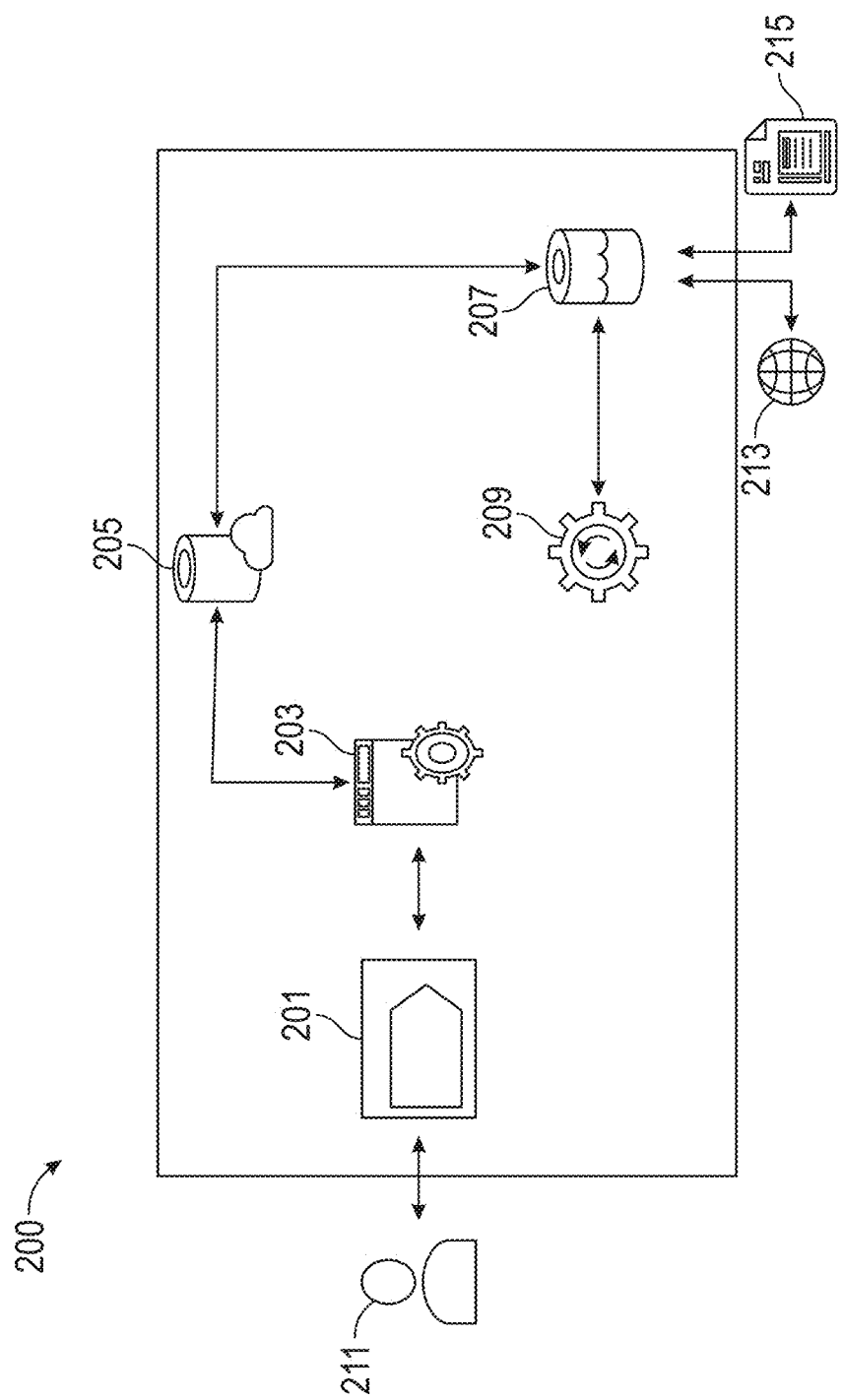
FIG. 2 illustrates a system, according to embodiments of this disclosure.

FIG. 2 illustrates a block diagram of a portion of an exemplary system 100, according to embodiments of this disclosure. The system 100 may include a website 201, an application programming interface (API) 203, a first database 205, a second database 207, a network 213, first data 215, and second data 209.

The website 201 may an interface between a user 211 and the system 100, as shown in the figure. The website 201 may include a user interface (UI) that may be accessed by various employees (e.g., users 211) of the target business, for example. The website 201 may be integrated with the application programming interface (API) 203. The API 203 may serve as an intermediary between the website 201 and one or more databases, such as the first database 205.

The first database 205 may be any type of database, such as a cloud database (e.g., Azure SQL, Amazon Web Services, etc.). In some embodiments, the first database 205 may be in communication with a remote server that maintains a second database 207.

The second database 207 may store data received from one or more sources, such as from a user 211 accessing the website 201, the internet 213, first data 215, etc. The first data 215 may be from a third party source, for example. The second database 207 may store second data 209, which may be data determined by the system 100. In some embodiments, second data 209 may include one or more scores, such as an initial performance score of the target business and a benchmark performance score of a benchmark competitor, or a combination thereof.

As discussed above, the system 100 may determine one or more scores included in second data 209. An exemplary score may be an initial performance score of a target business. The initial performance score of the target business may be based on one or more target business domain scores, where each target business domain score may be representative of the target business' performance in the respective domain. For example, each of the target business domain scores may be evaluated against a target business domain weight to determine the target business domain score.

Figure 3:
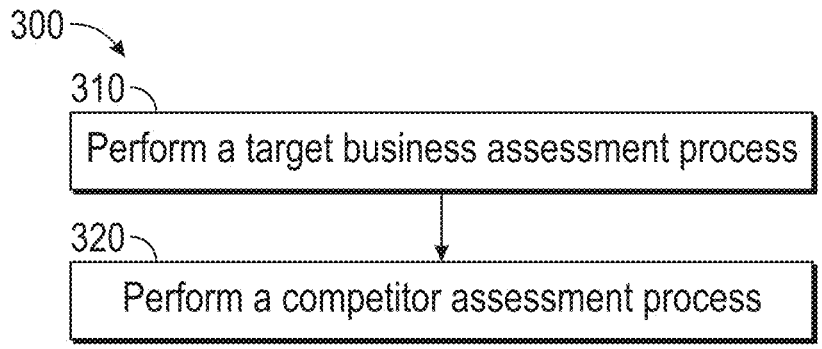
FIG. 3 illustrates a flowchart of an exemplary operation of a system, according to embodiments of this disclosure.

FIG. 3 illustrates a flow chart of an exemplary operation 300 of a system 100, according to embodiments of this disclosure. Although the process 300 is illustrated as including the described elements, it is understood that different order of elements, additional elements, or fewer elements may be included without departing from the scope of the disclosure.

The system 100 can perform a target business assessment process 310 and a benchmark competitor assessment process 320. The target business assessment process 310 can determine the initial performance score of a target business. The benchmark competitor assessment process 320 can identify a benchmark competitor and determine a benchmark performance score of the benchmark competitor. Both processes are discussed in more detail in turn below.

Figure 4:
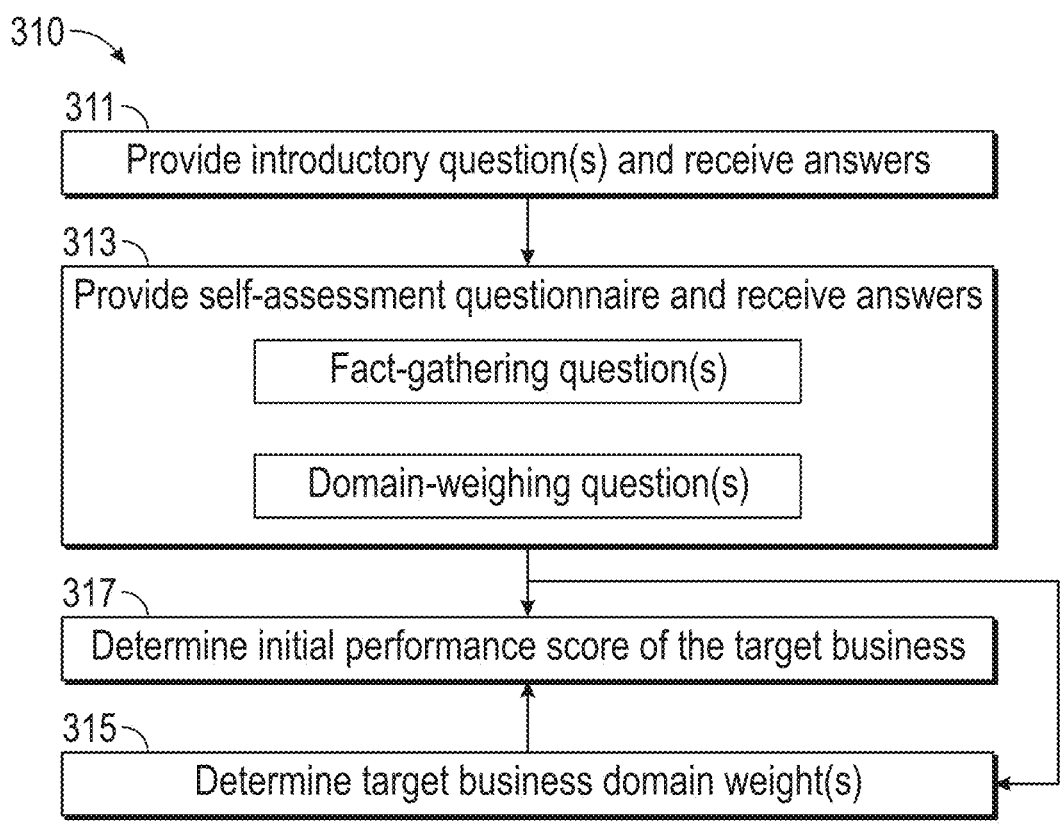
FIG. 4 illustrates a flowchart of an exemplary target business assessment process, according to embodiments of this disclosure.

FIG. 4 illustrates a flow chart of an exemplary target business assessment process 310 for determining an initial performance score of a target business, according to embodiments of this disclosure. Although the process 310 is illustrated as including the described elements, it is understood that different order of elements, additional elements, or fewer elements may be included without departing from the scope of the disclosure.

Process 310 may begin with receiving information from a self-assessment, in step 311. For example, a user (e.g., a business leader) within the target business may access the system 100. A business leader may include a chief executive officer (CEO), chief operations officer (COO), or other highly ranked individual employed by the target business. The system 100 can give the user login credentials or can prompt the user to create a log-in when accessing a website 201 via the internet. On the website 201, the user may select the function related to assessment 1.

In some embodiments, the system 100 may provide the user with introductory questions. The system 100 may receive introductory information regarding the target business as the user answers the introductory questions. Exemplary introductory information may include to, but are not limited to, the type of industry, the number of employees, location, revenue, business volume, etc. In some embodiments, the system 100 may build a target business profile using the introductory questions and/or introductory answers.

Additionally or alternatively, in step 313, the system 100 can provide a self-assessment questionnaire to the user. The questionnaire may include questions about the target business and the target business' performance. In some embodiments, the system 100 can dynamically select the questions in the questionnaire as the user completes it. For example, the system 100 can select questions based on the completed answers to the introductory questions (provided in step 311) or to the questionnaire (provided in step 313). The questionnaire may include a series of questions related to the culture, technology, knowledge curation, data strategy, compliance, partner enablement, performance measurement, business processes, and other areas of business strategy.

In step 313, the questions may be categorized into different types of questions, such as fact-gathering questions and domain-weighing questions. In some examples, a user may not be able to distinguish between a fact-gathering question and a domain-weighing question. For example, the fact-gathering questions and domain-weighing questions may be phrased in a similar manner and formatted to receive answers in a similar manner. The system 100 may associate each question with the appropriate category and save this categorization into the second database 207.

The fact-gathering questions may be asked to determine specific facts and attributes of the target business. In some embodiments, the fact-gathering questions may be specific to one or more domains. A domain may refer to an area of a business that can impact a score of the business. The domains may be categorized into industry domains (e.g., domains specific to a particular industry) and common domains (e.g., domains common to many industries). An example of a common domain fact-gathering question may be "to what extent are appropriate security controls in place to ensure the integrity of explicit knowledge sources?" The domain-weighing questions may be asked to determine the importance of one or more domains for the target business. An example of a common domain, domain-weighing question may be "to what extent do you consider your technology upgrade will impact your top and bottom line financials?"

In some embodiments, the system 100 may allow the user to provide answers to the fact-gathering and domain-weighing questions by selecting a numerical value (e.g., on a scale of 1-5, on a scale of 1-10, on a scale of 1-100, etc.). For example, in response to the fact-gathering question, the answer choices may be selected from a scale of 1-5, where 1 corresponds to "no procedures in place" and 5 corresponds to "content retirement and review rules are consistently applied to information and knowledge; enabling technologies are used to support efforts to maintain knowledge currency." As another example, in response to the common domain, domain-weighing question, the answer choices may be selected from a scale of 1-5, where 1 corresponds to "minimal impact: most of our processes are easily performed manually with no significant productivity loss" and 5 corresponds to "significant impact: our organization may save a lot on operational losses if the technology stack is digitized with automation." In some examples, the system 100 may allow the user to enter in a written response, and natural language processing (NLP) may be used to determine a corresponding numerical value.

In step 315, the system 100 may determine one or more target business domain weights based on answers to the domain-weighing questions. In some embodiments, the system 100 may use target business domain weights to determine the relative importance of the one or more domains to the target business. For example, answers to the domain-weighing questions may indicate which domains have a greater impact on the initial performance score of the target business.

In step 317, the system 100 may determine the initial performance score of the target business. The initial performance score of the target business can be based on answers to the fact-gathering questions. In some embodiments, the fact-gathering questions may be specific to one or more domains for the target business. The target business domain weights may be applied to the answers from the fact-gathering questions in the corresponding domain of the target business to generate the initial performance score of the target business.

Another exemplary score included in second data 209 may be a benchmark performance score of a benchmark competitor. The benchmark performance score of a benchmark competitor may be based on third-party data, e.g., a first data 215, related to the benchmark competitor. The system 100 can process the third-party data to determine the benchmark performance score of the benchmark competitor.

Figure 5:
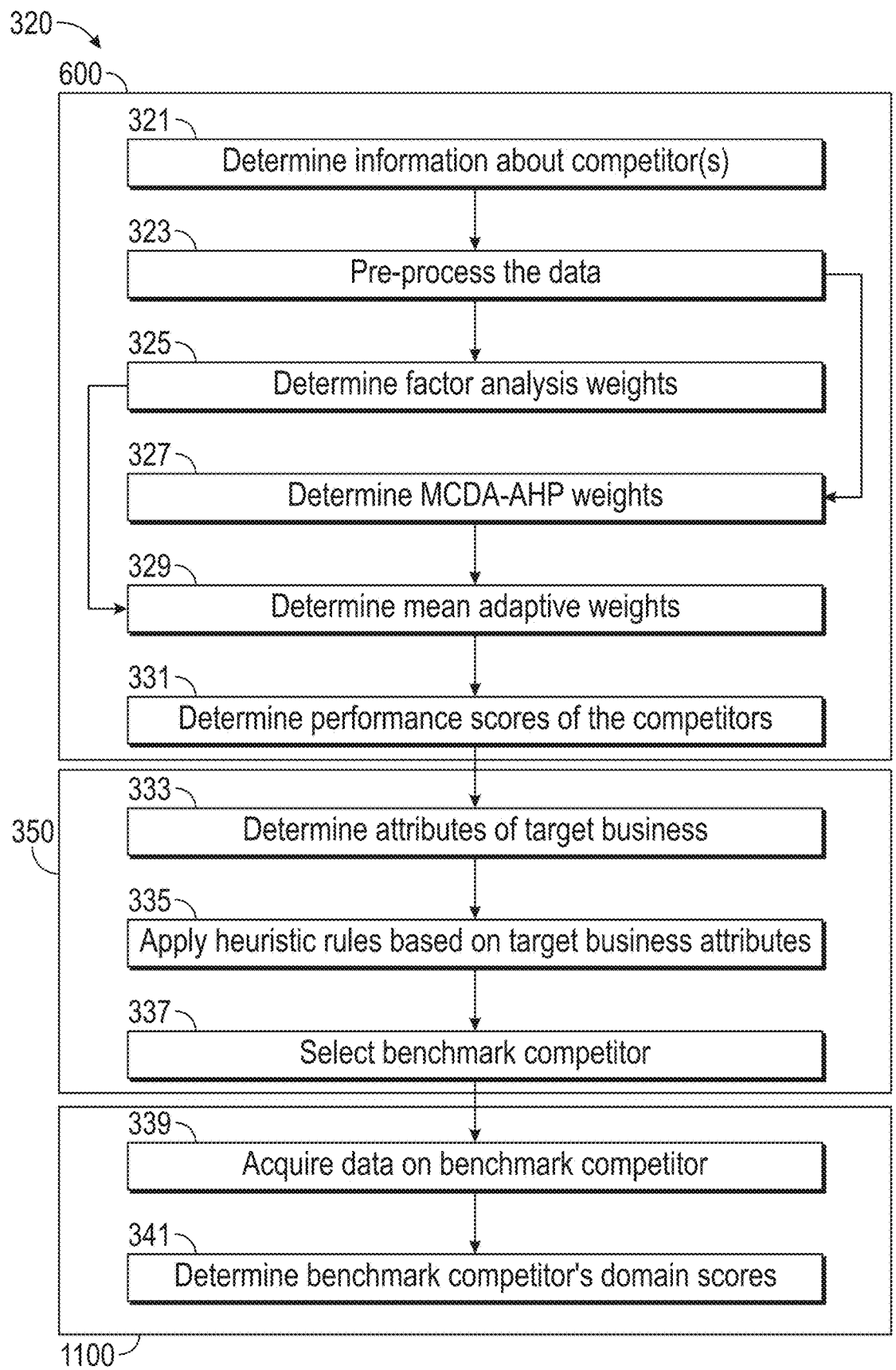
FIG. 5 illustrates a flowchart of an exemplary competitor assessment process, according to embodiments of this disclosure.

FIG. 5 illustrates a flowchart of an exemplary benchmark competitor assessment process 320, according to embodiments of this disclosure. The benchmark competitor assessment process 320 may comprise identifying a benchmark competitor (e.g., industry leader) (sub-process 350) and determining a benchmark score (e.g., a benchmark performance score (sub-process 600) and one or more benchmark competitor domain scores (sub-process 1100)) of the benchmark competitor. Although process 320 is illustrated as including the described elements, it is understood that different order of elements, additional elements, or fewer elements may be included without departing from the scope of the disclosure.

Process 320 may begin with step 321 where the system 100 may determine information (e.g., including data) about one or more competitors in the same industry as the target business. In some embodiments, the industry may be one identified by the target company based on answers received from introductory questions (in step 311) and/or from a self-assessment questionnaire (step 313). In some examples, the system 100 may determine a business is a competitor based on one or more attributes (e.g., size, demography, location, etc.) similar to the target business. In some embodiments, the system 100 can include information about the competitor(s) in first data 215. First data 215 may be data from a third party source. In some examples, the system 100 can obtain first data 215 from a network 213.

In step 323, the system 100 may perform pre-processing on the first data 215. Pre-processing may include standardizing and cleaning the first data 215, so that the system 100 can further process and analyze the first data 215. The system 100 can perform a factor analysis process to determine factor analysis weights (step 325) and multiple-criteria decision-analysis and analytic hierarchy process (MCDA-AHP) to determine MCDA-AHP weights (step 327). In some embodiments, the factor analysis and MCDA-AHP analysis may be performed in parallel. The factor analysis weights and the MCDA-AHP weights may be applied to the first data 215.

In step 329, the system 100 can use the factor analysis weights and the MCDA-AHP weights to determine mean adaptive weights. The system 100 can then apply the mean adaptive weights to the pre-processed first data 215 to determine performance scores of each of the competitors, in step 331.

The system 100 may also determine the attributes of the target business, in step 333. For example, the target business' attributes may be based on the answers to the introductory questions received in step 311.

In step 335, the system 100 can apply heuristic rules to the target business' attributes to ensure the selected benchmark competitor has attributes similar to the target business. The competitor with the highest performance score with attributes similar to the target business may be identified as the benchmark competitor (step 337).

In some embodiments, the system 100 can determine one or more benchmark competitor domain scores. The benchmark competitor domain scores may represent the benchmark competitor's performance in one or more domains. Once the benchmark competitor is identified, the system 100 can acquire data specific to the benchmark competitor, in step 339. The system 100 can process the acquired data to determine one or more benchmark competitor domain scores, in step 341.

Once the system 100 has determined the scores (e.g., initial performance score of the target business, target business domain scores, benchmark performance score of the benchmark competitor, and benchmark competitor domain scores), the system 100 can provide a graphical representation of the results to the user via the website 201. The graphical representation may be in the form of a spider graph, comparative bar graph, or other suitable graphical representation. The graphical representation may allow the user (e.g., a business leader at the target business) to view and understand their business' performance and be able to compare the performance of the target business against the benchmark competitor.

Exemplary Process for Identifying a Benchmark Competitor

Figure 6:
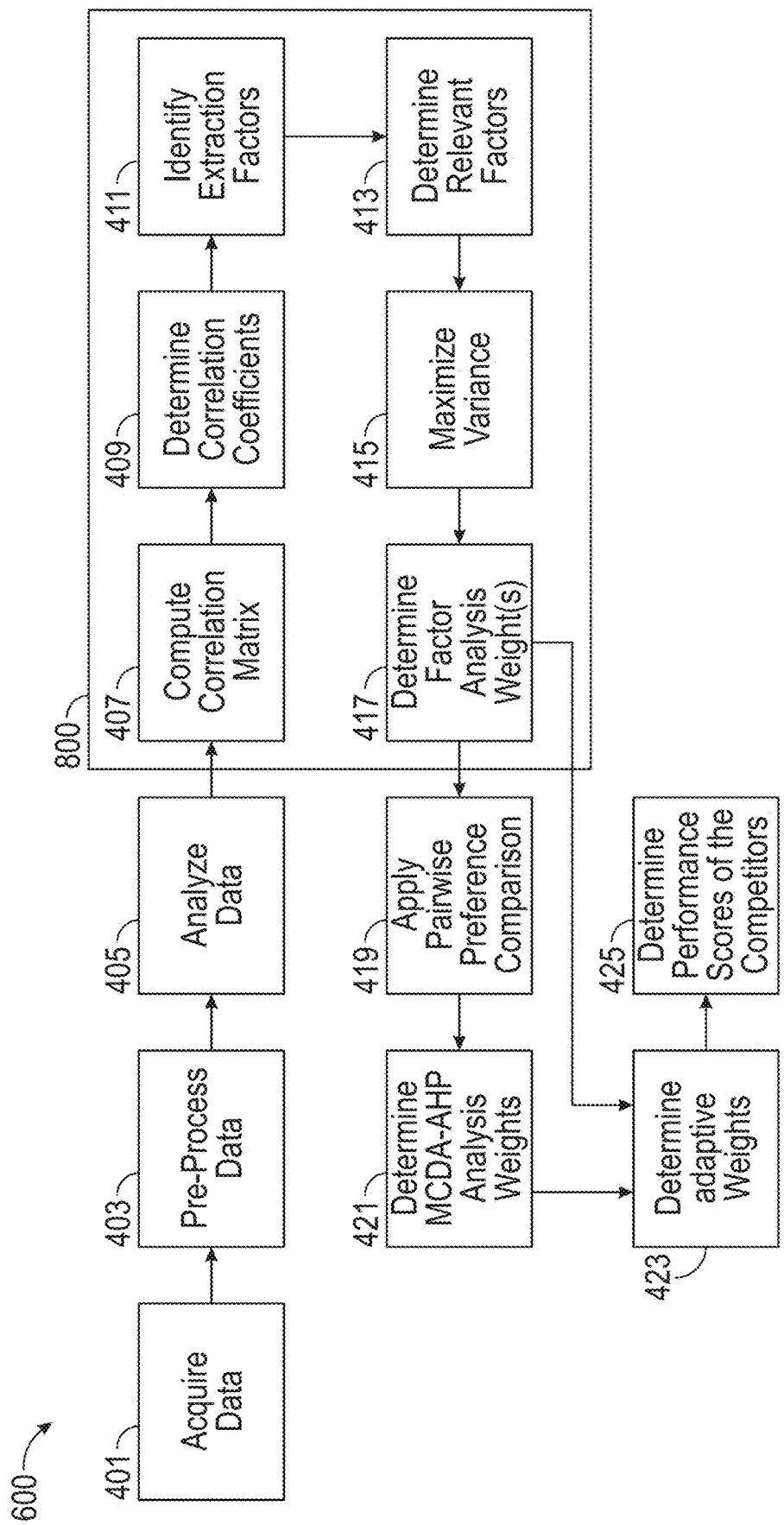
FIG. 6 illustrates a flowchart of an exemplary competitor assessment process, according to embodiments of this disclosure.

FIG. 6 illustrates a detailed flowchart of an exemplary sub-process 600 for determining a performance score of one or more competitors, according to embodiments of this disclosure. Although the process 600 is illustrated as including the described elements, it is understood that different order of elements, additional elements, or fewer elements may be included without departing from the scope of the disclosure.

In some embodiments, the system 100 may not have direct access to information from one or more competitors to determine the performance scores of the competitors. In such instances, the system 100 may acquire the information. In step 401, the system 100 can acquire data (e.g., first data 215) about one or more competitors in the same industry as the target business from third party sources. The industry may be determined based on answers to the introductory questions, provided by the user in step 311. In some embodiments, the first data 215 may be acquired from third party companies that monitor and aggregate information, web scraping, and other data source channels. The first data 215 may be collected, maintained, and stored in the second database 207.

The first data 215 may include information specific to the one or more competitors. Information may include, but is not limited to, size (e.g., number of employees), revenue, business volume, demography, and the like. In some embodiments, the first data 215 may also include multiple performance-related variables of the competitor, where a performance-related variable may refer to an operational area or measurable output of the competitor's business that may impact the overall performance of the competitor's business. In some embodiments, the variables of the first data 215 may depend on available data metrics. In some embodiments, the variables may be based on the information provided by the user during the target business assessment process. In some embodiments, the system 100 can search the second database 207 for information regarding competitors in the same industry as the target business before requesting and collecting the first data 215 from external sources (e.g., third party sources).

In step 403, the system 100 can pre-process (e.g., reformat and clean) the first data 215. In some instances, the first data 215 may not be standardized and may include gaps in the data and/or outliers that can impact the accuracy of processing the first data 215. Embodiments of the disclosure include the system 100 pre-processing the first data 215 to manage outliners, handle missing data, and standardize the first data 215 to be on the same scale (e.g., 1-100, 1-10, etc.), fix structural errors, or a combination thereof. Structural errors may include, but are not limited to, skipped delimiter, duplicate delimiter in a given row, absence of uniqueness in the primary row ID, typos, mislabeled data, same attributes with different name (e.g., "America" and "America" may be handled differently without pre-processing), mixed types (e.g., mixed numerals and strings). In some examples, the first data 215 may be quantitative data. The system 100 can pre-process the quantitative data to standardize each of the variables by the one or more competitors. In some examples, the first data 215 may be qualitative data. In such examples, NLP may be used to quantify and standardize the first data 215.

An exemplary competitor performance data 700 that has been pre-processed in step 403 is shown in FIG. 7. In the example shown in the figure, the target business may be a university. The system 100 may collect data for a number of competitors 710. The data may include general information 715 (e.g., name, country, etc.) as well as data related to variables that impact the competitor-universities' business performance 720 (e.g., teaching, research, citations, industry income, international outlook, etc.).

Although FIG. 7 shows eleven competitors 710 and six variables 720, embodiments of the disclosure may include any number of competitors and any number of variables. For example, the pre-processed data may include over 100 variables 720 related to the competitors 710. In some embodiments, the performance data can include an "overall score" that determined by the third party source. In some embodiments, the "overall score" 720, indicated in the performance data 700 may be different than the competitor performance score determined by the system 100.

Referring back to FIG. 6, once the system 100 pre-processes the first data 215, the system 100 may analyze the data, in step 405. Step 405 may be used to identify the most salient variables that impact the performance scores of the competitors. Identifying the most salient variables may allow the system 100 to reduce noise introduced by unimportant variables, resulting in more accurately interpreted data.

The data analysis (in step 405) may include performing a factor analysis process 800 and performing a MCDA-AHP analysis process (steps 419-421). In some embodiments the factor analysis and the MCDA-AHP analysis may be performed in parallel. The factor analysis process 800 may include steps 407-417 and is discussed in more detail below. The factor analysis process 800 may include computing a correlation matrix (step 407), determining correlation coefficients (step 409), identifying extraction factors (step 411), determining relevant factors (step 413), maximizing variance shared between factors to minimize loading on each factor (step 415), and determining one or more factor analysis weights (step 417). Determining correlation coefficients will be discussed in more detail below.

For the factor analysis process 800, the extraction factors identified in step 411 can be determined by determining the eigenvalues of the factors, creating a screen plot, and the like. In step 413, the relevant factors determined can be based on the eigenvalues. For example, eigenvalues of greater than or equal to a correlation threshold may be considered relevant. In step 415, the maximization of variance can be performed using a factor rotation (e.g., a varimax rotation).

The MCDA-AHP analysis process may include applying a pairwise preference comparison between different variables (step 419) and normalizing the pairwise preference comparison to determine MCDA-AHP analysis weights (step 421). The pairwise preference comparison in step 419 may include performing a comparison between the variables. In step 421, the MCDA-ADP analysis weights can be determined with respect to each variable 720 in the first data 215. The MCDA-ADP analysis weights may be indicative of the relative impact that each variable 720 has on the performance scores of the competitors.

The performance scores of the competitors may be determined using adaptive weights. In step 423, the system 100 may determine adaptive weights based on the factor analysis weights and the MCDA-AHP analysis weights. In step 425, the system 100 may apply the adaptive weights to the pre-processed first data 215 to determine the performance scores of the competitors.

Figure 8:
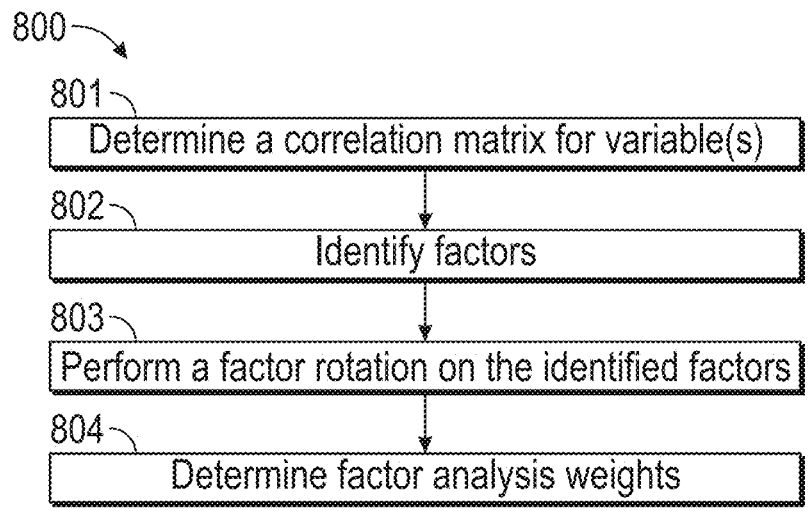
FIG. 8 illustrates a flowchart of an exemplary factor analysis process, according to embodiments of this disclosure.

FIG. 8 illustrates a flowchart of an exemplary factor analysis process 800, according to embodiments of this disclosure. Although the process 800 is illustrated as including the described elements, it is understood that different order of elements, additional elements, or fewer elements may be included without departing from the scope of the disclosure.

The factor analysis process 800 may be performed to filter out irrelevant variables and reduce noise introduced by irrelevant variables. For example, a clean competitor performance data 700 can include a large number of variables 720. In some examples, the number of variables 720 may be large (e.g., exceed fifty or one hundred). Some of the variables 720 in the competitor performance data 700 may be more relevant than others to the performance score of a competitor. To reduce noise introduced by irrelevant variables, the system 100 can perform a factor analysis process 800 to identify relevant variables 720 and assign relative factor analysis weights to the variables 720. For example, variables 720 with a greater impact on the performance score of a competitor can be associated with a higher factor analysis weight.

In step 801, the system 100 can determine a correlation matrix based on the variables 720 included in the cleaned first data 215. The correlation matrix may be indicative of the variance between the variables 720. For example, based on the data provided in Table 1 (below), the correlation matrix can compare the teaching, research, citations, industry income, and international outlook variables 720 for the universities. The correlation matrix may be used to determine which variables 720 are related. For example, a correlation coefficient of 1 may indicate that the variables 720 are highly correlated. A correlation coefficient of 0 may indicate that the variables 720 are not highly correlated. The system 100 can determine the relevant variables 720 by setting a factor threshold for the correlation coefficient.

Variables 720 with a correlation coefficient greater than or equal to the factor threshold may be used in the factor analysis process 800. In some examples, the factor threshold may be between 0.25-0.5. In some embodiments, the Bartlett Test of Sphericity and the Kaiser-Meyer-Olkin (KMO) measure of sampling adequacy may be used to test the accuracy of the correlation matrix.

In step 802, the system 100 may identify factors underlying the variables 720. In some embodiments, the factors can be a numerical representation of the relationship between the variables 720. Estimates of the factors may be obtained using, for example, eigenvalues, a scree plot, and the like. Table 1 shows an example of five eigenvalues determined from five variables 720 (teaching, research, citations, industry income, and international outlook) for the respective competitor performance data 700 (shown in FIG. 7). A higher eigenvalue indicates that the factor is more predictive of the relationship between the variables 720. Factors with an eigenvalue above a pre-determined correlation threshold may be selected and used in subsequent steps of the factor analysis process 800. In some examples, the correlation threshold may be greater than or equal to one, greater than or equal to 1.0-0.75, etc. In the example shown in Table 1, the pre-determined correlation threshold can be greater than or equal to 0.9. Factors 1 and 2 are above the predetermined correlation threshold and are used in the next step 803 of the factor analysis process 800.

TABLE 1

| Factor | Eigenvalue |
| --- | --- |
| 1 | 3.09214 |
| 2 | 0.985964 |
| 3 | 0.555588 |
| 4 | 0.371948 |
| 5 | 0.077287 |

In step 803, the system 100 may perform a factor rotation on the identified factors. The factor rotation can enable the system 100 to be more readily and meaningfully interpret the factors. For example, the system can apply a Varimax rotation to the factors. The Varimax rotation may apply orthogonal rotations, which results in maximizing the square of the variances. The rotation can minimize the number of variables 720 that have high loadings on a factor, thereby enhancing the interpretability of the factors. In some examples, the system 100 can interpret a factor by examining the largest values linking the factor to the measured variables 720 in the rotated factors.

TABLE 2

| Variables | Factor 1 | Factor 2 |
| --- | --- | --- |
| Teaching | 0.804104 | 0.377571 |
| Research | 0.879805 | 0.488158 |
| Citations | 0.264200 | 0.803559 |
| Industry Income | 0.522393 | 0.072550 |
| International Outlook | 0.194364 | 0.668968 |

Table 2 (above) provides the values from a factor rotation of factors 1 and 2. Factors 1 and 2 in Table 2 may correspond to factors 1 and 2 of Table 1, and the variables 720 in Table 2 may correspond to the five variables 720 shown in FIG. 7. As seen in Table 2, factor 1 is most strongly linked with the teaching and research variables, while factor 2 is most strongly linked with the citations variable and somewhat linked to the international outlook variable.

The system 100 can also determine the variance of the factors. The variance corresponds to the amount of variation between the variables 720 of each factor. Variables 720 that are highly correlated may have a higher variance. For example, as shown in Table 3 (below), factor 1 has a higher variance than factor 2. The system 100 may also determine the proportional variances and the cumulative variances of factors 1 and 2, as shown in Table 3.

TABLE 3

|  | Factor 1 | Factor 2 |
| --- | --- | --- |
| Variance (SS loadings) | 1.801114 | 1.479347 |
| Proportional Variance | 0.360223 | 0.295869 |
| Cumulative Variance | 0.360223 | 0.656092 |

In step 804, the system can transform and apply the variance to the factors to determine the factor analysis weights. The variance shown in Table 3 can be expressed in terms of deviations from the mean. In some instances, the variance cannot be directly applied to the variables of factor 1 and factor 2. The system 100 can apply a transformation function to the variance of each variable 720 to normalize the values. A normalized variance value may represent a number on a scale having a minimum value of zero. In some embodiments, the factor transformation applied to the variances can be represented as:

$$f(F_i) = \begin{cases} 1 + \dfrac{k-1}{2} e^{F_i} & si\, F_i < 0 \\ k + \dfrac{k-1}{2} e^{-F_i} & \text{in another way} \end{cases} \quad (1)$$

The system 100 can apply representation (1) to perform the factor transformation, where k is a variance and $F_i$ is a coefficient for a variable 720 of a factor. Table 4 shows the factor transformation applied to factor 1 and factor 2 in the university example.

TABLE 4

| Variables | Factor 1 | $f(F_1)$ | Factor 2 | $f(F_2)$ | Weighted Sum |
| --- | --- | --- | --- | --- | --- |
| Teaching | 0.804104 | 99.98 | 0.377571 | 65.81 | 55.08 |
| Research | 0.879805 | 79.21 | 0.488158 | 69.37 | 48.63 |
| Citations | 0.264200 | 61.81 | 0.803559 | 77.75 | 44.80 |
| Industry Income | 0.522393 | 70.57 | 0.072550 | 53.74 | 40.99 |
| International Outlook | 0.194364 | 59.06 | 0.668968 | 74.41 | 42.84 |

The system 100 can apply the factor transformation to determine a weighted variable value for each of the relevant variables 720. Referring to Table 4, the system 100 can determine a weighted variable value or weighted sum by taking the sum of each factor transformation (e.g., f(F$_1$), f(F$_2$), etc.) and multiplying by the corresponding proportional variance for each variable 720.

$$I_{AFM} = \sum_{i=1}^{p} f(F_i) \times \frac{\text{Variance Explained per } F_i}{\text{Total Variance}} \quad (2)$$

For example, to determine the weighted sum for the teaching variable 720, the factor transformation for factor 1 f(F$_1$) can be multiplied by its corresponding factor 1 proportional variance (0.36) to result in a first value. The factor transformation for factor 2 $f(F_2)$ can be multiplied by its corresponding factor 2 proportional variance (0.29) to result in a second value. The first value can be added to the second value to generate the following weighted sum:

Weighted Sum=0.36*0.804104+ 0.29*0.377571=55.08.

The system 100 can determine the factor analysis weights based on the weighted sum.

In some embodiments, the system 100 can determine the factor analysis weights by dividing the weighted sum of a variable 720 by the total weighted sum of the variables 720 multiplied one hundred. Table 5 provides the factor analysis weights determined for each of the variables 720.

TABLE 5

| Variables | Factor Analysis Weights |
| --- | --- |
| Teaching | 24% |
| Research | 21% |
| Citations | 19% |
| Industry Income | 18% |
| International Outlook | 18% |

In some embodiments, a MCDA-AHP analysis may be performed to determine a second set of weights (i.e., MCDA-AHP analysis weights) using MCDA integrated with AHP. MCDA can be used to evaluate multiple interactive and, in some cases, conflicting variables in decision making. For example, alternative variables in decision making may include cost and quality. In some situations, the cost may conflict with the quality. For example, a business may aim to lower costs while maintaining high quality results, but maintaining high quality may result in higher costs. MCDA provides a framework that can be used to partition the issue into smaller, manageable blocks. The smaller blocks can be analyzed, and the analysis can be integrated to provide a solution. AHP can be used to quantify the MCDA-AHP analysis weights of the variables 720 and its impact on the performance score of a competitor. The framework provided by MCDA and AHP provides a basis for the MCDA-AHP analysis process.

Referring to back to FIG. 6, the MCDA-AHP analysis process includes performing a pairwise preference comparison between the variables (in step 419) and determining MCDA-AHP analysis weights based on the pairwise preference comparison (in step 421). Variables can be identified in a hierarchical manner (e.g., ranked). Ranking the variables provides a way to filter out variables that may not strongly impact the performance score of a competitor. As explained above, there may be a large number of variables 720 included in the competitor performance data 700, and reducing the number of variables 720 (e.g., to the most meaningful variables 720) may enhance the accuracy of the analysis.

In some examples, the hierarchy may be determined based on answers provided by the user during the self-assessment step (e.g., step 313). As discussed above, the self-assessment can include questionnaire having a number of fact-gathering questions and domain-weighing questions. While the fact-gathering questions can be used to determine specific facts and attributes of the target business, the domain-weighing questions can be used to determine the importance of various domains and variables. In this manner, the MCDA-AHP analysis weights are customizable to a competitor. This customization allows an apples-to-apples comparison of variables 720 considered to be of importance to the target business. In some embodiments, ranking the variables may involve subject matter expert (SME) opinions and/or based on responses to the fact gathering questions from the target business assessment 310. In some examples, the initial variables in the MCDA-AHP analysis may be the variables with a correlation coefficient above the correlation threshold as discussed in step 802.

The system 100 can evaluate the relevant variables 720 (identified in step 409) using a pairwise preference comparison approach. The pairwise preference comparison approach compares values of relative importance between each pair of variables 720 and stores this comparison in a comparison matrix. Table 6 (below) shows an exemplary pairwise preference comparison matrix after applying a pairwise preference comparison to the competitor performance data 700 (of FIG. 7).

TABLE 6

| | Teaching | Research | Citations | Industry Income | International Outlook |
| --- | --- | --- | --- | --- | --- |
| Teaching | 1.000000 | 1.000000 | 1.000000 | 9.000000 | 4.00 |
| Research | 1.000000 | 1.000000 | 1.000000 | 9.000000 | 4.00 |
| Citations | 1.000000 | 1.000000 | 1.000000 | 9.000000 | 4.00 |
| Industry Income | 0.111111 | 0.111111 | 0.111111 | 1.000000 | 0.33 |
| International Outlook | 0.250000 | 0.250000 | 0.250000 | 3.030303 | 1.00 |

Once the pairwise preference comparison matrix is determined, the pairwise preference comparison can be normalized. Normalization may be performed to scale the pairwise preference comparison matrix values to a scale of 0 to 1. Relationship (3) can be applied to the values in the comparison matrix to produce a normalized pairwise preference comparison matrix.

$$A_{normalized} \; \text{area}'_{ij} = \frac{a_{ij}}{\sum_{i=1}^{n} a_{ij}} \; \text{for } j = 1, 2 \quad (3)$$

Table 7 illustrates a normalized pairwise preference comparison matrix based on the values of the comparison matrix provided in Table 6.

TABLE 7

|  | Teaching | Research | Citations | Industry Income | International Outlook | Rsum | Vector |
|---|---|---|---|---|---|---|---|
| Teaching | 0.297521 | 0.297521 | 0.297521 | 0.290039 | 0.300075 | 1.482676 | 0.296535 |
| Research | 0.297521 | 0.297521 | 0.297521 | 0.290039 | 0.300075 | 1.482676 | 0.296535 |
| Citations | 0.297521 | 0.297521 | 0.297521 | 0.290039 | 0.300075 | 1.482676 | 0.296535 |
| Industry Income | 0.033058 | 0.033058 | 0.033058 | 0.032227 | 0.024756 | 0.156156 | 0.031231 |
| International Outlook | 0.074380 | 0.074380 | 0.074380 | 0.097656 | 0.075019 | 0.395816 | 0.079163 |

Pairwise weights for each of the variables 720 may be determined based on the normalized pairwise preference comparison matrix. Based on the normalized values, the system 100 can determine a priority vector. The priority vector may correspond to the MCDA-AHP analysis weights. The priority vector can be determined from the normalized pairwise preference comparison matrix using relationship (4). The values of the priority vector for Table 7 is shown in the Vector column.

Figure 9:
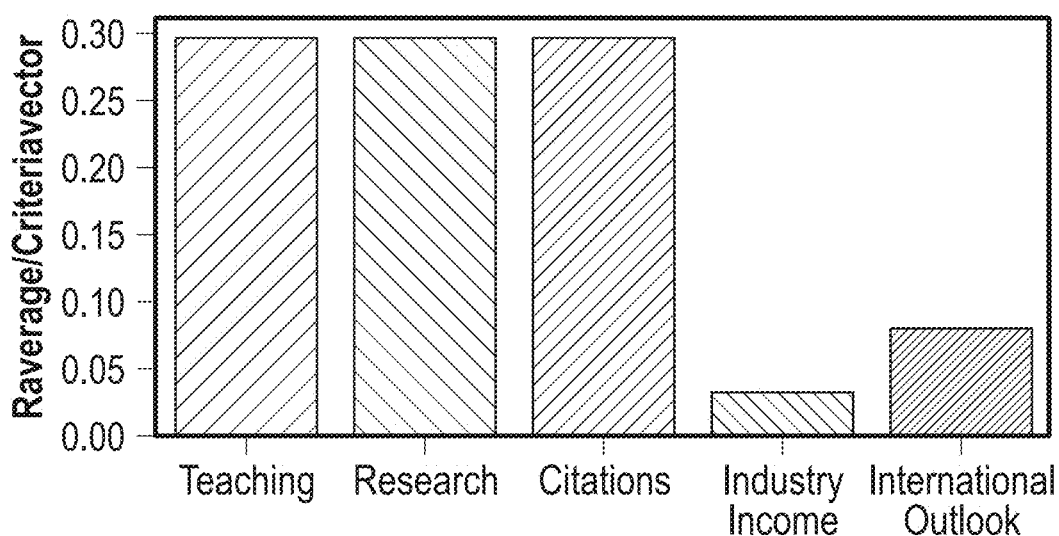
FIG. 9 illustrates a graphical representation of an exemplary priority vector, according to embodiments of this disclosure.

FIG. 9 illustrates a graphical representation of an exemplary priority vector, illustrating the relative magnitude of the pairwise weights of each of the factors.

$$v_i = \frac{\sum_{j=1}^{n} a'_{ij}}{n} \text{ for } i = 1, 2, \ldots, n \tag{4}$$

Referring back to FIG. 6, once the factor analysis weights and the MCDA-AHP analysis weights have been determined using the factor analysis process 800 (steps 407-417) and the MCDA-AHP analysis process (steps 419-421), respectively, the system 100 can determine the adaptive weights, in step 423. In step 425, the adaptive weights may be applied to the variables 720 for each competitor to determine the respective performance score. In some examples, the adaptive weights can be determined by taking the mean of the factor analysis weights and the MCDA-AHP analysis weights.

Table 8 shows exemplary factor analysis weights, MCDA-AHP analysis weights, and adaptive weights for variables 720 of the university example (discussed above). As shown in the table, each adaptive weight may be equal to the average of a corresponding factor analysis weight and a corresponding MCDA-AHP analysis weight.

TABLE 8

| Variables | Factor Analysis Weights | MCDA-AHP Analysis Weights | Adaptive Weights |
|---|---|---|---|
| Teaching | 24% | 30% | 0.27 |
| Research | 21% | 29.50% | 0.25 |

TABLE 8-continued

| Variables | Factor Analysis Weights | MCDA-AHP Analysis Weights | Adaptive Weights |
|---|---|---|---|
| Citations | 19% | 29.50% | 0.24 |
| Industry Income | 18% | 3% | 0.11 |
| International Outlook | 18% | 8% | 0.13 |

In some examples, the factor analysis weights may be considered more important than the MCDA-AHP analysis weights, and such importance may be reflected by using a scaling factor. For example, the factor analysis weights may be multiplied by a first scaling factor (e.g., 1-5). In some embodiments, the MCDA-AHP analysis weights may be also multiplied by a (second) scaling factor (e.g., 1-5). The first scaling factor, second scaling factor, or both may be used before taking the average. The factor analysis weights or the MCDA-AHP analysis weights may be given more importance based on the scaling factors.

In some examples, additional analyses can be used to determine any of the above discussed weights for the variables 720. In such examples, the average of the weights across all the analyses may be taken.

In step 425, the performance score for each competitor can be determined using the adaptive weights determined in step 423. The performance score can be determined using relationship (5), for example.

$$\bar{x} = \frac{\sum_{i=1}^{n} w_i \cdot x_i}{\sum_{i=1}^{n} w_i} = \frac{w_1 x_1 + w_2 x_2 + \ldots + w_n x_n}{w_1 + w_2 + \ldots + w_n} \tag{5}$$

The system 100 may apply a weighted average $\bar{x}$, which may be equal to the sum of the product of the adaptive weight for a particular variable $w_i$ times the corresponding value $x_i$ for each variable 720 divided by the sum of the weights. The weighted average $\bar{x}$ may be used to determine the performance score of a competitor. Table 9 shows the performance scores for competitors 710 using the competitor performance data 700.

TABLE 9

|  | Teaching | Research | Citations | Industry Income | International Outlook | Benchmark Score |
|---|---|---|---|---|---|---|
| U of Oxford | 90.5 | 99.6 | 98.4 | 65.5 | 96.4 | 4.63 |
| Cal IT | 92.1 | 97.2 | 97.9 | 88 | 82.5 | 4.65 |
| U of Cambridge | 91.4 | 98.7 | 95.8 | 59.3 | 95 | 4.56 |
| Stanford U | 92.8 | 96.4 | 99.9 | 66.2 | 79.5 | 4.54 |
| MIT | 90.5 | 92.4 | 99.5 | 86.9 | 89 | 4.63 |
| Princeton | 90.3 | 96.3 | 98.8 | 58.6 | 81.1 | 4.5 |
| Harvard | 89.2 | 98.6 | 99.1 | 47.3 | 76.3 | 4.33 |

TABLE 9-continued

|  | Teaching | Research | Citations | Industry Income | International Outlook | Benchmark Score |
|---|---|---|---|---|---|---|
| Yale | 92 | 94.8 | 97.3 | 52.4 | 68.7 | 3.99 |
| U of Chicago | 89.1 | 91.4 | 96.7 | 52.7 | 76 | 4.31 |
| Imperial College London | 84.5 | 87.6 | 97 | 69.9 | 97.1 | 4.54 |
| U of Penn | 87.5 | 90.4 | 98.2 | 74 | 65 | 4.19 |

The performance scores for the competitors 710 may be used to identify the benchmark competitor. In some embodiments, the system 100 may select the competitor with the highest performance score as the benchmark competitor. For example, based on the determined performance scores shown in Table 9, California Institute of Technology may be selected as the benchmark competitor.

Referring back to FIG. 5, in some examples, the system 100 may determine attributes of a target business (step 333). As discussed above, the attributes of the target business can be identified using information from the introductory questions and/or self-assessment steps (step 311 and/or step 313). The competitors that do not share attributes similar to the target business may be eliminated from a selection pool.

Using the university example, attributes such as size and location of the university may be used to narrow the selection pool. A skilled artisan will understand that a number of other attributes may also be used. In some embodiments, the system 100 can apply heuristic rules (step 335). For example, a condition such as "all the attributes should match" may be applied. If no data match is found, the attribute match can be relaxed on one attribute at a time until there is a match. In some embodiments, attributes determined as being less relevant to business performance may be relaxed before others. For example, in some industries, the location attribute may be determined to be less relevant to performance. In this manner, the system 100 can maximize the number of relevant attributes between the target organization and the benchmark competitor. Narrowing the selection pool based on the target university's attributes may provide a stronger comparison than identifying the benchmark competitor based on the highest performance score. In this manner, the identified benchmark competitor may be compared to the target business using an apples-to-apples comparison.

In some examples, the selection pool may be determined at step 321 where data about the competitor is acquired. In such examples, the competitors identified in a competitor performance data 700 may be representative of competitors with similar attributes to the target business.

Figure 10:
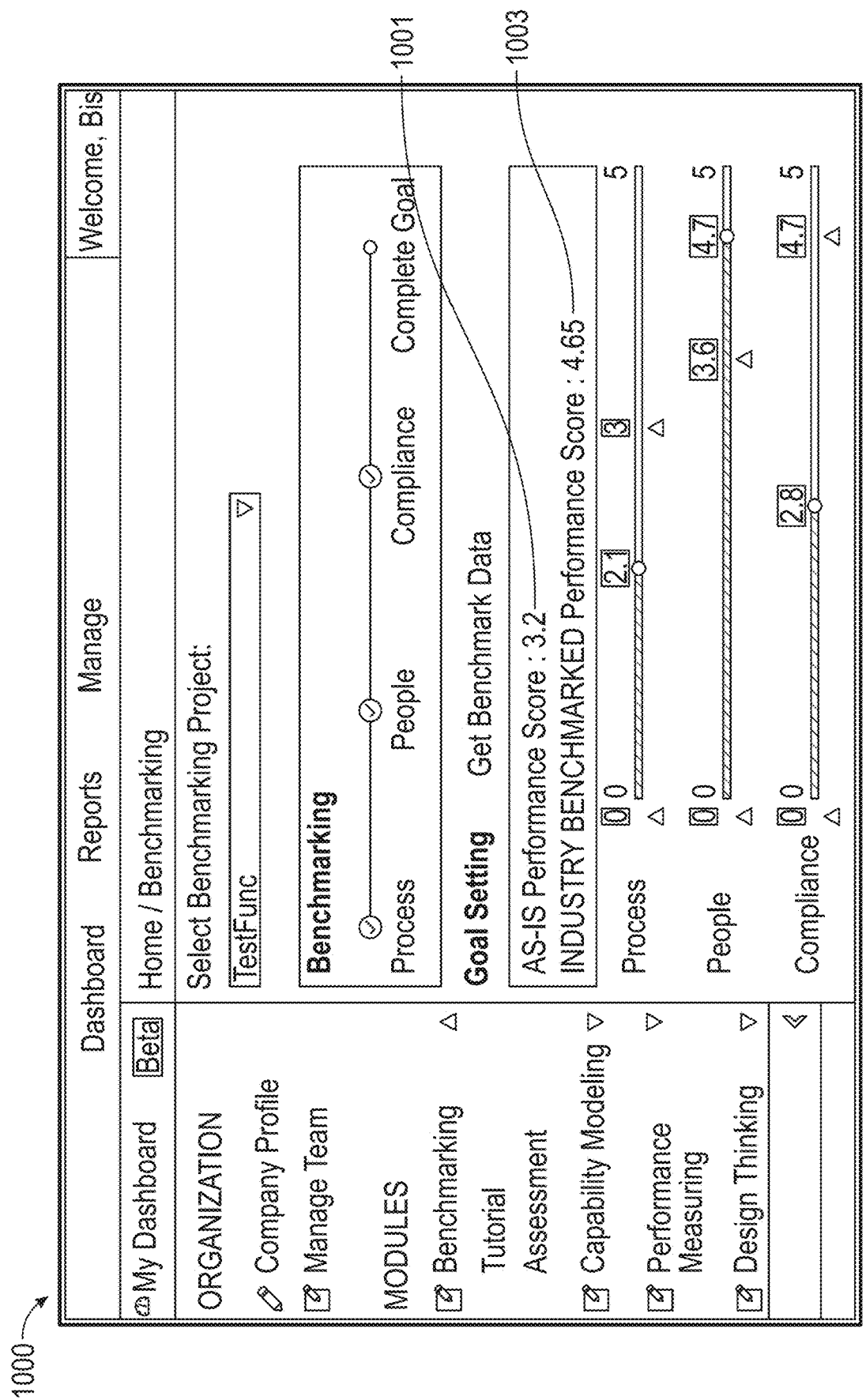
FIG. 10 illustrates an exemplary user interface, according to embodiments of this disclosure.

Embodiments of the disclosure may include presenting the identified benchmark competitor via the website 201. FIG. 10 illustrates an exemplary UI 1000 of a website 201, according to embodiments of this disclosure. The UI 1000 may display the initial performance score of the target business 1001 as well as the benchmark performance score of the benchmark competitor 1003.

Exemplary Process for Determining Benchmark Competitor Domain Scores

As discussed above, the system 100 can identify a benchmark competitor and the benchmark performance score of a benchmark competitor. The system 100 can also determine one or more benchmark competitor domain scores for one or more domains. As discussed above, a user (e.g., of the target business) may answer questions so that the system can determine one or more target business domain scores. The system may not have a similar direct line of communication with the identified benchmark competitor. For example, the identified benchmark competitor may not have completed a self-assessment. As a result, the system 100 may need to collect and process data regarding the identified benchmark competitor to determine the benchmark competitor domain scores.

The domains may correspond to areas of a business that can be correlated to the overall performance of the business. For example, the domains can include company culture, technology, facilities, inventory, procurement, compliance, academics, placement, and the like. In some examples, domains may be classified based on research of industry processes provided by a SME. As discussed above, domains may include industry domains (e.g., domains specific to a particular industry) and common domains (e.g., domains common to more than one industry).

Figure 11:
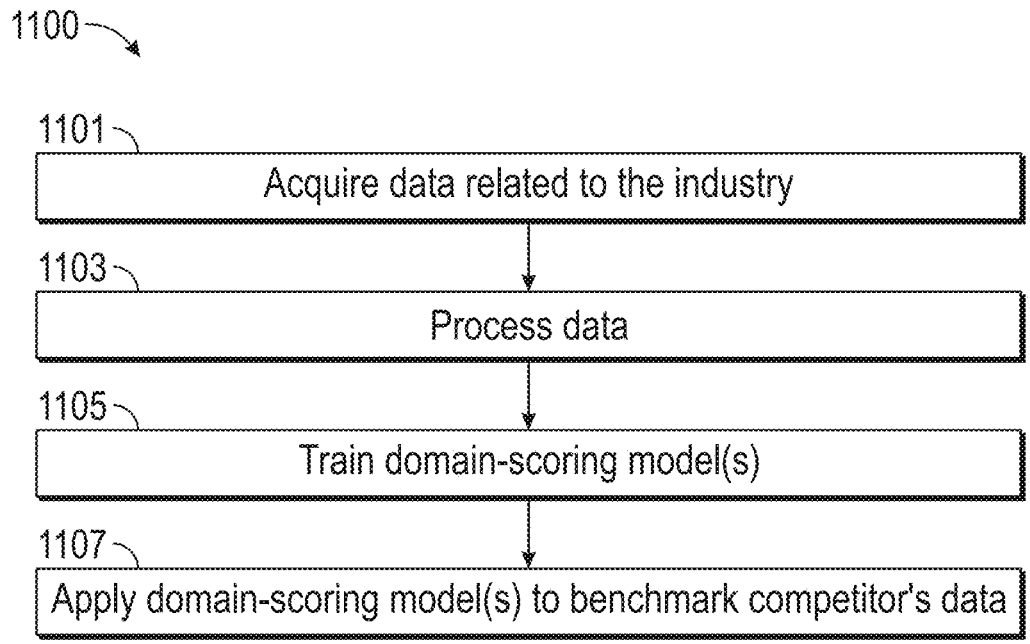
FIG. 11 illustrates a flowchart of an exemplary competitor assessment process, according to embodiments of this disclosure.

FIG. 11 illustrates a detailed flowchart of an exemplary sub-process 1100 for determining one or more benchmark competitor domain scores, according to embodiments of this disclosure. Although the process 1100 is illustrated as including the described elements, it is understood that different order of elements, additional elements, or fewer elements may be included without departing from the scope of the disclosure.

In step 1101, the system 100 can acquire data (e.g., first data 215) related to the industry of the target business and the identified benchmark competitor. The first data 215 may be acquired from third party data sources, web scraping, etc., for example. The first data 215 may be collected, maintained, and stored in the second database 207. The first data 215 may include quantitative, as well as qualitative data, specific to competitors (including the benchmark competitor determined in step 337) in the industry. In some examples, the first data 215 may include reviews, complaints, ratings, data providers industry raw data, and the like.

In step 1103, the acquired first data 215 can be processed (e.g., classified and structured) according to keywords and positive or negative sentiments. In step 1105, the system can use the processed first data 215 to train domain-scoring model(s). The trained domain-scoring model(s) can be applied and used to determine the benchmark competitor domain scores based on the first data 215, in step 1107.

Figure 12:
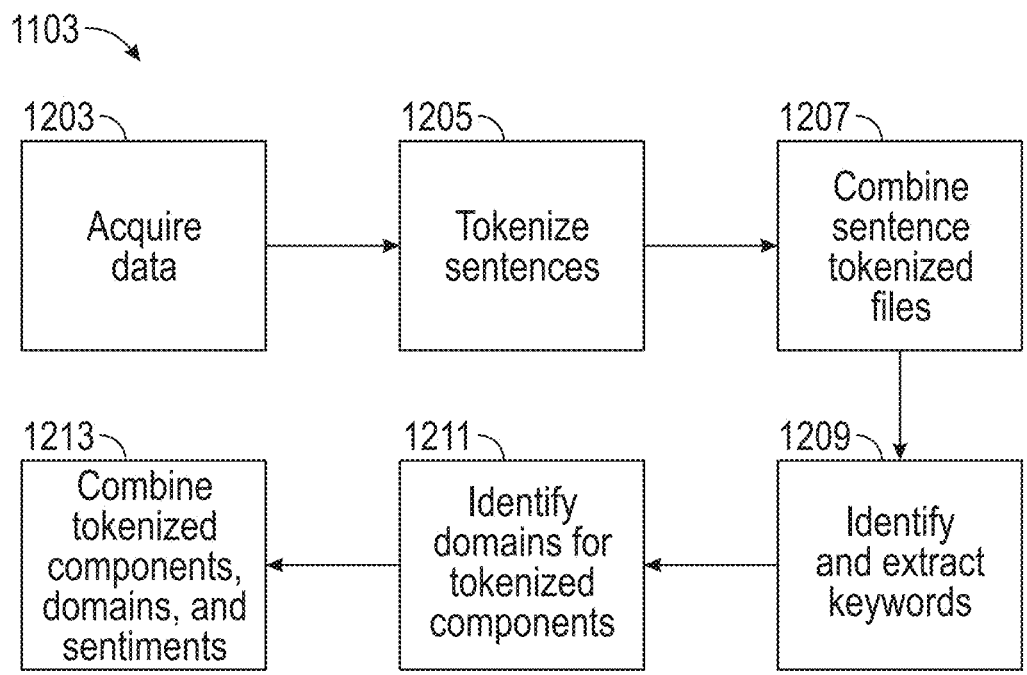
FIG. 12 illustrates a flowchart of an exemplary competitor assessment process, according to embodiments of this disclosure.

FIG. 12 illustrates a more detailed flowchart of an exemplary process 1103 for processing the first data 215. Although the process 1103 is illustrated as including the described elements, it is understood that different order of elements, additional elements, or fewer elements may be included without departing from the scope of the disclosure.

In step 1203, the system can acquire the data (e.g., first data 215) related to competitors. The acquired data may be in the form of an unstructured data file, for example. For example, the first data 215 may include a qualitative review written about the competitor.

FIGS. 13A and 13B illustrate exemplary unstructured data files 1301 and 1303, according to embodiments of this disclosure. An unstructured data file can include qualitative reviews written about a business (e.g., a university). The unstructured files 1301 and 1303 may be processed, as described above with respect to FIG. 12, and converted into a structured data file.

Referring back to FIG. 12, in step 1205, the system 100 can tokenize the unstructured data file by sentence. The tokenized files can be combined to form components of a structured data file, in step 1207. The tokenized components may include reviews. Each of the tokenized files can form components of the structured data file.

Figure 14:
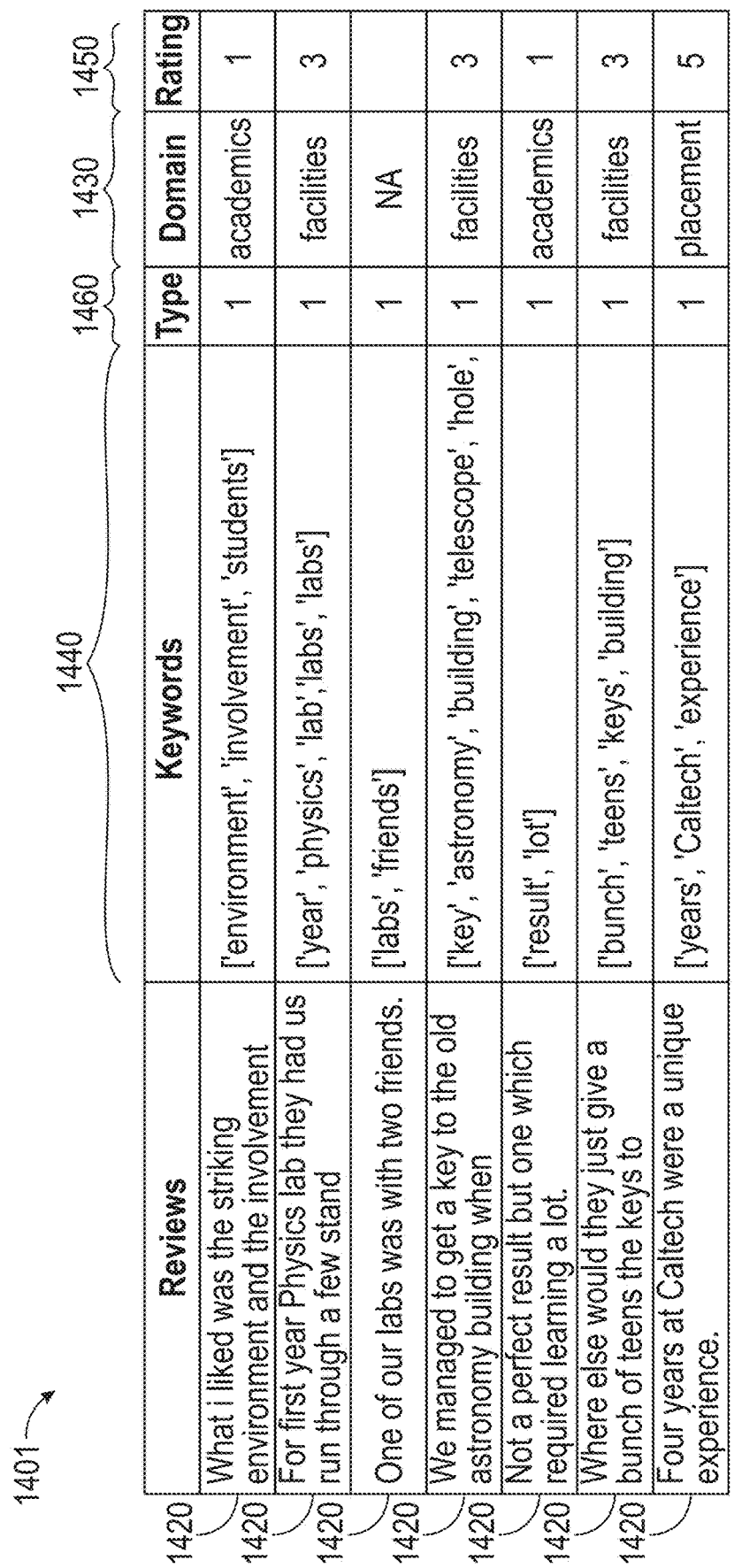
FIG. 14 illustrates exemplary data, according to embodiments of this disclosure.

FIG. 14 illustrates an exemplary structured data file 1401, according to embodiments of this disclosure. In this example, the structured data 1401 can correspond to the unstructured data file 1301. As shown in FIG. 14, a structured data file 1401 can include one or more of tokenized components 1420 (e.g., rows of structured data), domains 1430, extracted keywords 1440, ratings 1450, and type 1460. The tokenized components 1420 can each be classified by domains 1430 based on keywords 1440. The tokenized components may further be associated with a type 1460 and a rating 1450. The type may refer to whether the tokenized component has a positive or negative sentiment (e.g., positive sentiment is (1) and negative sentiment is (0)). The rating may refer to a domain sentiment value. For example, as shown in FIG. 14, "0" corresponds to an academic domain with a negative sentiment, "1" corresponds to an academic domain with a positive sentiment, 2 corresponds to a facilities domain with a negative sentiment, 3 corresponds to a facilities domain with a negative sentiment, etc. The ratings may be used by the system to process each tokenized component 1420 and to determine the domain scores in step 1811.

Referring back to FIG. 12, the system 100 can search the tokenized components for specific keywords. In step 1209, the system can identify and extract the keywords for each tokenized component by performing a keyword search. The keywords in the structured data file can be identified and extracted. In some embodiments, the system may access a keyword file to be used for performing the keyword extraction based on keyword(s) provided in the keyword file.

FIG. 15 illustrates an exemplary keyword file 1570. The keyword file 1570 includes the keywords associated with each domain. As shown in the figure, the exemplary domains for the target business can include at least academics, facilities, and placement. As discussed above, the keywords can be used to associate a tokenized component 1420 of the structured data file 1401 with a domain 1430. In some embodiments, keyword files may be generated by synonym search, semantic matches for domain names, input from SMEs, and the like. In some embodiments, one or more domains 1430 may be identified using one or more keywords. The keywords file can be maintained in the second database 207 of the system, for example.

Referring back to FIG. 12, in step 1211, each tokenized component can be associated with one or more domains. Once the domains are identified, the system 100 can combine the tokenized components. In step 1213, the system 100 can combine the tokenized components with the domains 1430 and sentiments to produce a structured data file 1401. In some embodiments, sentiments (e.g., positive or negative sentiments) can be associated with each tokenized component. For example, a positive sentiment can correspond to a positive review. A negative sentiment can correspond to a negative review.

Referring back to FIG. 13A, the unstructured data file 1301 may include a positive sentiment about a university. The unstructured data file 1303 may include a negative sentiment about the university. In some embodiments, the system 100 may use separate positive sentiment and negative sentiment data files. The system may indicate the type of (e.g., positive or negative) sentiment in the type column 1460 of data structured data file 1401.

Figure 16:
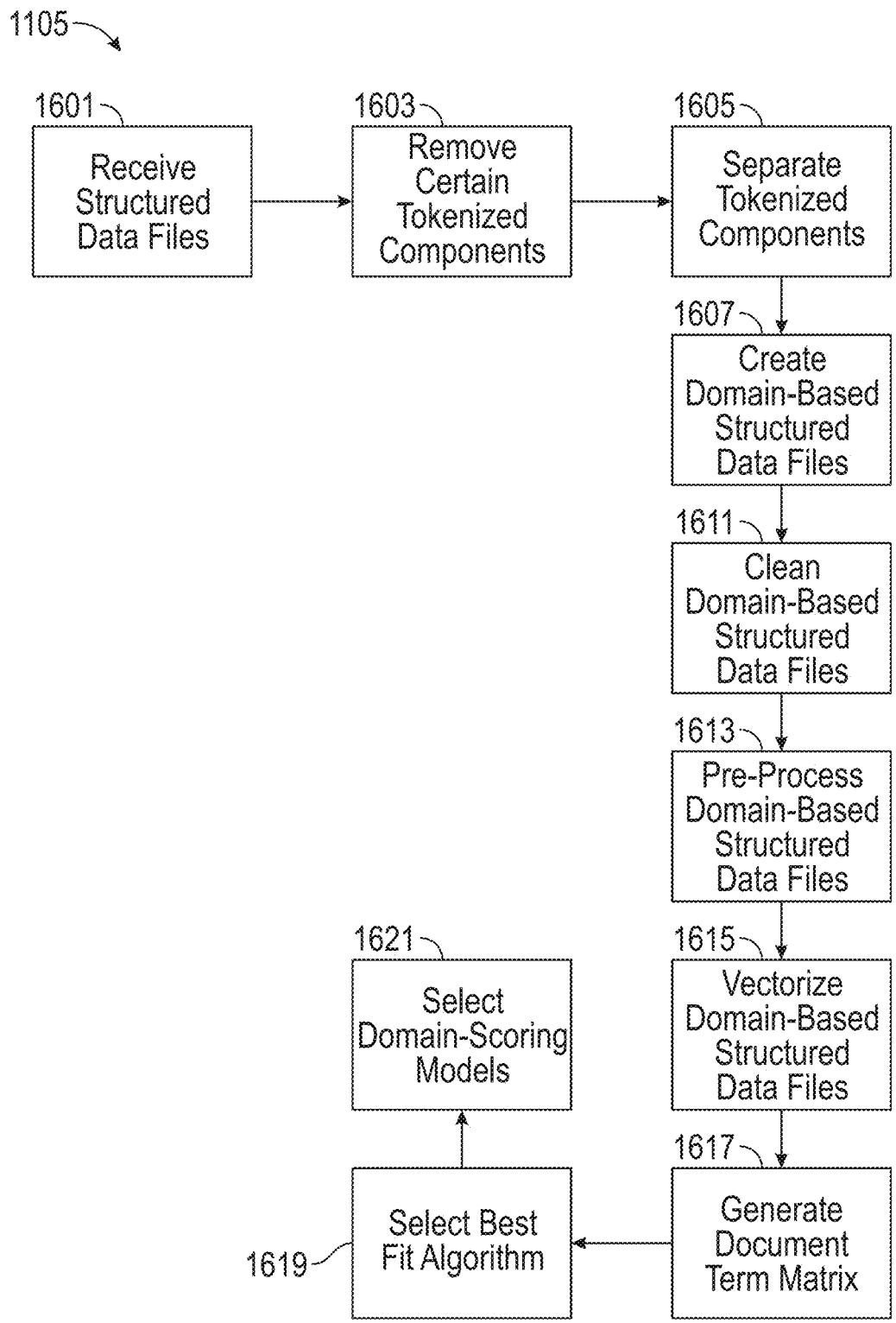
FIG. 16 illustrates a flowchart of an exemplary competitor assessment process, according to embodiments of this disclosure.

The structure data file 1401 can be used to train the domain-scoring models to determine benchmark competitor domain scores and/or to predict sentiments (e.g., positive or negative sentiments). FIG. 16 illustrates a flowchart of an exemplary training process 1105 for training domain-scoring models, according to embodiments of this disclosure. In some embodiments, each domain 1430 may be associated with its own domain-scoring model. Training a domain-scoring model can include an iterative process that may be repeated for each new set of training data related to the industry (e.g., a set of structured data files 1401). Although the process 1105 is illustrated as including the described elements, it is understood that different order of elements, additional elements, or fewer elements may be included without departing from the scope of the disclosure.

In step 1601, the system may receive structured data files 1401 that identify the domains and sentiments for each tokenized component 1420. The received structured data files 1401 may be used to train the domain-scoring model. In some embodiments, the structured data file 1401 may be associated with one or more non-benchmark competitors. In some embodiments, the structured data files 1401 may be associated with the benchmark competitor selected in step 337. In some embodiments, the structured data file 1401 may be associated with the target business' industry. In step 1603, the system can remove tokenized components 1420 that do not include a domain and/or sentiment. The remaining tokenized components 1420 may each be associated with one or more domains.

In step 1605, the tokenized components 1420 can be separated based on domains. In step 1607, one or more domain-based structured data files can be created. FIGS. 17A-17C illustrate exemplary domain-based structured data files 1707A, 1707B, and 1707C, according to embodiments of this disclosure. Referring to FIG. 17A, the domain-based structured data file 1707A corresponds to a structured data file for the placement domain. The domain-based structured data file 1707A can include the tokenized components, keywords, types, domains, and ratings, as shown in the figure.

Referring back to FIG. 16, each of the domain-based structure data files may be cleaned (step 1611), pre-processed (step 1613), and vectorized (step 1615). In some examples, the data from the domain-based structured data files can be cleaned and self-healed to enhance the accuracy of the domain-scoring models. Data from the vectorized domain-based structure data files can be used to generate a document term matrix, in step 1617.

In step 1619, the system 100 may dynamically select a best fit algorithm to train the domain-scoring models. The best fit algorithm may be selected based on one or more factors, such as accuracy, the data point set, computational costs, and functionality. The best fit algorithm may include, for example, logistic regression, decision trees, random forests, naïve Bayes, support vector machines, neural networks, and the like. In step 1621, the selected best fit algorithm may create and/or select one or more domain-scoring models.

FIG. 18 illustrates a more detailed flowchart of step 1107, where the domain-scoring models may be applied to a benchmark competitor's data, according to embodiments of this disclosure. Although the process 1107 is illustrated as including the described elements, it is understood that different order of elements, additional elements, or fewer elements may be included without departing from the scope of the disclosure.

In step 1801, the system 100 can receive data (e.g., first data 215) related to the benchmark competitor. In some embodiments, the first data 215 may be raw or unstructured data. For example, the first data 215 may include a review, qualitative description, and the like, written about the benchmark competitor.

FIG. 19 illustrates an exemplary unstructured data file 1901 about a benchmark competitor, according to embodiments of this disclosure. The exemplary unstructured data 1901 can be a qualitative description written about the benchmark competitor.

Referring back to FIG. 18, in step 1803, the unstructured data can be tokenized by sentences and combined into a structured data file. Each of the tokenized data may form components of the structured data file.

Figure 20:
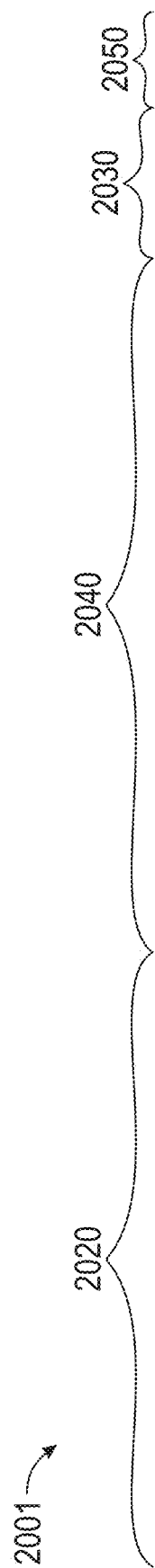
FIG. 20 illustrates exemplary data, according to embodiments of this disclosure.

FIG. 20 illustrates exemplary structured data 2001, according to embodiments of this disclosure. Structured data 2001 can be data corresponding to the unstructured data 1901 that has been processed. As shown in the figure, the structured data file 2001 can include one or more of tokenized components 2020, domains 2030, extracted keywords 2040, and ratings 2050.

Referring back to FIG. 18, in step 1805, the system 100 can identify and extract the keywords 2040 for each tokenized component 2020. The keyword search and extraction may be based on keywords provided in a keyword file (e.g., keyword file 1570). In step 1807, each tokenized component can be associated with one or more domains 2030. In step 1809, the system 100 can perform a sentiment analysis of the data. The sentiment analysis may be comprise applying the domain-scoring models selected in step 1621. In some embodiments, the system 100 can perform a separate sentiment analysis for each domain. In some embodiments, the output of the sentiment analysis can include a structured data file that includes the domains and sentiments of each tokenized component of the structured data.

In step 1811, the system 100 can determine the benchmark competitor domain scores. In some embodiments, the system 100 can apply relationships (6) and (7) to the structured domain and sentiment data to determine the benchmark competitor domain scores.

$$TSI = \frac{p}{n} \quad (6)$$

$$\text{Domain Score} = \begin{cases} p + (TSI * tp) \\ p - (TSI * tn) \end{cases} \quad (7)$$

where TSI is the sentiment index, p is the mid-point of the scale of the domain score (e.g., 1-5, 1-1-10, 1-100, etc.), n is the total number of tokenized components, tp is the total number of positive sentiment components, and to is the total number of negative sentiment tokens.

Table 10 shows the domain scores determined based on the structured data 2001. The domain scores shown in Table 10 are based on a 5 point score.

TABLE 10

| Domain | Score |
|---|---|
| Academics | 3.78 |
| Facilities | 1.02 |
| Placement | 5 |

As discussed above, the system 100 can provide a graphical representation of the results (e.g., initial performance score of the target business, target business domain scores, benchmark performance score of the benchmark competitor, and benchmark competitor domain scores) to the user via the website 201. The graphical representation can be a spider graph, a comparative bar chart, and the like. The graphical representation may allow the user (e.g., a business leader at the target business) to visualize and compare their target business' performance against the benchmark competitor.

Exemplary Process Decomposition

In some embodiments, the system 100 may be configured to provide an assessment of a target business by assessing the performances of individual processes or criteria unique to the target business. In some embodiments, the assessment is based on performance drivers, without limitation, such as cost, quality, and time (CQT). The system 100 may also be configured to provide recommendations to a target business by assessing criteria unique to the target business. In some embodiments, the recommendations are based on painpoints. By assessing a target business based on individual processes and/or criteria unique to the target business, the system 100 can advantageously perform an assessment or provide recommendations more suitable for the target business using a bottom up approach, reducing costs and need for additional assessments (e.g., for hiring SMEs, for hiring consultants, etc.).

As discussed in more detail below, the system 100 may perform one or more of: determining an updated performance score of a target business and/or recommending KPIs for improving the target business. For example, the target business may be a user's business.

Exemplary Performance Deviation Reestablishment

Figure 21:
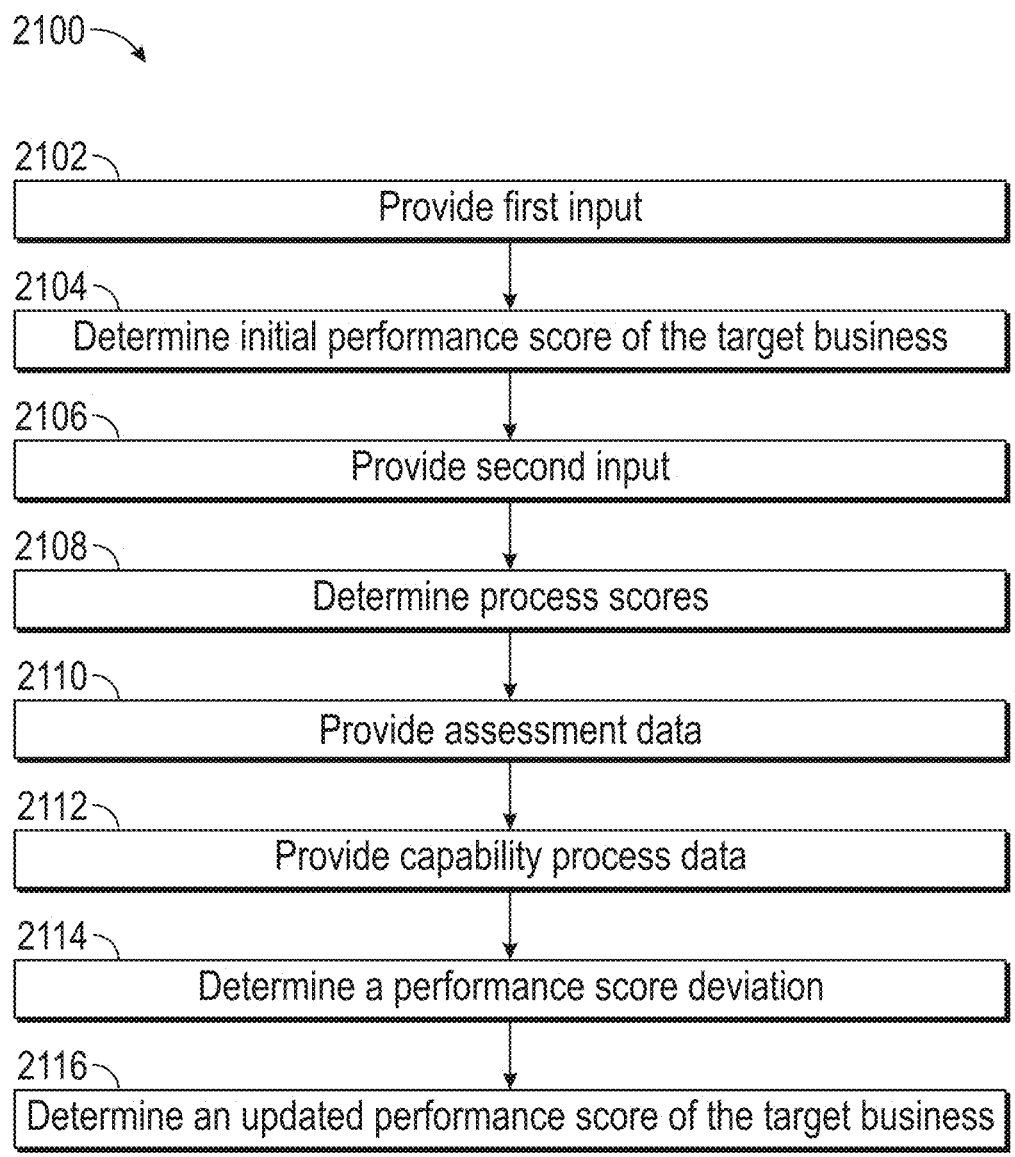
FIG. 21 illustrates a flowchart for determining an updated performance score of the target business, according to embodiments of this disclosure.

FIG. 21 illustrates a flowchart of process 2100 for determining an updated performance score of the target business, according to embodiments of this disclosure. Although the process 2100 is illustrated as including the described elements, it is understood that different order of elements, additional elements, or fewer elements may be included without departing from the scope of the disclosure.

As illustrated, the process 2100 includes providing a first input (step 2102). For example, the input is a set of answers to a questionnaire answered by a user (e.g., a leader of the target business). In response to receiving the first input, an initial performance score of the target business is determined (step 2104). For example, the initial performance score of the target business is determined by the system 100, as discussed above.

The process 2100 may include providing a second input (step 2106). The second input may be provided to the system 100. For example, the second input is a list of processes associated with the target business, scores (e.g., experience, efficiency, data quality, automation, etc.) associated with each of the processes, and information (e.g., owner of the process, location of the process, priority of the process, etc.) associated with each of the processes. In some examples, the second input is at least in part provided by someone in the target business associated with the process (e.g., a manager, a person whose job description is associated with the process, a process owner, etc.). In some examples, the second input is at least in part based on industry standards. In some embodiments, the list of processes is hierarchical and may include up to a five-level hierarchy. It is understood that the five-level hierarchy is merely exemplary; different numbers of levels of processes in the hierarchy may exist without departing from the scope of the disclosure.

In response to receiving the second input, process scores are determined (step 2108). For example, based on the second input, the system 100 determines process scores for each of the processes in the second input. The process scores may indicate an effectiveness of a corresponding process and may help a user identify effective or ineffective processes to identify changes (e.g., room for growth) at the target business.

As illustrated, the process 2100 includes providing an assessment data (step 2110). For example, the assessment data is associated with the first input (e.g., from step 2102). In some embodiments, providing the assessment data includes cleaning up (e.g., reorganizing, updating for consistency, updating for compatibility, etc.) information associated with the first input before further processing of the assessment data is performed. In some embodiments, the assessment data is data associated with the system 100 (e.g., assessment 1 of FIG. 1). For example, the assessment data may be benchmarking data.

The process 2100 includes providing a capability process data (step 2112). For example, the capability process data is associated with the second input (e.g., from step 2106). In some embodiments, providing the capability process data includes cleaning up (e.g., reorganizing, updating for consistency, updating for compatibility, etc.) information associated with the second input before further processing of the capability process data is performed. In some embodiments, the capability process data is data associated with the system 100 (e.g., process decomposition 2 of FIG. 1).

In response to receiving the assessment data and the capability process data, the process 2100 may include determining a performance score deviation (step 2114). In some embodiments, an updated performance score of the target business is determined (step 2116) based on the performance score deviation and an initial performance score of the target business (e.g., from step 2104, using methods described herein). The determination of the performance score deviation and the determination of the updated performance score are described in more detail herein.

As an exemplary advantage, using the processes described herein, a more accurate performance score of the target business (e.g., an updated performance score of the target business) may be determined. As a result, a target business may be more accurately assessed. For example, as illustrated with the following examples, the updated performance score of the target business accounts for performance drivers such as cost, quality, and time, criticality of each of the performance drivers, and information about processes of the target business. Additionally, as illustrated with the following examples, by adjusting the weightages of components of the performance score of the target business based on the needs of the target business or industry, the system 100 may be advantageously used across different industries to provide more accurate assessments of different target businesses using the same system.

Figure 22:
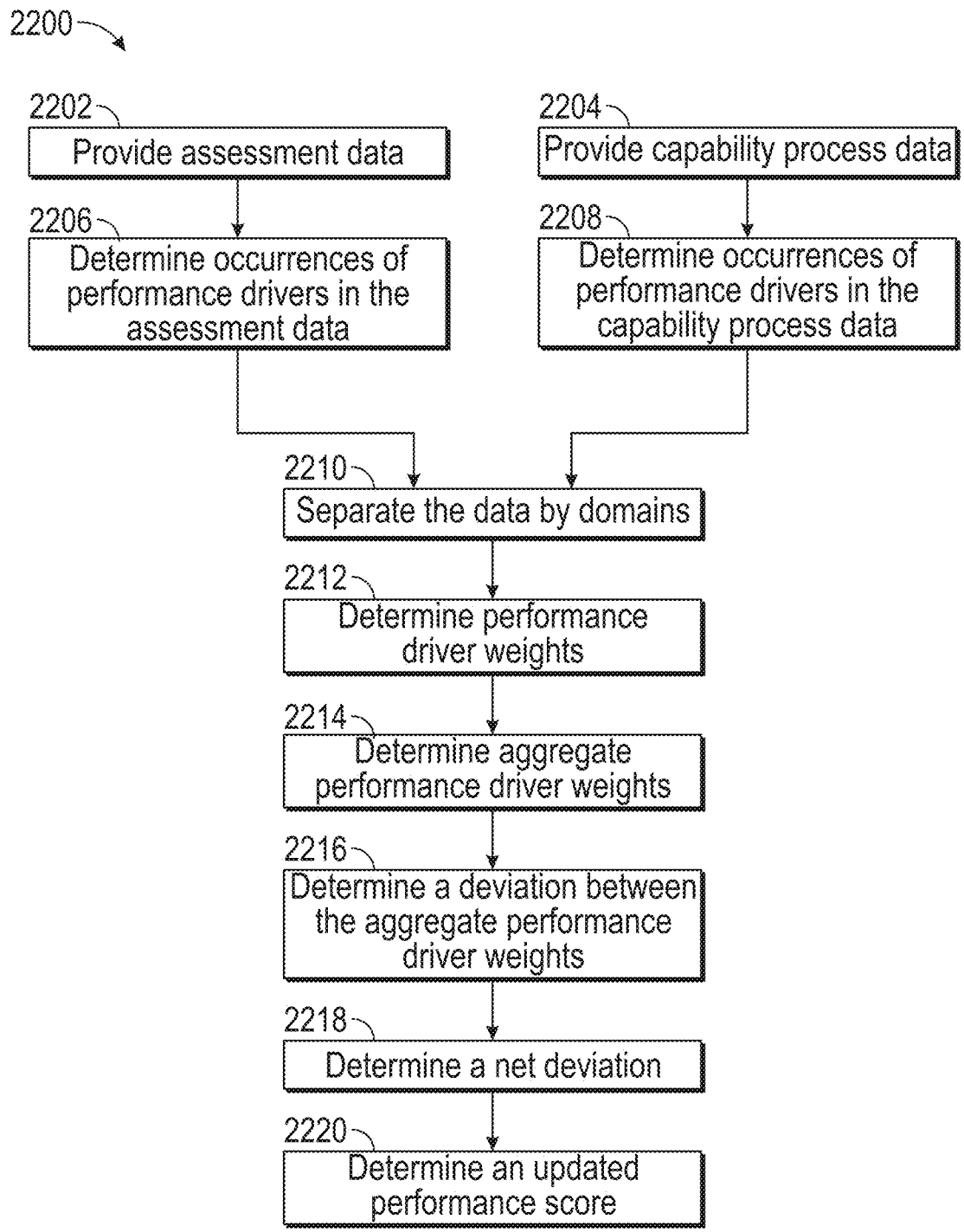
FIG. 22 illustrates a flowchart for determining an updated performance score of the target business, according to embodiments of this disclosure.

FIG. 22 illustrates a flowchart of process 2200 for determining an updated performance score of the target business, according to embodiments of this disclosure. Although the process 2200 is illustrated as including the described elements, it is understood that different order of elements, additional elements, or fewer elements may be included without departing from the scope of the disclosure.

As illustrated, the process 2200 includes providing an assessment data (step 2202). For example, the assessment data 2300 is the data described with respect to step 2110.

FIG. 23 illustrates an exemplary assessment data 2300, according to embodiments of this disclosure. In some embodiments, the assessment data 2300 includes information relating to an input (e.g., response to assessments or questions provided to a leader of the target business, first input from step 2102) to the system 100. In some embodiments, information in the assessment data 2300 is used to determine an initial performance score of the target business (e.g., step 2104). In some embodiments, when determining an updated performance score of the target business, the assessment data 2300 may have already been saved when an initial performance score of the target business was determined, so a user does not need to answer the questions again. In some embodiments, new or additional information for the assessment data 2300 is provided.

The assessment data 2300 may include domains 2302, question identifiers 2304, questions 2306, responses 2308, and descriptions 2310. The domains 2302 on each row is a domain corresponding to a question on the row. For example, the target business is a health science business, and the domains 2302 include procurement, inventory, and compliance. It is understood that the illustrated domains are exemplary. Different numbers of domains or different domains may exist without departing from the scope of the disclosure.

Each of the question identifiers 2304 may be a code (e.g., a number) corresponding to a particular question 2306. The question identifiers 2304 may be determined automatically or defined by a user or an administrator. The question identifiers 2304 may advantageously allow questions to be accessed or recognized (e.g., by the system 100) more efficiently (e.g., compared to identification using the text of a question). The questions 2306 may be questions provided to a leader of the target business for assessing the target business (e.g., to determine an initial performance score of the target business).

The responses 2308 may be responses to questions 2306. The questions 2306 may be associated with an assessment of a target business. As illustrated, the responses are numbers quantifying (e.g., how well, to what extent, etc.) an otherwise textual response to a question. For example, the numbers may range from 0 to 5, where 0 represents the lowest quantity (e.g., poorest, non-existent) and 5 represents the highest quantity (e.g., best). By quantifying the responses, the responses may be used to determine an initial performance score of the target business and the target business domain weights or performance driver weights to determine an updated performance score of the target business (as described in more detail below), allowing quantitative assessment of the target business. Although the responses are illustrated as being numeric, it is understood that other types of responses may exist. For example, the responses may be textual.

The descriptions 2310 may be descriptions provided by the user answering the questions 2306. The descriptions 2310 may provide additional information about the responses 2308 provided by the user. The descriptions 2310 may be used to determine an updated performance score of the target business. For example, information related to performance drivers (e.g., cost, quality, time) may be extracted (e.g., using NLP) to determine performance driver weights for determining the updated performance score of the target business.

Although the assessment data 2300 is illustrated as being organized in column and rows and including the described information, it is understood that the illustration of the assessment data 2300 is merely exemplary. It is understood that the assessment data 2300 may be represented in other forms, may be organized, or may include different information in a different manner without departing from the scope of the disclosure.

Returning back to FIG. 22, the process 2200 includes providing capability process data (step 2204). For example, the capability process data 2400 is the data described with respect to step 2112.

Figure 24:
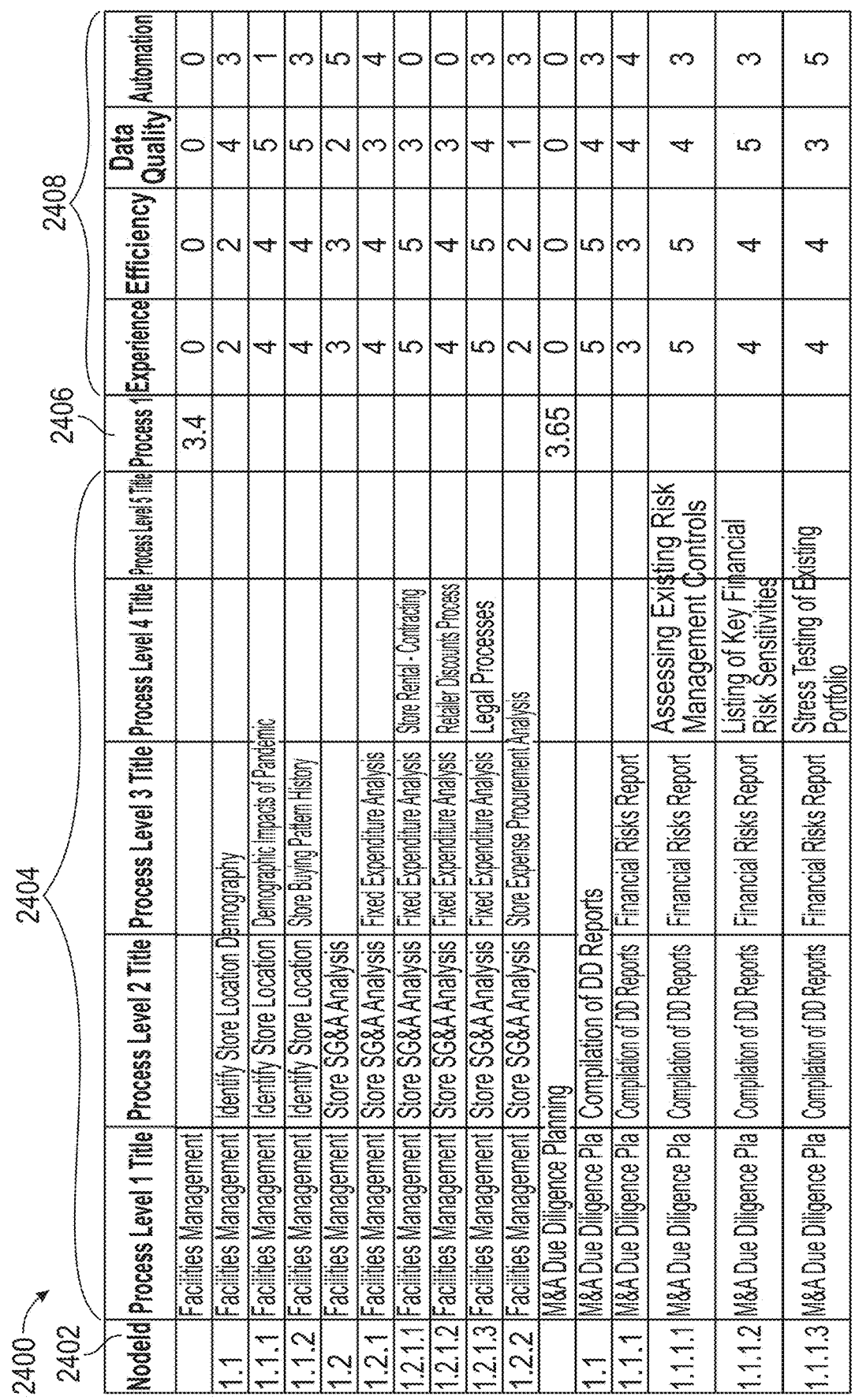
FIG. 24 illustrates an exemplary data, according to embodiments of this disclosure.

FIG. 24 illustrates an exemplary capability process data 2400, according to embodiments of this disclosure. In some embodiments, the capability process data 2400 includes information relating to an input (e.g., information about processes provided by process owners, second input from step 2106 of FIG. 21) to the system 100. In some embodiments, information in the capability process data 2400 is used to determine process scores (e.g., step 2108 of FIG. 21). In some embodiments, when determining an updated performance score of the target business (step 2116 of FIG. 21), the capability process data 2400 may have already been saved when process scores were determined, so a user does not need to provide the information (e.g., process-related information) again. In some embodiments, new or additional information for the capability process data 2400 is provided (e.g., when updated information about a process becomes available).

The capability process data 2400 may include process identifiers 2402, process titles 2404, process scores 2406, and responses 2408. The process identifiers 2402 may be a code (e.g., numbers) corresponding to a particular process. A period in a process identifier may indicate a level of a corresponding process. Additional periods in the identifier indicate that the corresponding process belongs to a lower level (e.g., as defined in step 2106 of FIG. 21, when second input is provided). For example, the process "identify store location demography" is a level 2 process, as indicated by the identifier "1.1," which has one period. The process identifiers 2402 may allow the system 100 to efficiently access or review all the processes of a target business (e.g., for determining the number of occurrences of performance drivers (e.g., step 2208 of FIG. 22 or step 2508 of FIG. 25)). It is understood that the illustrated format for the process identifiers is not meant to be limiting; other process identifier formats may exist.

The process titles 2404 may be a title of a corresponding process. The title of the process may be provided by a user (e.g., a process owner) when an input (e.g., second input) to the system 100 is provided (e.g., step 2106 of FIG. 21). The title of the process may also be automatically determined (e.g., to align with industry standards, to form a more efficient process structure, etc.). As illustrated, the process titles 2404 are separated by levels, and a corresponding title for a corresponding level is shown. For example, for process 1.1.1 under "Facilities Management," the level 1 title for the corresponding process is "Facilities Management," the level 2 title for the corresponding process is "Identity Store Location," and the level 3 title for the corresponding process is "Demographic Impacts of Pandemic." While this example illustrates five process levels and five corresponding process titles, it is understood the number of process levels and the categorization of process titles are not meant to be limiting.

The process scores 2406 may be a score indicative of a performance of a process. For example, the process scores 2406 are determined at step 2108 of FIG. 21. As illustrated, the process "Facilities Management" has a process score 2406 of 3.4, and the process "M&A Due Diligence Planning" has a process score 2406 of 3.65. The process scores 2406 may be determined by responses 2408 corresponding to a respective process, which may be provided by a user (e.g., a process owner) to the system 100 (e.g., at step 2106 of FIG. 21). For example, the process score 2406 for "Facilities Management" may be determined based on the responses 2408 for the process scores 2406 of the lower level "Facilities Management" processes. Although higher level processes are illustrated as having process scores 2406, it is understood that lower level processes may also be scored.

Although the capability process data 2400 is illustrated as being organized in column and rows and including the described information, it is understood that the illustration of the capability process data 2400 is merely exemplary. It is understood that the capability process data 2400 may be represented in other forms, may be organized in a different manner, and/or may include different information without departing from the scope of the disclosure.

Returning to FIG. 22, the process 2200 may include, for each domain, determining the occurrences of performance drivers in the assessment data (step 2206). In some embodiments, the step 2206 also includes identifying domains of the target business in the assessment data.

Each time an occurrence of a performance driver is found for a respective domain, a value corresponding to the number of occurrences of the performance driver and the respective domain may be incremented by one (e.g., the number of occurrences of cost for the inventory domain increments by one). In some examples, if a number of occurrence of a performance driver is greater than one, the number of occurrence of the performance driver is set to one, instead of the actual number of occurrence of the performance driver. At the completion of step 2206, the total number of occurrences of each performance driver for each domain may be stored and used to determine an aggregate performance driver weight for each domain associated with the assessment data 2300. This step may also include determining domains of the data in the assessment data 2300. In the health science business example, the system 100 determines whether a respective portion of assessment data (e.g., an entry in the assessment data 2300) is associated with at least one of the procurement, inventory, and compliance domains. In some embodiments, using NLP, domains of the assessment data 2300 are determined. For example, an AI NLP library, such as WordNet, BeautifulSoup, and Spacy, are used (e.g., a synonym search) to determine the associated domain. In some embodiments, the domains in the assessment data 2300 have been identified previously (e.g., when an initial performance score of the target business is determined).

The performance drivers may include, without limitation, cost, quality, and time. In some embodiments, using NLP, the occurrences of the performance drivers are determined from the assessment data 2300. For example, an AI NLP library, such as WordNet, BeautifulSoup, and Spacy, are used (e.g., a synonym search) to determine the occurrences of the performance drivers in the assessment data 2300. As another example, an online database (e.g., including terms related to the performance drivers) is used to determine the occurrences of the performance drivers in the assessment data 2300.

In examples where the performance drivers include cost, quality, and time, for each domain (e.g., procurement, inventory, compliance), the occurrences of cost, quality, and time in assessment data may be associated with the system 100 (e.g., assessment 1 of FIG. 1) and are determined using NLP. For example, the data may be responses provided by a leader to questions, a cleaned-up version of the responses, etc. The number of occurrences of the performance drivers in the assessment data 2300 may be used to determine weights of performance drivers associated with the assessment data 2300, as described in more detail in subsequent steps.

For example, an assessment of a target business includes a question "how well does your organization procure the most cost-effective drugs in the right quantities?" The response to the question is "the organization has initiated integration of technology drive procurement list maintenance in order to ensure continuous access to products." In this example, the response to the question includes terms related to cost and time (e.g., based on the NLP). The occurrence of cost would be one, the occurrence of time would be one, and the occurrence of quality would be zero. The number of occurrences of the cost and time in this example may be used to determine weights of performance drivers, as described in more detail in subsequent steps.

As another example, an assessment of a target business includes a question "how well does your organization select reliable suppliers of high-quality products at right cost?" The response to the question is "reliable suppliers of high-quality products are pre-selected on the basis of strategic guidelines and additional active quality assurance programs involving both surveillance and testing across the drugs spectrum." In this example, the response to the question includes terms related to cost, quality, and time (e.g., based on the NLP). The occurrence of cost would be one, the occurrence of quality would be one, and the occurrence of time would be one. The number of occurrences of the cost, quality, and time in this example may be used to determine weights of performance drivers, as described in more detail in subsequent steps.

As exemplary advantages, using NLP to determine a domain (e.g., inventory, procurement, and compliance) allows the assessment data items to be more accurately categorized by domains. In some embodiments, using NLP to determine the occurrences of performance drivers (e.g., cost, quality, and time) allows information related to performance drivers to be more accurately extracted, and a more accurate updated performance score of the target business may be determined. For example, a user may not necessarily provide an input to create the assessment data 2300 with the domains in mind (e.g., the user may not be mindful about providing domain-specific information). As another example, a user may not necessarily provide an input to create the assessment data 2300 with the performance drivers in mind (e.g., the user may not be mindful about providing information about cost, quality, and time while providing the input). Using NLP to extract information about the performance drivers allows a user to more accurately provide the input (e.g., in an unbiased manner, without being influenced by domain categorization or performance drivers, etc.) because the user does not need to expressively input information about the domains or performance drivers.

The process 2200 of FIG. 22 may include, for each domain and each process, determining the occurrences of performance drivers in the capability process data (step 2208). In some embodiments, the step 2208 includes identifying domains of the target business in the capability process data. This step is described in more detail with respect to FIG. 25.

Figure 25:
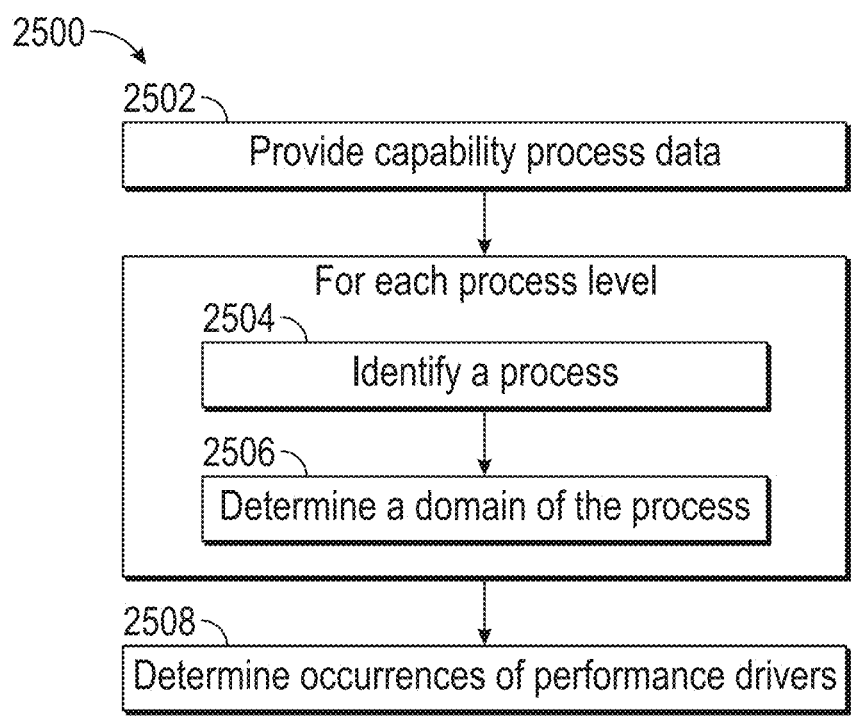
FIG. 25 illustrates a flowchart for determining the occurrences of performance drivers in the capability process data, according to embodiments of this disclosure.

FIG. 25 illustrates a flowchart of process 2500 for determining the occurrences of performance drivers in the capability process data, according to embodiments of this disclosure. Although the process 2500 is illustrated as including the described elements, it is understood that different order of elements, additional elements, or fewer elements may be included without departing from the scope of the disclosure.

As illustrated, the process 2500 includes providing capability process data (step 2502). For example, the capability process data is the data described with respect to step 2112 (FIG. 21) or step 2204 (FIG. 22). The process 2500 may include for each process level, identifying a process (step 2504). For example, each of the processes at each process level in the capability process data 2400 is identified. As an example, for process level 3, the processes "Demographic Impacts of Pandemic," "Store Buying Pattern History," and "Store Expense Procurement Analysis" may be identified. Alternatively, the processes may be identified without sequentially searching through the process levels.

For each identified process at each level (e.g., each process listed in the capability process data 2400), the process 2500 includes determining whether the identified process is associated with a domain (step 2506 shown in FIG. 25). In some embodiments, the step 2506 also includes identifying domains of the target business in the capability process data. In the health science business example, for each identified process at each level, the system 100 determines whether the identified process is associated with at least one of the procurement, inventory, and compliance domains. In some embodiments, using NLP, an associated domain for each of the identified process is determined. For example, an AI NLP library, such as WordNet, BeautifulSoup, and Spacy, are used (e.g., a synonym search) to determine the associated domain. An associated domain may be determined based on the number of occurrences of a domain for each process (e.g., the domain that occurs the most for a particular process during a search). For example, for a process "Review Annual Operational Compliance," the number of occurrence of the Compliance domain is one, and the numbers of occurrence of the inventory and procurement domains are zero. In some embodiments, the steps of identifying whether a process is associated with a domain are repeated for all process level until all processes in all levels have been reviewed.

The process 2500 may include, for each domain in the identified processes in each of the process levels, determining the number of occurrences of performance drivers in the data (step 2508). Each time an occurrence of a performance driver is found for a respective domain, a value corresponding to the number of occurrences of the performance driver and the respective domain may be incremented by one (e.g., the number of occurrences of cost for the inventory domain increments by one). In some examples, if a number of occurrence of a performance driver is greater than one, the number of occurrence of the performance driver is set to one, instead of the actual number of occurrence of the performance driver. At the completion of step 2508, the total number of occurrences of each performance driver for each domain may be stored and used to determine an aggregate performance driver weight for each domain associated with the assessment data. For example, the domains include, without limitation, procurement, inventory, and compliance domains, and the performance drivers include, without limitation, cost, quality, and time. In some embodiments, using NLP, the occurrences of the performance drivers are determined from the identified processes for each process level for each of the domains (e.g., from the capability process data). For example, an AI NLP library, such as WordNet, BeautifulSoup, and Spacy are used (e.g., a synonym search) to determine the occurrences of the performance drivers from the identified processes for each process level for each of the domains (e.g., from the capability process data associated with the system 100 from, e.g., step 2112 of FIG. 21).

For example, a process of a target business includes "review legislative changes from prior year." In this example, the process includes terms time (e.g., based on the NLP). The occurrence of time would be one, the occurrences of cost and time would be zero. The number of occurrences of the cost and time in this example may be used to determine weights of performance drivers, as described in more detail in subsequent steps.

As exemplary advantages, using NLP to determine a domain (e.g., inventory, procurement, and compliance domains) allows the capability process data items to be more accurately categorized by domains. Using NLP to determine the occurrences of performance drivers (e.g., cost, quality, and time) allows information related to performance drivers to be more accurately extracted, and a more accurate updated performance score may be determined. For example, a user may not necessarily provide an input to create the capability process data with the domains in mind (e.g., the user may not be mindful about providing domain-specific information). As another example, a user may not necessarily provide an input to create the capability process data with the performance drivers in mind (e.g., the user may not be mindful about providing information about cost, quality, and time while providing the input). Using NLP to extract information about the performance driver allows a user to more accurately provide the input (e.g., in an unbiased manner, without being influenced by domain categorization or performance drivers) because the user does not need to expressively input information about the domains or the performance drivers.

As another example, an online database (e.g., including terms related to the performance drivers) is used to determine the occurrences of the performance drivers from the identified processes for each process level for each of the domains (e.g., from the capability process data).

In examples where the performance drivers include cost, quality, and time, for each domain (e.g., procurement, inventory, and compliance), the occurrences of cost, quality, and time in the capability process data may be associated with the system 100 and are determined using NLP. The number of occurrences of the performance drivers in the capability process data may be used to determine particular performance drivers associated with the capability process data, as described in more detail in subsequent steps. In some embodiments, after the occurrences of performance drivers in the data are determined, the determined occurrences are used for subsequent processing (e.g., determining a performance driver weight)

Although the process 2500 is illustrated as having step 2508 (determining the occurrences of performance drivers) as following step 2506 (determining whether the identified process is associated with a domain for each process level), it is understood that step 2508 may not necessary be performed after all processes at all process levels have been reviewed. For example, in some embodiments, the step 2508 may be performed while step 2506 is concurrently being performed. That is, the step 2508 may be performed for identified processes while step 2506 is being performed for processes that have not been reviewed.

FIG. 26 illustrates an exemplary classified process data 2600, according to embodiments of this disclosure. The classified process data 2600 may include the processes from the capability process data, and domains associated with the processes are identified in the classified process data 2600. In some embodiments, the exemplary processes and their corresponding domains are identified using process 2500 or step 2208 of process 2200.

The classified process data 2600 may include process titles 2602, process scores 2604, process identifiers 2606, domain levels 2608, and domains 2610. The process titles 2602 may correspond to process titles 2404 of the capability process data 2400 (FIG. 24), which may be titles of the processes. In some embodiments, the process titles may be organized according to a process level of a particular process. The process scores 2606 may correspond to process scores 2406 of the capability process data 2400 (FIG. 24), which may be process scores indicating the performance of the processes (e.g., as determined in step 2108 of FIG. 21).

The process identifiers 2606 may be a code (e.g., a number) identifying a set of processes. For example, all "Risk & Compliance" processes have a process identifier of "0," and all "MOR" processes have a process identifier "1." It is understood that using a code (e.g., a number) to identify a set of processes is not meant to be limiting.

The domain level 2608 may be the process level of a process title (e.g., process title 2602) that causes the process to be identified as belonging to the corresponding domain 2610. The domain level may be identified using NLP. For example, the domain level of the process "Review Annual Operational Compliance" is level three because the level three title of the process, "Review Annual Operational Compliance," causes the process to be identified as belonging to the compliance domain (e.g., domain_found is three). As another example, the domain level of the process "Perform Gap Analysis" is level two because the level two title of the process, "Risk & Compliance," causes the process to be identified as belonging to the Compliance domain (e.g., domain_found is three).

The domains 2610 may indicate a domain that a process is associated with. As illustrated, the domains 2610 are represented using a code (e.g., a number). However, the use of a code (e.g., a number) to represent a domain is not meant to be limiting. For example, all "Risk & Compliance" processes are determined (e.g., using process 2500 or step 2208 of process 2200) to be associated with domain "3" (e.g., compliance), and some of the "MOR" processes are determined to be associated with domain "0," "1," or "2" (e.g., one of inventory and procurement). A domain of a process may be determined based on the occurrences of a domain for the process (e.g., determined during step 2208 of process 2200 or step 2506 of process 2500).

In some examples, the domain "0" may be associated with another domain. The other domain may be a domain that does not belong (e.g., as determined using process 2500 or step 2208 of process 2100) to any predetermined domain (e.g., does not belong to the compliance, inventory, or procurement domains), or the corresponding process may belong to more than one domain. By identifying an associated domain with a process, a component of an updated target business domain score may be determined, allowing the performance of the target business in the corresponding domain to be quantified and accounted for in the updated performance score of the target business.

Although the classified process data 2600 is illustrated as being organized in column and rows and including the described information, it is understood that the illustration of the classified process data 2600 is merely exemplary. It is understood that the classified process data 2600 may be represented in other forms, may be organized in a different manner, and/or may include different information without departing from the scope of the disclosure.

Returning to FIG. 22, the process 2200 may include separating the assessment data and the capability process data by identified domains (step 2210). In the health science business example, the domains include inventory, procurement, and compliance domains, and the first and capability process data are separated by these domains. For the assessment data, the domains may be identified at step 2206. For the capability process data, the domains may be identified at step 2208 or step 2506 of process 2500. It is understood that "separating" does not necessarily mean separate files are created for each data and each domain. For example, a data may be partitioned by domain. After the assessment data and the capability process data have been separated by domains and the occurrences of the performance driver have been determined, performance driver weights may be determined, as described with respect step 2212 (FIG. 22).

Although the process 2200 illustrates the step of separating the data by domains as following steps of determining the occurrences of performance drivers in the assessment data (e.g., step 2206) and in the capability process data (e.g., step 2208 (FIG. 22) or step 2508 in process 2500), it is understood that the step of separating the data by domains may not necessarily be performed after the occurrences of the performance drivers are determined.

For example, a portion of the step 2210 corresponding to the assessment data may be performed concurrently with or before step 2206. That is, the assessment data may be separated by domains before the occurrences of the performance drivers are determined in the assessment data. As another example, a portion of the step 2210 corresponding to the capability process data may be performed concurrently with step 2208 or concurrently with/before step 2508 in process 2500. That is, the capability process data may be separated by domains before the occurrences of the performance drivers are determined in the capability process data.

As illustrated, the process 2200 includes determining performance driver weight(s) (step 2212). In the health science example, the performance drivers include cost, quality, and time. In this example, during this step, a weight associated with each of cost, quality, and time is determined for each of items in the assessment data (e.g., questions, responses to questions, etc.) and for each of the items in the capability process data (e.g., processes).

The performance driver weights may be based on the number of occurrences of the performance drivers (e.g., the number of occurrences of a performance driver for each domain (e.g., from step 2206 (FIG. 22) or from step 2508 of process 2500)). For example, a higher number of occurrences of a performance driver may yield a higher corresponding performance driver weight, and a lower number of occurrences of a performance driver may yield a lower corresponding performance driver weight. The performance driver weights may be represented by percentage weights, as described with respect to FIGS. 27 and 28. The performance driver weights may be used to determine aggregate performance driver weights for the respective data, as described with respect to step 2214 of process 2200.

FIG. 27 illustrates assessment performance driver data 2700 including exemplary performance driver weights for domains associated with assessment data, according to embodiments of this disclosure. In some embodiments, the performance driver weights for domains associated with assessment data are determined using step 2212 of process 2200. The assessment performance driver data 2700 may include domains 2702, questions 2704, the occurrences of the performance drivers 2706, performance driver weights 2708, and domain scores 2710.

The domains 2702 may be identified using step 2206 after the assessment data is provided. Although the components (e.g., questions) of the assessment performance driver data 2700 are illustrated as being organized by domains, it is understood that the organization is merely exemplary; the components of the assessment performance driver data 2700 may not be organized by domain. The questions 2704 may be questions 2306 from the assessment data 2300. The questions 2704 may be questions given to a leader of the target business when the first input is provided with respect to step 2102 (FIG. 21) to generate an initial performance score of the target business.

The occurrences of the performance drivers 2706 may be total occurrences of the performance drivers, determined from step 2206 (FIG. 22). For example, each time an occurrence of a performance driver is identified, the number of occurrences of the performance driver corresponding to the particular performance driver (e.g., cost, quality, time) and the particular domain (e.g., inventory, procurement, compliance) is incremented until a search for performance drivers in the assessment data has been completed. For example, for the "Procurement" domain and the question "To what extent is data analytics use . . . ," the total number of occurrences of cost is one, the total number of occurrences of quality is zero, and the total number of occurrences of time is one.

The performance driver weights 2708 may be computed based on the number of occurrences of the performance drivers 2706. The performance driver weights 2708 may be represented as percentages, and the percentages may be weights used determine an aggregate performance driver weight. For example, a performance driver weight for a particular performance driver at a particular domain is based on the total number of occurrences of the particular performance driver at the particular domain. As an example, for the "Procurement" domain and the question "To what extent is data analytics use . . . ," the cost weight is 40%, the quality weight is 20%, and the time weight is 40%. In some embodiments, the performance driver weights are determined based on a ratio between the numbers of occurrences of the performance drivers. For example, the ratio between the numbers of occurrences of cost:quality:time is 1:0:1. Based on the ratio, a higher weight (e.g., percentage) is determined for cost and time, and a lower weight (e.g., percentage) is determined for quality. As another example, if the ratio between the numbers of occurrences of cost:quality:time is 1:1:1 or 0:0:0, the cost, quality, and time weights are equal at 33.33%. Table 11 illustrates a matrix including exemplary performance driver weights for different occurrences of the performance drivers:

TABLE 11

| Performance Driver(s) | A | B | C |
|---|---|---|---|
| A only | 50% | 25% | 25% |
| B only | 25% | 50% | 25% |
| C only | 25% | 25% | 50% |
| A and B | 40% | 40% | 20% |
| B and C | 20% | 40% | 40% |
| A and C | 40% | 20% | 40% |
| A and B and C | 33.33% | 33.33% | 33.33% |
| None | 33.33% | 33.33% | 33.33% |

For example, the performance drivers A, B, and C are cost, quality, and time respectively. As an example, for the "Compliance" domain and the question "Does the management of pharmac . . . ," the ratio of the numbers of occurrences of cost:quality:time is 0:0:1 (e.g., a ratio of A:B:C). From the exemplary performance driver weight matrix, a cost weight would be 25%, a quality weight would be 25%, and a time weight would be 50%.

Although specific values of the performance driver weights corresponding to different occurrences of the performance drivers are described, it is understood that these values are not meant to be limiting. In some embodiments, depending on the application, the values of the performance driver weights may be higher or lower for the same numbers of occurrences of the performance drivers, compared to the examples described herein. For example, in a different application, a ratio of A:B:C=0:0:1 may yield a weight of 20% for A, 20% for B, and 60% for C.

Computation of the performance driver weights advantageously may lead to determining a more accurate updated performance score of the target business. By determining the occurrences of a performance driver for each domain and computing the performance driver weights, the importance of a performance driver may be quantitatively factored in using the performance driver weights while determining the updated performance score. For example, if the number of occurrences of cost is higher for the inventory domain, a corresponding cost weight for the inventory domain may be scaled accordingly (e.g., determined to have a higher percentage) so that the importance of the cost performance driver is reflected in the updated performance score of the target business, providing a more accurate assessment of the target business' performance in this situation.

The domain score 2710 may be representative of a target business' performance in the respective domain, as described with respect to the system 100. For the sake of brevity, the description of the domain score would not be provided again here.

Although the assessment performance driver data 2700 is illustrated as being organized in column and rows and including the described information, it is understood that the illustration of the assessment performance driver data 2700 is merely exemplary. It is understood that the assessment performance driver data 2700 may be represented in other forms, may be organized in a different manner, and/or may include different information without departing from the scope of the disclosure.

Figure 28:
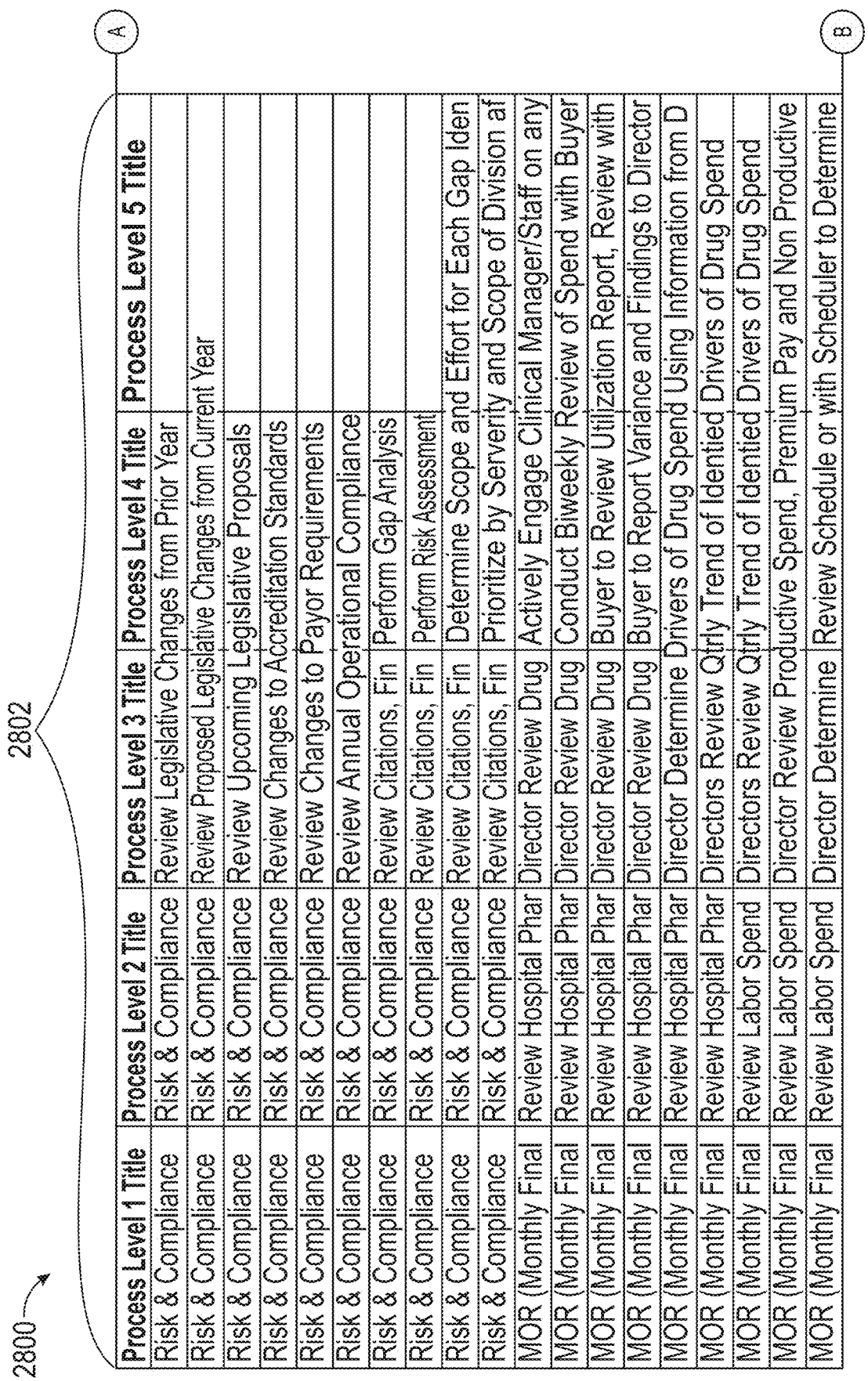
FIG. 28 illustrates an exemplary data, according to embodiments of this disclosure.

FIG. 28 illustrates capability performance driver data 2800 including exemplary performance driver weights for domains associated with a capability process data, according to embodiments of this disclosure. In some embodiments, the performance driver weights for domains associated with a capability process data are determined using step 2212 (FIG. 22). The capability performance driver data 2800 may include process titles 2802, process scores 2804, domains 2806, occurrences of the performance drivers 2808, and performance driver weights 2810.

The process titles 2802 may correspond to process titles 2602 of the classified process data 2600, the process scores 2804 may correspond to process scores 2604, and domains 2806 may correspond to domains 2610. For the sake of brevity, elements described with respect to the classified process data 2600 that are similar to the capability performance driver data 2800 are not provided again here.

The occurrences of the performance drivers 2808 may be the total occurrences of the performance drivers determined from step 2208 (of process 2200) or step 2508 (of process 2500) for each process. For example, for a particular process, each time an occurrence of a performance driver is identified, the number of occurrences of the performance driver corresponding to the particular performance driver (e.g., cost, quality, time) and the particular domain (e.g., inventory, procurement, compliance) is incremented until a search for performance drivers in the capability process data has been completed. For example, for the "Review Legislative Changes for Prior Year" process, a total number of occurrences of cost is zero, a total number of occurrences of quality is zero, and a total number of occurrences of time is one.

The performance driver weights 2810 may be computed based on the occurrences of the performance drivers 2808. The performance driver weights 2810 may be represented as percentages, and the percentages may be weights used determine an aggregate performance driver weight. For example, a performance driver weight 2810 for a particular performance driver at a particular domain is based on a total number of occurrences of the particular performance driver at the particular domain. As an example, for the "Review Legislative Changes for Prior Year" process, the cost weight is 25%, the quality weight is 25%, and the time weight is 50%. In some embodiments, the performance driver weights are determined based on a ratio between the numbers of occurrences of the performance drivers. For example, the ratio between the numbers of occurrences of cost:quality:time is 1:0:1. Based on the ratio, higher weights (e.g., percentages) are determined for cost and time, and a lower weight (e.g., percentage) is determined for quality. As another example, if a ratio between the numbers of occurrences of cost:quality:time is 1:1:1 or 0:0:0, the cost, quality, and time weights are equal at 33.33%.

Referring back to Table 11, for the "Review Legislative Changes for Prior Year" process, a ratio of the numbers of occurrences of cost:quality:time is 0:0:1 (e.g., a ratio of A:B:C). From the exemplary performance driver weight matrix of Table 11, the cost weight would be 25%, the quality weight would be 25%, and the time weight would be 50%.

Although specific performance driver weights corresponding to different occurrences of the performance drivers are described, it is understood that these values are not meant to be limiting. In some embodiments, depending on the application, the performance driver weight values may be higher or lower for the same numbers of occurrences of the performance drivers, compared to the examples described herein. For example, in a different application, a ratio of A:B:C=0:0:1 may yield a weight of 20% for A, 20% for B, and 60% for C.

Computation of the performance driver weights advantageously allows a more accurate updated performance score to be determined. By determining occurrences of a performance driver for each domain and computing the performance driver weights, a performance driver's contribution to the updated performance score may be emphasized or a de-emphasized. For example, if the number of occurrences of cost is higher for the inventory domain for a process, a corresponding cost weight for the inventory domain for the process would be scaled accordingly (e.g., determined to have a higher percentage) to more emphasize the cost performance driver in the updated performance score, which provides a more accurate assessment of a business in this situation.

Although the capability performance driver data 2800 associated with exemplary performance driver classification by domains associated with a capability process data is illustrated as being organized in column and rows and including the described information, it is understood that the illustration of the capability performance driver data 2800 is merely exemplary. It is understood that the capability performance driver data 2800 may be represented in other forms, may be organized in a different manner, and/or may include different information without departing from the scope of the disclosure.

Returning to FIG. 22, the process 2200 may include determining aggregate performance driver weights (step 2214). Based on the performance driver weights determined from step 2212, aggregate performance driver weights may be determined for the assessment data and the capability process data. In the health science business example, the domains include procurement, inventory, and compliance, and the performance drivers include cost, quality, and time. In this example, nine aggregate performance driver weights may be determined based on the performance driver weights from step 2212. For each of the procurement, inventory, and compliance domains, the cost weights are summed, the quality weights are summed, and the time weights are summed. For each domain, percentage of [sum of cost weights/(sum of cost, quality, and time weights)], percentage of [sum of quality weights/(sum of cost, quality, and time weights)], and percentage of [sum of time weights/(sum of cost, quality, and time weights)] are calculated. Each percentage is applied to a corresponding domain score (e.g., domain score 2710 in FIG. 27). For example, the procurement domain score is 3.2. A cost percentage is multiplied to the procurement domain score to obtain the aggregate cost weight for the procurement domain. A quality percentage is multiplied to the procurement domain score to obtain the aggregate quality weight for the procurement domain. A time percentage is multiplied to the procurement domain score to obtain the aggregate time weight for the procurement domain.

For example, the aggregate performance driver weights associated with the assessment data may be represented as follows:
    amp_proc=(1.056, 1.0739, 1.056)
    amp_inv=(0.6273, 0.8205, 1.0477)
    amp_comp=(1.254, 1.083, 1.444)
"amp_proc" may be a set of aggregate performance driver weights for the procurement domain, "amp_inv" may be a set of aggregate performance driver weights for the inventory domain, and "amp_comp" may be a set of aggregate performance driver weights for the compliance domain. For each set of aggregate performance driver weights, each value corresponds to a performance driver. For example, the first value of each set corresponds to cost, the second value of each set corresponds to quality, and the third value of each set corresponds to time.

The aggregate performance driver weights advantageously allows a more accurate updated performance score to be determined. The aggregate performance driver weights reflect emphasis or a de-emphasis of a particular performance driver based on an occurrence of the particular performance driver for a domain. For example, if the number of occurrences of cost is higher for the inventory domain, the aggregate cost weight would be higher and reflect an emphasis on the cost performance driver, which would provide a more accurate assessment of a business in this situation.

In some embodiments, before aggregate performance driver weights for the capability process data are determined and after step 2212, an aggregate performance driver weight for the different processes may be generated. The performance driver weights may be combined by domains to generate an aggregate performance driver weight for the capability process data. In the health science business example, the domains include procurement, inventory, and compliance, and the performance drivers include cost, quality, and time. For each set of processes (e.g., all processes under a same process level 1 title, all "Facilities Management" processes in FIG. 24), the cost weights are summed, the quality weights are summed, and the time weights are summed. For each set of processes, percentage of [sum of cost weights/(sum of cost, quality, and time weights)], percentage of [sum of quality weights/(sum of cost, quality, and time weights)], and percentage of [sum of time weights/(sum of cost, quality, and time weights)] are calculated. Each percentage is applied to a corresponding process score (e.g., process score 2406 in FIG. 24). For example, the facilities management process score is 3.4. A cost percentage is multiplied to the facilities management process score to obtain the aggregate cost weight for the facilities management process. A quality percentage is multiplied to the facilities management process score to obtain the aggregate quality weight for the facilities management process. A time percentage is multiplied to the facilities management process score to obtain the aggregate time weight for the facilities management process.

For example, the aggregate performance driver weights for the different process may be represented as follows:
    ('Compliance', 10, 1.1324, 1.1324, 1.5124)
    ('Procurement', 17, 1.3859, 1.2212, 1.3741)
    ('Inventory', 22, 0.5239, 1.0478, 0.6883)
    ('Compliance', 1, 0.8514, 0.8514, 0.8514)
    ('Inventory', 20, 1.0491, 0.09369, 1.7503)
    ('OTHER-DOMAIN', 1, 0.8052, 0.8052, 0.8052)
    ('OTHER-DOMAIN', 1, 1.0428, 1.0428, 1.0428)
    ('Inventory', 29, 0.6243, 0.6243, 0.6243)
    ('OTHER-DOMAIN', 1, 0.6864, 0.6864, 0.6864)
For each set of aggregate performance driver weights for each process, the third to fifth values be aggregate performance driver weights for each process or each set of processes. Furthermore, the first value may correspond to a domain, the second value may correspond to a process identifier (e.g., process identifiers 2606 in FIG. 26), and each value of the third to fifth value may correspond to a performance driver. For example, the third value of each set corresponds to cost, the fourth value of each set corresponds to quality, and the fifth value of each set corresponds to time.

In this example, after aggregate performance driver weights for the processes are combined by domain, nine aggregate performance driver weights may be determined. For example, for each of the compliance, procurement, and inventory domains and for each of the cost, quality, and time performance drivers, an average of the aggregate performance driver weights is calculated to determine the aggregate performance driver weights associated with the capability process data (e.g., for the compliance domain, an average of the aggregate cost weights is calculated to determine the aggregate cost weight associated with the capability process data; etc.). For example, the aggregate performance driver weights associated with the capability process data may be represented as follows:

cap_proc=(1.228, 0.79, 1.012)
cap_inv=(0.89, 0.86, 1.182)
cap_comp=(0.88, 0.95, 1.04)

"cap_proc" may be a set of aggregate performance driver weights for the procurement domain, "cap_inv" may be a set of aggregate performance driver weights for the inventory domain, and "cap_comp" may be a set of aggregate performance driver weights for the compliance domain. For each set of aggregate performance driver weights, each value corresponds to a performance driver. For example, the first value of each set corresponds to cost, the second value of each set corresponds to quality, and the third value of each set corresponds to time.

The aggregate performance driver weights advantageously allows a more accurate updated performance score to be determined. The aggregate performance driver weights reflect emphasis or a de-emphasis of a particular performance driver based on an occurrence of the particular performance driver for a domain. For example, if the number of occurrence of cost is higher for the inventory domain, the aggregate cost weight would be higher and reflect an emphasis on the cost performance driver, which would provide a more accurate assessment of a business in this situation.

The process 2200 may include determining a deviation between aggregate performance driver weights associated with assessment data and a capability process data (e.g., a gross domain performance driver deviation) (step 2216). For example, a gross domain performance driver deviation is determined. The gross domain performance driver deviation may be represented as follows:

gross_proc=(0.172, −0.2839, −0.044)
gross_inv=(0.2627, 0.0395, 0.1343)
gross_comp=(−0.374, −0.133, −0.404)

"gross_proc" may be a set of gross domain performance driver deviations for the procurement domain, "gross_inv" may be a set of gross domain performance driver deviations for the inventory domain, and "gross_comp" may be a set of gross domain performance driver deviations for the compliance domain. For each set of gross domain performance driver deviations, each value corresponds to a performance driver. For example, the first value of each set corresponds to cost, the second value of each set corresponds to quality, and the third value of each set corresponds to time.

In the above example, differences between corresponding values in respective aggregate performance driver weights are determined to generate the gross domain performance driver deviation values. It is understood that the computation in this example is not meant to be limiting, and other methods of generating the gross domain performance driver deviation may exist.

The process 2200 may include determining a net deviation between the assessment data and the capability process data (e.g., a net domain performance driver deviation) (step 2218). For example, the net domain performance driver deviation is determined. The net domain performance driver deviation may be determined by applying a domain weight to a corresponding to gross domain performance driver deviation. For example, a procurement domain weight is applied (e.g., multiplied) to gross domain performance driver deviations associated with the procurement domain (e.g., "gross_proc"), an inventory domain weight is applied (e.g., multiplied) to gross domain performance driver deviations associated with the inventory domain (e.g., "gross_inv"), and a compliance domain weight is applied (e.g., multiplied) to gross domain performance driver deviations associated with the compliance domain (e.g., "gross_comp").

As an exemplary advantage, using the domain weights, a more unbiased updated performance score may be derived. As described herein, the domain weights may be determined based on questions provided to a user using the system 100. The questions may be designed to be neural and non-suggestive, such that the user would not be able to infer a response's effect on an updated performance score. That is, the domain weights may be determined objectively using the questions, and the gross domain performance driver deviations may be appropriately scaled by these objectively-determined domain weights, which emphasis or de-emphasis deviations based on an objective assessment of the business.

As an example, after the domain weights have been applied to the gross domain performance driver deviations, the net domain performance driver deviations may be represented as follows:

net_proc=(0.172, −0.2839, −0.044)
net_inv=(0.2627, 0.0395, 0.1343)
net_comp=(−0.374, −0.133, −0.404)

"net_proc" may be a set of net domain performance driver deviations for the procurement domain, "net_inv" may be a set of net domain performance driver deviations for the inventory domain, and "net_comp" may be a set of net domain performance driver deviations for the compliance domain. For each set of net domain performance driver deviations, each value corresponds to a performance driver. For example, the first value of each set corresponds to cost, the second value of each set corresponds to quality, and the third value of each set corresponds to time.

The process 2200 may include determining an updated performance score (step 2220). The step 2220 may also include determining an overall deviation. The overall deviation may be a sum of the values of the net domain performance driver deviations. Although the overall deviation is described as being a sum of the values of the net domain performance driver deviations, it is understood that this description is not meant to be limiting; other methods of determining an overall deviation may exist. In the above example, the overall deviation is −0.204.

The updated performance score may be determined based on the overall deviation. For example, the overall deviation indicates a difference between an initial performance score (e.g., determined from step 2104) and an updated performance score, which includes information about performance drivers (e.g., critical factors for business operation) and processes and providing a more accurate assessment of a business.

The updated performance score of the target business may be generated by applying the overall deviation to the initial performance score. For example, the initial performance score is added to the overall deviation to generate the updated performance score of the target business. As an example, if the initial performance score is 3.9 (e.g., from step 2104) and the overall deviation is −0.204, then the updated performance score would be rounded to 3.695. In some embodiments, the updated performance score of the target business and/or overall deviation is displayed or represented (e.g., as a bar graph) on a UI, as described herein.

Exemplary KPI Recommendation Process

Figure 29:
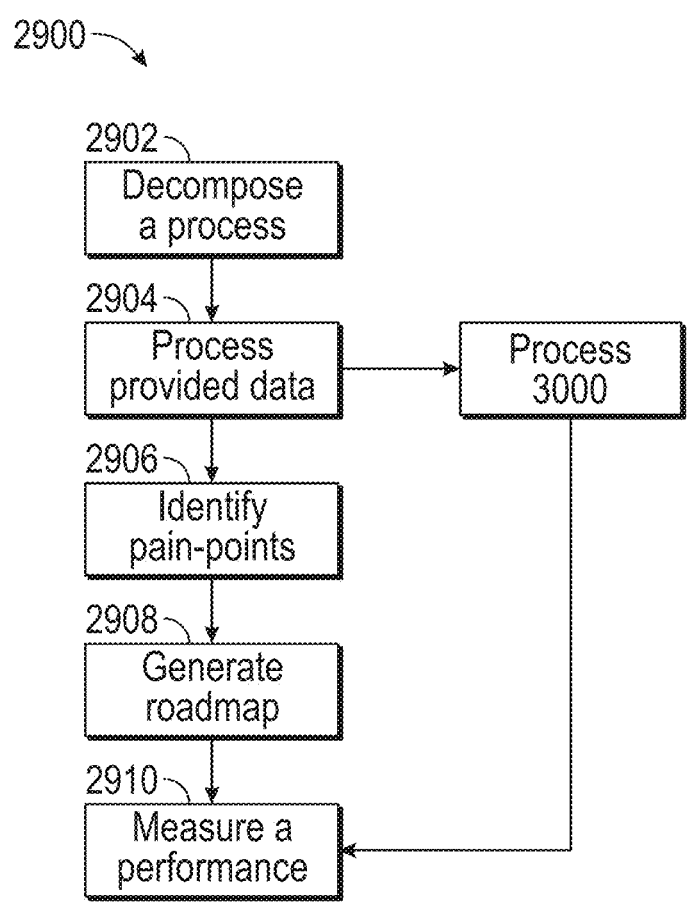
FIG. 29 illustrates a flowchart for measuring a performance of the target business, according to embodiments of this disclosure.

FIG. 29 illustrates a flowchart of process 2900 for measuring a performance of the target business, according to embodiments of this disclosure. Although the process 2900 is illustrated as including the described elements, it is understood that different order of elements, additional elements, or fewer elements may be included without departing from the scope of the disclosure.

As illustrated, the process 2900 includes decomposing a process (step 2902). Decomposing a process may include breaking down a larger process of a business into sub-processes using the system 100. In some examples, a larger process may be broken into a five-level hierarchy of sub-progresses. It is understood that the five-level hierarchy is merely exemplary; different numbers of levels of process hierarchy may exist without departing from the scope of the disclosure. Decomposing a process may also include providing processes associated with a target business (e.g., in the system 100). In some examples, scores (e.g., experience, efficiency, data quality, automation) associated with each of the process and information (e.g., owner of the process, location of the process, priority of the process) associated with each of the process may be additionally provided. In some examples, the processes and the information associated with the processes are at least in part provided by someone in the company associated with the process (e.g., a manager, a person whose job description is associated with the process). In some examples, the provided processes are determined at least in part based on industry standards.

The step of decomposing a process may be associated with process decomposition 2 in FIG. 1. With process decomposition 2, the processes may be organized in a Functional Phase Matrix (FPM). For example, the FPM includes functions of a target company and phases. The FPM functions may include application, capital management, operations, business transformation, inventory planning, demand planning, procurement, information technology, and sales management. The FPM phases may include strategy and planning, monitor and management, and execution.

The process 2900 may include processing provided data (step 2904). The decomposed processes from step 2902 may be processed by the system 100. For example, the decomposed processes are saved in a database of the system 100. The decomposed processed may be used to assess a performance of a business (e.g., determine an updated performance score, as described with respect to FIG. 22; identify pain-points, as described with respect to step 2906).

The process 2900 may include identifying pain-points (step 2906). For example, a pain-point may be an inefficient process or a weakness in a product. Pain-points may be issues, obstacles, or creators of poor performance in a process that prevent optimal process execution and optimal results. The pain-points may be identified based on the process data from step 2902 and/or step 2904. For example, using an artificial intelligence (AI) algorithm, NLP (e.g., semantic match), or machine learning algorithm, pain-points are identified from the process data. Using an AI algorithm, NLP (e.g., semantic match), or machine learning algorithm, pain-points may be more accurately identified (e.g., pain-points may be less likely missed, compared to manual identification; pain-point identification may be more objective). As another example, the pain-points are identified based on provided information associated with the processes (e.g., experience score, efficiency score, data quality score, and automation score). The identified pain-points may be used to determine a recommendation, as described in more detail with respect to process 3000.

The process 2900 may include generating a roadmap (step 2908). Based on the identified pain-points (e.g., form step 2906), a roadmap may be generated (e.g., in roadmap 5 of FIG. 1). The roadmap may track the identified pain-points and include actions that may be required to eliminate the pain-points. The roadmap may include a plan or a schedule for a business to follow in order to eliminate the pain-points. The roadmap may be tracked over time to determine a business' progress of eliminating a pain-point or resolving the problem.

The process 2900 may include measuring a performance (step 2910). For example, the performance may be measured in KPIs. The KPIs may be provided based on a recommendation provided for a problem and/or pain-points (e.g., from process 3000). The determination of the recommendation is described in more detail with respect to process 3000. In some embodiments, the KPI are measured, set, and/or tracked in the system 100.

Figure 30:
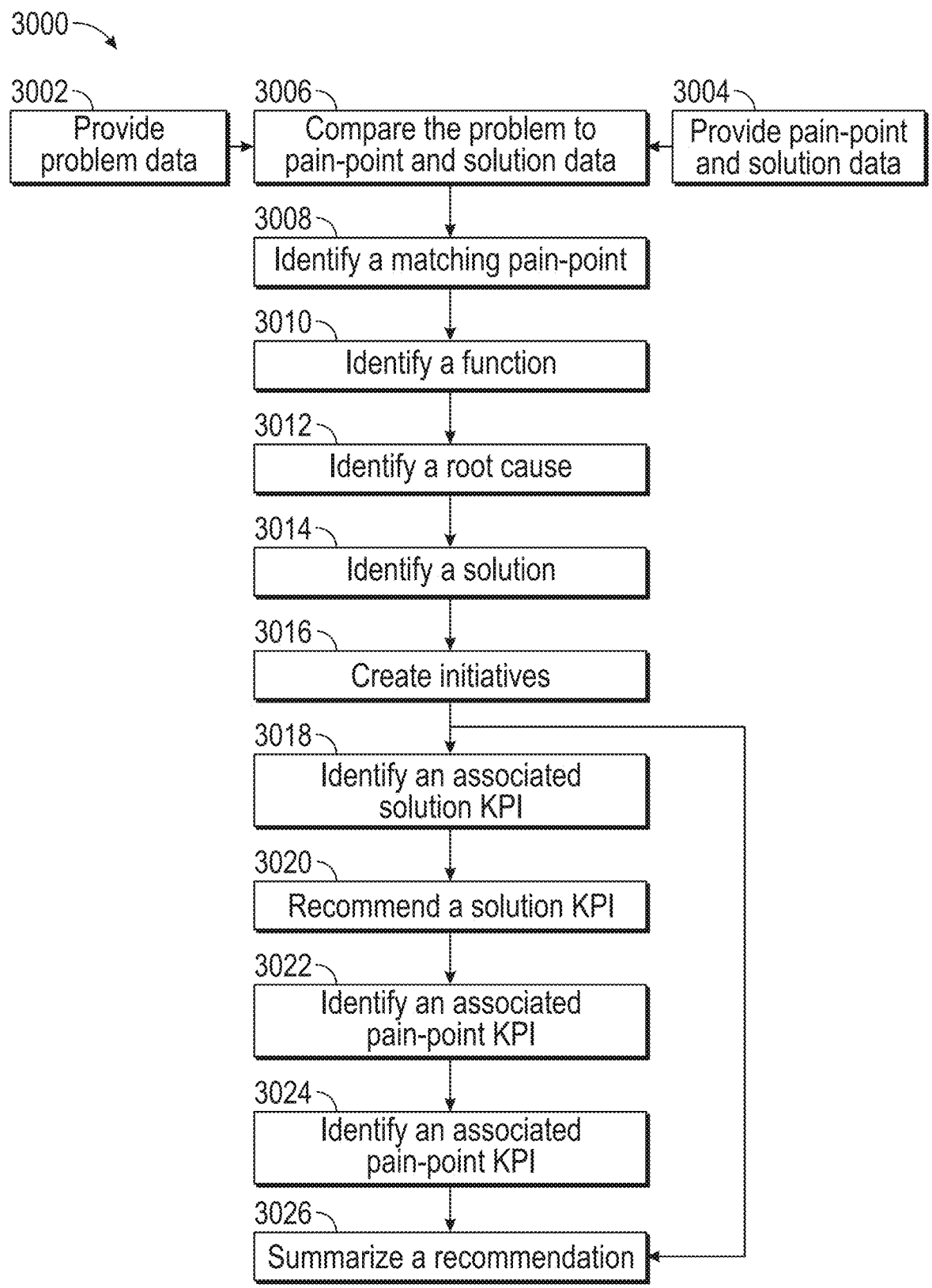
FIG. 30 illustrates a flowchart for determining an updated performance score of the target business, according to embodiments of this disclosure.

FIG. 30 illustrates a flowchart of process 3000 for determining an updated performance score of the target business, according to embodiments of this disclosure. Although the process 3000 is illustrated as including the described elements, it is understood that different order of elements, additional elements, or fewer elements may be included without departing from the scope of the disclosure.

As illustrated, the process 3000 includes providing a problem data (step 3002). The problem data may include information about problems that a business may experience or problems that a business may want to resolve. The information of the problem data may be organized by process, function, and or phase. Information of the problem data may be stored in the second database 207 and may be retrieved by a database of the system 100.

In some examples, the information of the problem data is inputted to a file to create the problem data. In some examples, the information of the problem data is provided a UI (e.g., a UI of the system 100) to create the problem data. For example, the UI may prompt a user to provide information to create the problem data (e.g., problems, process title, function, and phase). As another example, the UI may prompt the user to provide problems that a business is trying to solve and processes related to the problems being solved. In some examples, the information of the problem data is at least in part automatically generated. For example, the information of the problem data is generated based on an assessment of a business and potential problems identified in the assessment. As another example, some information of the problem data is generated (e.g., by system 100) in response to problem data information provided by a user. The problem data may include a list of problems, which may be obstacles and poor performing aspects of a target business discovered while assessing processes of the target business.

FIG. 31 illustrates exemplary problem data 3100, according to embodiments of this disclosure. As illustrated, the problem data 3100 includes problems 3102, process titles 3104, functions 3106, and phase 3108. As discussed with respect to step 3002, the information associated with the problem data 3100 may be provided by a user and/or generated automatically.

The problems 3102 may be problems that a business may experience and would like to resolve. The process titles 3104 may be processes corresponding to the problems 3102. For example, the problem "Purchase of bad quality raw materials" may correspond to the process "Procurement Quality Management." In some examples, the corresponding process is provided by a user (e.g., a process owner) to the system 100. In some examples, the corresponding process is determined by the system 100 based on the problems 3102. For example, AI or NLP (e.g., semantic match) is used to determine a process corresponding to a problem. Although the process titles 3104 are illustrated as being textual, it is understood that the process titles may be represented in other forms, such as numbers or codes.

The functions 3106 may be function areas corresponding to the processes 3104. The functions may be FPM functions described with respect to process decomposition 2. For example, the process "Procurement Quality Management" may correspond to the function area "Inventory Planning." In some examples, the corresponding function is provided by a user (e.g., a process owner) to the system 100. In some examples, the corresponding function is determined by the system 100 based on the process 3102. For example, a function is determined to correspond to a process based on information about the business' processes (e.g., stored in the system 100). As another example, an AI or machine learning algorithm is used to determine a function corresponding to a process. Although the functions 3106 are illustrated as being textual, it is understood that the functions may be represented in other forms, such as numbers or codes.

The phases 3108 may be phases (e.g., a point in progress of a corresponding process) corresponding to the processes 3104. The phases may be FPM phases described with respect to process decomposition 2. For example, the process "Procurement Quality Management" may correspond to the phase "Strategy and Planning." That is, the problem process "Procurement Quality Management" is indicated to be in the "Strategy and Planning" phase. In some examples, the corresponding phase is provided by a user (e.g., a process owner) to the system 100. In some examples, the corresponding phase is determined by the system 100 based on the process 3102. For example, a phase is determined to correspond to a process based on information (e.g., a schedule of the processes) about the business' processes (e.g., stored in the system 100). As another example, an AI or machine learning algorithm is used to determine a phase corresponding to a process. Although the phases 3108 are illustrated as being textual, it is understood that the phases may be represented in other forms, such as numbers or codes.

Although the problem data 3100 is illustrated as being organized in column and rows and including the described information, it is understood that the illustration of the spreadsheet 3100 is merely exemplary. It is understood that the spreadsheet 3100 may be represented in other forms, may be organized in a different manner, and/or may include different information without departing from the scope of the disclosure.

Returning to FIG. 30, the process 3000 includes providing a pain-point and solution data (step 3004). The pain-point and solution data may include information about pain-points a business may experience and solutions that may help the business alleviate these pain-points. For example, the information is organized by pain-points, function, root cause, and solutions. For example, for a health science business, the information may include the business' supply chain issues, their associated functional areas, root causes, and solutions. In some embodiments, the pain-points are determined based on processes of a business (e.g., identified at step 2906). In some embodiments, the pain-points are provided by a user (e.g., a manager of a product) to the system 100. For example, a pain-point may be an inefficient process or a weakness in a product.

The pain-point and solution data may be stored in a database and may be configured to be updated. For example, the pain-point and solution data includes knowledge and inputs from SME and the knowledge and inputs are updated over time, as more information is being provided to the pain-point and solution data. Based on the SME's expertise, he or she may provide pain-points that may be relevant to a business and solutions that would help a business alleviate these pain-points. The pain-points and possible solutions may be advantageously consolidated in the pain-points and solutions data. As described in more detail herein, the pain-point and solution data may be updated based on an effectiveness of a proposed pain-point or solution KPI to a problem.

The SME's knowledge and input may be processed by AI or machine learning algorithms to advantageously increase the value of the knowledge and the input. For example, AI or machine learning algorithms may expand the applicability of the knowledge and input from the SME. As an example, an input from a SME is indicated to be applicable to a first industry or a first process. Using AI or machine learning algorithm, the input may be determined to be applicable to a second industry or a second process, and the pain-point and solution data may be updated accordingly to expand the knowledge and input's applicability beyond the initial scope of first industry or first process, increasing the value of the provided knowledge.

As another example, using AI or machine learning algorithms, a second input from a same SME or a different SME may affect existing information in the pain-point and solution data. For example, a SME provides a second input to the pain-point and solution data, and using AI or machine learning algorithms, it is determined that a first input should be updated (e.g., for improved accuracy, for improved efficiency, to provide additional information) in response to receiving the second input. In accordance with the determination that the first input should be updated, information associated with the first input is updated based on the second information.

As an exemplary advantage, using the pain-point and solution data to resolve problems for a business reduces costs for the business and provides a business with an up-to-date set of recommendations to a problem. For example, instead of hiring a consultant to resolve a business' problems, the system 100 and/or the process 3000 allows a business to take advantage of the knowledge and inputs from many experts, and because the knowledge and inputs of these experts may be shared between multiple users, a cost associated with access to this information would be reduced accordingly. Additionally, the pain-point and solution data may be configured to be updated in real-time (e.g., to include the latest, most applicable, and most accurate information), meaning a business seeking a recommendation would receive the latest and best recommendation from the system 100.

FIG. 32 illustrates an exemplary pain-point and solution data 3200, according to embodiments of this disclosure. As illustrated, the pain-point and solution data 3200 includes pain-points 3202, functions 3204, root causes 3206, and solutions 3208. As described with respect to step 3004, the information associated with the pain-point and solution data 3200 may be based on input provided by a SME, updated using AI or machine learning algorithms, and/or updated based on effectiveness of a recommendation. In some embodiments, the pain-points are determined based on processes of a business (e.g., identified at step 2906). In some embodiments, the pain-points are provided by a user (e.g., a manager of a product) to the system 100.

The pain-points 3202 may be pain-points potentially experienced by a business. As illustrated, a pain-point may be "Manual procurement is tedious." The functions 3004 may be functions associated with the pain-points. More than one function may correspond to a pain-point. As illustrated, the pain-point "Manual procurement is tedious" may have corresponding functions "procurement" and "information technology." In some examples, the functions are provided by a SME. In some examples, an AI or machine learning algorithm is used to determine functions corresponding to a pain-point. In some examples, the functions corresponding to a pain-point are determined based on information (e.g., about functions) stored in the system 100. Although the pain-points 3202 and functions 3204 are illustrated as being textual, it is understood that the pain-points and functions may be represented in other forms, such as numbers or codes.

The root causes 3206 may be root causes corresponding to functions 3204. As illustrated, the pain-point "Manual procurement is tedious" and the corresponding function "procurement" have a root cause of "Lack of clearly defined approval hierarchy for product categories." In some examples, the root causes are provided by a SME. In some examples, the root causes may be provided or updated using AI or machine learning algorithm (e.g., for improved accuracy, for improved efficiency). In some examples, the root causes may be determined based on an assessment of a business (e.g., using system 100). Although the root causes 3206 are illustrated as being textual, it is understood that the root causes may be represented in other forms, such as numbers or codes.

The solutions 3208 may be solutions corresponding to a pain-point 3202 and/or function 3206. The solutions 3208 may also be associated with the root cause 3206. For example, the solutions 3208 may be ways to eliminate the root causes 3206. As illustrated, the pain-point "Manual procurement is tedious" and the corresponding function "procurement" have a root cause of "Lack of clearly defined approval hierarchy for product categories and a solution of "Approval hierarchy need to be clearly defined by product categories as well as value of the purchase order." In some examples, the solutions are provided by a SME. In some examples, the solutions may be provided or updated using AI or machine learning algorithm (e.g., for improved accuracy, for improved efficiency). In some examples, the solutions may be determined based on an assessment of a business (e.g., using system 100). Although the solutions 3208 are illustrated as being textual, it is understood that the solutions may be represented in other forms, such as numbers or codes.

Although the pain-point and solution data 3200 is illustrated as being organized in column and rows and including the described information, it is understood that the illustration of the pain-point and solution data 3200 is merely exemplary. It is understood that the pain-point and solution data 3200 may be represented in other forms, may be organized in a different manner, and/or may include different information without departing from the scope of the disclosure.

Returning to FIG. 30, the process 3000 may include comparing the problem data and the pain-point and solution data (step 3006). The problem data and the pain-point and solution data may be compared using AI algorithms or NLP. For example, NLP's Spacy library or semantic match is used to compare between the two data. In some examples, semantic similarity scores is calculated based on the comparison.

For example, if an element of the problem data is more similar to an element of the pain-point and solution data, a semantic similar score for these elements may be higher, and if an element of the problem data is less similar to an element of the pain-point and solution data, a semantic similar score for these elements may be lower. As an example, a problem of the problem data (e.g., problems 3102) may be highly similar to a pain-point of the pain-point and solution data (e.g., pain-points 3202) when the elements between the data include highly substantial similarities; the pain-point may likely be the pain-point corresponding to the problem.

In some embodiments, all the problems of the problem data are compared with the pain-points of the pain-point and solution data until at least a semantic similarity score is given for a pain-point for each of the problems. For example, the problems of the problem data are compared with the pain-points of the pain-point and solution data until a most likely corresponding pain-point is determined for each problem.

In some examples, a problem may not have a corresponding pain-point or may have a corresponding pain-point with a low semantic similarity score (e.g., below a semantic similarity score threshold). In these instances, a user may be notified that an acceptable pain-point match for a problem has not been found. A SME may review the problem, provide a corresponding pain-point, and provide a recommendation to resolve the problem. In some embodiments, the provided corresponding pain-point and recommendation may be added to the pain-point and solution database. When a user provides a problem data including this previously-unmatched problem, this problem may now be matched with this newly added pain-point and solution.

As an exemplary advantage, by using AI algorithm or NLP to match the problem data and the pain-point and solution data, a more suitable match between a problem and a pain-point may be automatically and more efficiently determine. For example, a problem does not need to be manually matched with a pain-point from a large pain-point and solution database. Not only the manually matching process may be tedious, it may also not lead to the most suitable match; the wealth of knowledge and solutions from the pain-point and solution database may not be efficiently utilized. When a more suitable pain-point is matched with a problem (e.g., using AI algorithm or NLP), a more suitable recommendation would be given to address the problem, compared to a pain-point that is manually matched with a problem.

The process 3000 may include identifying a matching pain-point (step 3008). A pain-point from the pain-point and solution data may be matched with a problem of the problem data based on a semantic similarity score. For example, from step 3006, one or more pain-points potentially matched with the problem are given semantic similarity scores. In some examples, the pain-point with the highest semantic similarity score is identified as the matching pain-point to the problem. In some examples, more than one pain-points with the highest semantic similarity scores are identified as matching pain-points to the problem (e.g., more than one recommendation may be made for the problem). In some examples, a pain-point above a semantic similar score threshold is identified as the matching pain-point to the problem.

In some examples, a matching pain-point may not be identified for a problem because the problem may not have a matching pain-point or may have a corresponding pain-point with a low semantic similarity score (e.g., below a semantic similarity score threshold). In these instances, a user may be notified that an acceptable pain-point match for a problem has not been found. A SME may review the problem, provide a corresponding pain-point, and provide a recommendation to resolve the problem. In some embodiments, the provided corresponding pain-point and recommendation may be added to the pain-point and solution database. When a user provides a problem data including this previously-unmatched problem, this problem may now be matched with this newly added pain-point and solution.

The process 3000 may include identifying a function (step 3010). After the problems from the problem data are matched with pain-points from the pain-point and solution data (e.g., from step 3008), functions corresponding to the pain-points may be identified.

For example, the function is function 3204, and each matched pain-point may have one or more corresponding functions. As an example, as described with respect to FIG. 32, a matched pain-point to a problem may be "Manual procurement is tedious." The pain-point "Manual procurement is tedious" may have corresponding functions "procurement" and "information technology." Accordingly, these corresponding functions may be identified based on the pain-point. In some examples, the functions are identified from the pain-point and solution data (e.g., provided by a SME, provided using an AI or machine learning algorithm, provided using system 100), and a corresponding function may be identified from the pain-point and solution data based on a pain-point. In some examples, an AI or machine learning algorithm is used to identify functions corresponding to a pain-point. In some examples, the functions corresponding to a pain-point are identified based on information (e.g., about functions) stored in the system 100.

The process 3000 may include identifying a root cause (step 3012). For example, after functions corresponding to the pain-points are identified (e.g., from step 3010), root causes corresponding to the functions are identified. As another example, the root cause are identified after the problems from the problem data are matched with pain-points from the pain-point and solution data (e.g., from step 3008).

For example, the root cause is root cause 3206, and a root cause may correspond to an identified function (e.g., from step 3010) or to a matched pain-point (e.g., from step 3008). For example, as described with respect to FIG. 32, for a matched pain-point "Manual procurement is tedious" and/or an identified function "procurement," a root cause of "Lack of clearly defined approval hierarchy for product categories" may be identified. In some examples, the root causes are identified from the pain-point and solution data (e.g., provided by a SME, provided using an AI or machine learning algorithm, provided using system 100), and a corresponding root cause may be identified from the pain-point and solution data based on an identified function or a matched pain-point. In some examples, an AI or machine learning algorithm is used to identify a root cause corresponding to an identified function or a matched pain-point. In some examples, the root cause corresponding to an identified function or a matched pain-point are identified based on information (e.g., about functions) stored in the system 100.

The process 3000 may include identifying a solution (step 3014). For example, after root causes are identified (e.g., from step 3012), solutions corresponding to the root causes are identified. As another example, the solutions are identified after the problems from the problem data are matched with pain-points from the pain-point and solution data (e.g., from step 3008) or after functions corresponding to the pain-points are identified (e.g., from step 3010). In some embodiments, the identified solutions are published in the system 100.

For example, the solution is solution 3208, and a solution may correspond to an identified root cause (e.g., from step 3012), to an identified function (e.g., from step 3010), or to a matched pain-point (e.g., from step 3008). For example, as described with respect to FIG. 32, for a matched pain-point "Manual procurement is tedious," an identified function "procurement," and/or an identified root cause of "Lack of clearly defined approval hierarchy for product categories," a solution of "Approval hierarchy need to be clearly defined by product categories as well as value of the purchase order" is identified. In some examples, the solutions are identified from the pain-point and solution data (e.g., provided by a SME, provided using an AI or machine learning algorithm, provided using system 100), and a corresponding solution may be identified from the pain-point and solution data based on an identified root cause, function, or a matched pain-point. In some examples, an AI or machine learning algorithm is used to identify a solution corresponding to an identified root cause, an identified function, or a matched pain-point. In some examples, the solution corresponding to an identified root cause, an identified function, or a matched pain-point are identified based on information (e.g., about functions) stored in the system 100.

The process 3000 may include creating initiatives (step 3016). In some embodiments, the initiatives are created in the system 100 (e.g., in roadmap 5 of FIG. 1). The initiatives may be created based on the identified solutions. The initiatives may be actions that may be required to rectify the problems from the problem data. The initiatives may form a plan or a schedule (e.g., in the system 100) for a business to follow in order to resolve the problems from the problem data. The initiatives may be tracked over time (e.g., in the system 100) to determine a business' progress of resolving the problem.

The process 3000 may include identifying an associated solution KPI (step 3018). For example, an identified solution (e.g., from step 3014) may have an associated solution KPI. Even though step 3018 is illustrated as following step 3016, it is understood that step 3018 may be performed at a different order than illustrated. For example, step 3018 may be performed after a solution is identified (e.g., step 3014).

The process 3000 may include in response to identifying an associated solution KPI, recommending a solution KPI (step 3020). The solution KPI recommendation may be provided as an input to the system 100. The solution KPI may be used to monitor performance improvement (e.g., a progress associated with resolution of a problem), allowing a business to advantageously track improvements or regressions (e.g., at solving a problem) in a simple and quantitative manner.

Low performing or error-prone processes or sub-process and underlying causes may be advantageously monitored using KPIs (e.g., solution KPI, pain-point KPI). For example, the KPIs may provide details of metrics for an outcome-based approach. The KPIs may associate business outcomes with necessary capabilities and potential risk to project success rate.

In some examples, an associated solution KPI may not be identified (e.g., there may not be a solution KPI corresponding to the solution), recommendation of a solution KPI is forgone. In some examples, in response to not identifying an associated solution KPI, a corresponding solution KPI recommendation may be added (e.g., by a SME, using AI or machine learning algorithms).

Figure 33:
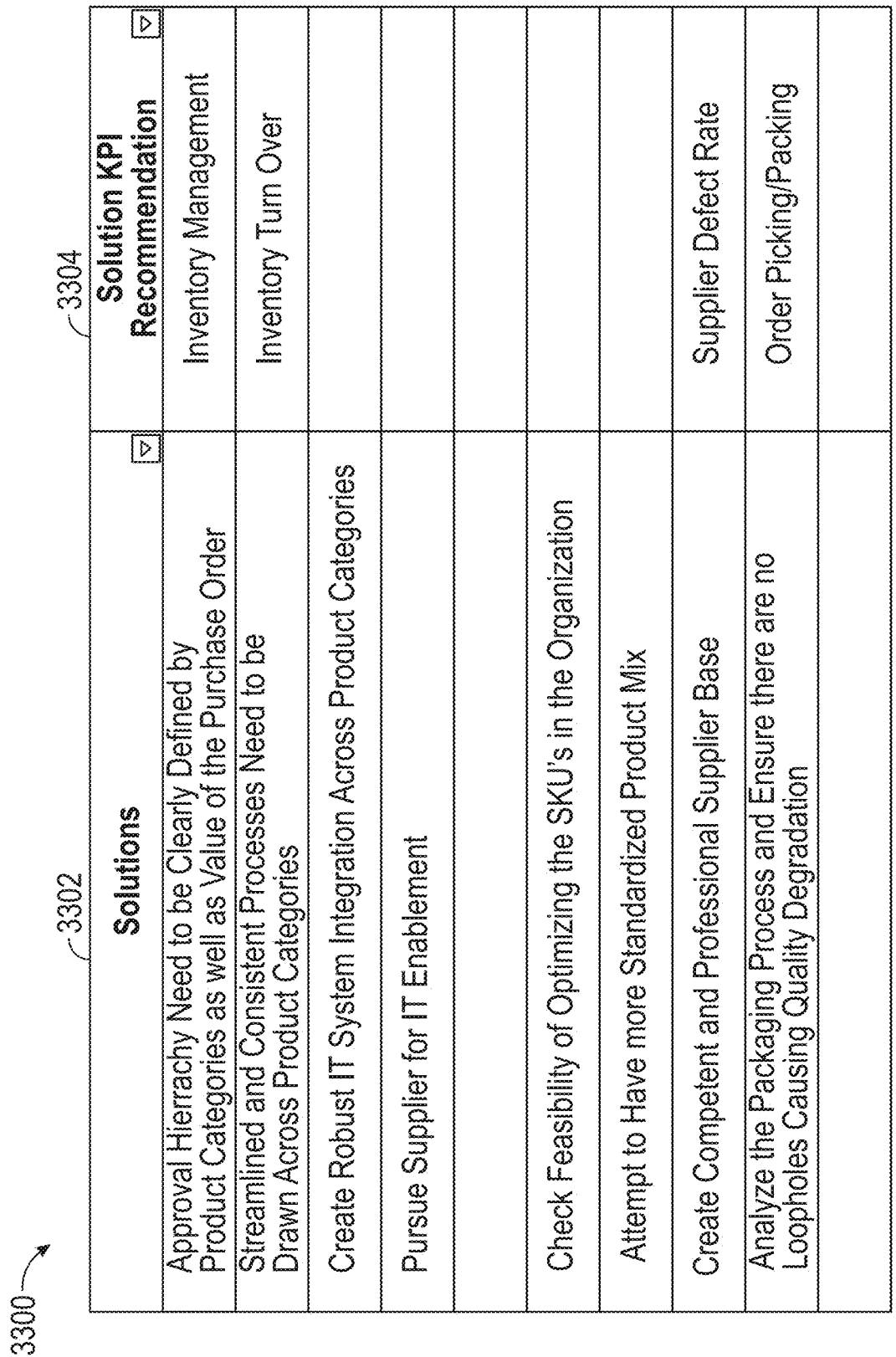
FIG. 33 illustrates an exemplary KPI, according to embodiments of this disclosure.

FIG. 33 illustrates exemplary solution KPI 3300, according to embodiments of this disclosure. As illustrated, the solution KPI 3300 includes solutions 3302 and solution KPI recommendations 3304. The solutions 3302 may be solutions identified from step 3014. A solution KPI corresponding to an identified solution may be provided by a SME (e.g., to the system 100, to the pain-point and solution data, to a solution KPI database). In some examples, an AI or machine learning algorithm is used to determine a solution KPI corresponding to an identified solution. In some examples, a solution KPI corresponding to an identified solution is determined based on information stored in the system 100.

For example, as illustrated, for a solution "Approval hierarchy need to be clearly defined by product categories as well as value of the purchase order," a solution KPI recommendation of "Inventory Management" is identified. Some solutions may not have a corresponding solution KPI recommendation. For example, for a solution "Create robust IT system integration across product categories," a solution KPI recommendation would not be identified. In some examples, if a solution does not have a corresponding solution KPI, a corresponding solution KPI recommendation may be added (e.g., by a SME, using AI or machine learning algorithms). Although the solutions 3302 and solution KPI recommendations 3304 are illustrated as being textual, it is understood that the solutions and solution KPI recommendations may be represented in other forms, such as numbers or codes.

Although the solution KPI 3300 is illustrated as being organized in column and rows and including the described information, it is understood that the illustration of the solution KPI 3300 is merely exemplary. It is understood that the solution KPI 3300 may be represented in other forms, may be organized in a different manner, and/or may include different information without departing from the scope of the disclosure.

Returning to FIG. 30, the process 3000 may include identifying an associated pain-point KPI (step 3022). For example, a matched pain-point (e.g., from step 3008) may have an associated pain-point KPI. Even though step 3022 is illustrated as following step 3016, it is understood that step 3022 may be performed at a different order than illustrated. For example, step 3022 may be performed after a matching pain-point is identified (e.g., step 3008).

The process 3000 may include in response to identifying an associated pain-point KPI, recommending a pain-point KPI (step 3020). The pain-point KPI recommendation may be provided as an input to the system 100. The pain-point KPI may be used to monitor performance improvement (e.g., a progress associated with elimination of a pain-point), allowing a business to advantageously track improvements or regressions (e.g., at eliminating a pain-point) in a simple and quantitative manner. In some examples, an associated pain-point KPI may not be identified (e.g., there may not be a pain-point KPI corresponding to the pain-point), recommendation of a pain-point KPI is forgone. In some examples, in response to not identifying an associated pain-point KPI, a corresponding pain-point KPI recommendation may be added (e.g., by a SME, using AI or machine learning algorithms).

FIG. 34 illustrates exemplary pain-point KPI 3400, according to embodiments of this disclosure. As illustrated, the pain-point KPI 3400 includes pain-points 3402 and pain-point KPI recommendations 3404. The pain-points 3402 (e.g., matched pain-points) may be solutions identified from step 3008. A pain-point KPI corresponding to a matched pain-point may be provided by a SME (e.g., to the system 100, to the pain-point and solution data, to a pain-point KPI database). In some examples, an AI or machine learning algorithm is used to determine a pain-point KPI corresponding to a matched pain-point. In some examples, a pain-point KPI corresponding to a matched pain-point is determined based on information stored in the system 100.

For example, as illustrated, for a pain-point "Manual procurement process is tedious," a pain-point KPI recommendation of "Purchase Order Cycle Time" is identified. In some examples, some matched pain-points may not have a corresponding pain-point KPI recommendation (not shown). In some examples, if a pain-point does not have a corresponding pain-point KPI, a corresponding pain-point KPI recommendation may be added (e.g., by a SME, using AI or machine learning algorithms). Although the solutions 3302 and solution KPI recommendations 3304 are illustrated as being textual, it is understood that the solutions and solution KPI recommendations may be represented in other forms, such as numbers or codes.

Although the pain-point KPI 3400 is illustrated as being organized in column and rows and including the described information, it is understood that the illustration of the pain-point KPI 3400 is merely exemplary. It is understood that the pain-point KPI 3400 may be represented in other forms, may be organized in a different manner, and/or may include different information without departing from the scope of the disclosure.

Returning to FIG. 30, the process 3000 may include summarizing a recommendation (step 3026). For example, summarizing a recommendation includes saving the identified solutions (e.g., from step 3014), recommended solution KPI (e.g., from step 3020), and/or recommended pain-point KPI (e.g., from step 3024) in one or more files (e.g., a recommendation file, recommendation file 3500). The one or more files may be used for further processing (e.g., for a user to review, tracking a progress of resolving a problem, tracking a progress of eliminating a pain-point, assessing a performance of a business) to improve performance of the business.

FIG. 35 illustrates exemplary recommendation file 3500, according to embodiments of this disclosure. As illustrated, the recommendation file 3500 includes problems 3502, functions 3504, root causes 3506, solutions 3508, solution KPI recommendations 3510, and pain-point KPI recommendations 3512. In some embodiments, the recommendation file 3500 is configured to be filtered. For example, the recommendation file 3500 is configured to show a subset of all of recommendations in response to a user input (e.g., a user requested to see recommendations associated with certain domains).

For example, the problems 3502 are problems 3102 (e.g., identified at step 3002, step 3006, and/or step 3008), functions 3504 are functions 3204 (e.g., identified at step 3010), root causes 3506 are root causes 3206 (e.g., identified at step 3012), solutions 3508 are solutions 3208 (e.g., identified at step 3014), solution KPI recommendations 3510 are solution KPI recommendations 3304 (e.g., identified at step 3020), and pain-point KPI recommendations 3512 are pain-point recommendations 3404 (e.g., identified at step 3024). The recommendation file 3500 may advantageously provide a comprehensive summary of a business' more critical problems, solutions to the problem, and quantitative metrics (e.g., KPIs) to monitor and track progress of the solutions.

Although the recommendation file 3500 is illustrated as being organized in column and rows and including the described information, it is understood that the illustration of the recommendation 3500 is merely exemplary. It is understood that the recommendation 3500 may be represented in other forms, may be organized in a different manner, and/or may include different information without departing from the scope of the disclosure. For example, the recommendation 3500 may include matched pain-points (e.g., from step 3008).

Returning to FIG. 30, as another example, summarizing a recommendation includes presenting the identified solutions (e.g., from step 3014), recommended solution KPI (e.g., from step 3020), and/or recommended pain-point KPI (e.g., from step 3024) on a UI. The UI may be a dashboard of the system 100. The UI may allow the recommendation to be more effectively summarized and more critical information from the recommendation may be identified to effectively improve performance of a business.

Figure 36:
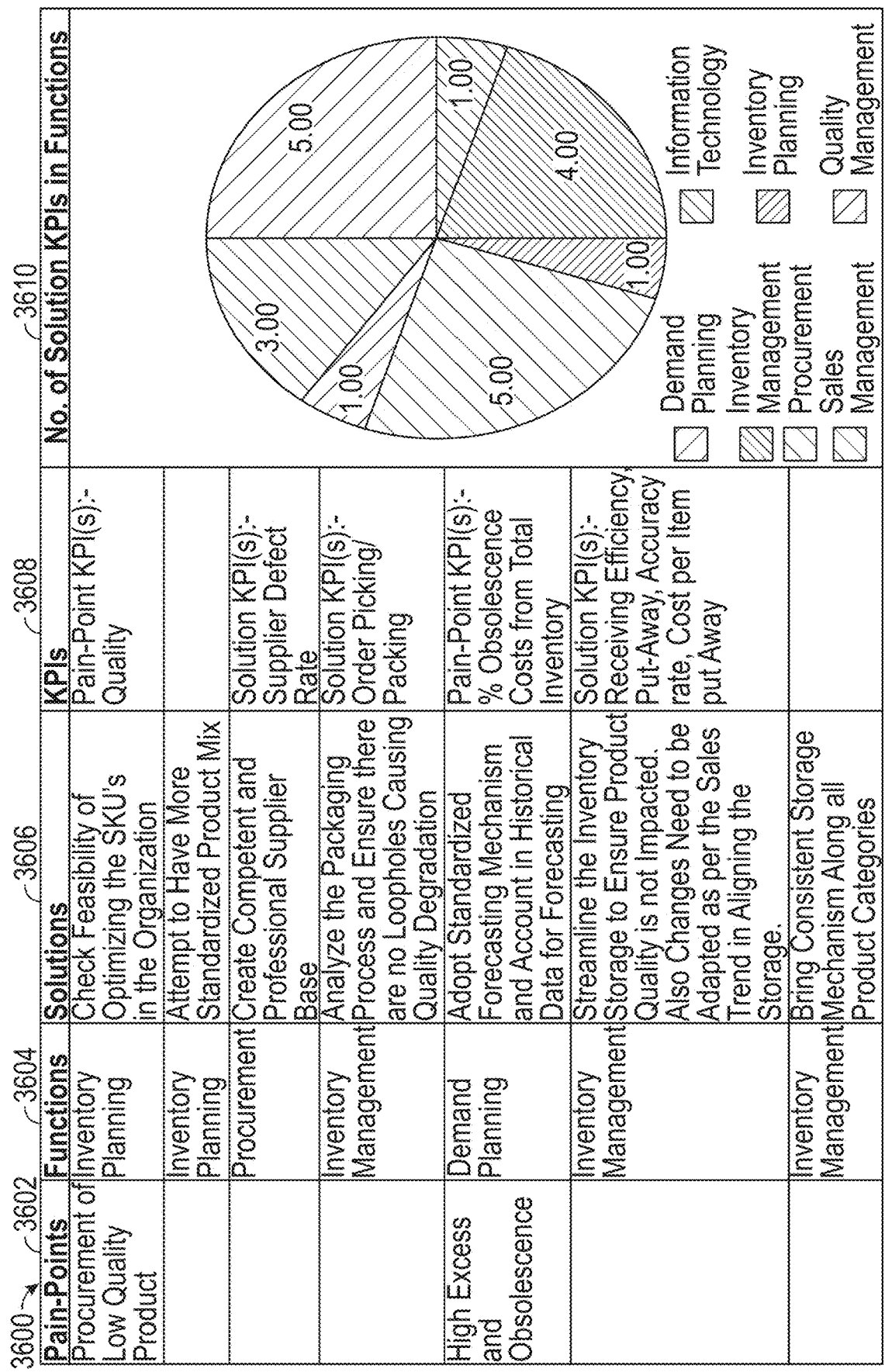
FIG. 36 illustrates an exemplary user interface, according to embodiments of this disclosure.

FIG. 36 illustrates an exemplary UI 3600, according to embodiments of this disclosure. The UI 3600 may be a dashboard of the system 100. As illustrated, the UI 3600 includes pain-points 3602, functions 3604, solutions 3606, KPI recommendations 3608, and UI object 3610. In some embodiments, the UI 3600 is configurable. For example, a user may provide an input to the UI 3600 to sort, filter, hide, or manipulate the information displayed on the UI.

For example, the pain-points 3602 are pain-points 3202 (e.g., identified at step 3008), functions 3604 are functions 3204 (e.g., identified at step 3010), solutions 3606 are solutions 3208 (e.g., identified at step 3014), and KPI recommendations 3608 include solution KPI recommendations 3304 (e.g., identified at step 3020) and/or pain-point recommendations 3404 (e.g., identified at step 3024). The UI 3610 may include a representation (e.g., a visual representation, a pie chart, a bar graph, a plot) of information associated with a recommendation. For example, as illustrated, the UI 3610 is a pie chart summarizing numbers of solutions in the different function areas. It is understand that the illustrated information and the illustrated representation for UI 3610 is not meant to be limiting. The UI 3600 may advantageously provide a pointed summary of a business' more critical problems, solutions to the problem, and quantitative metrics (e.g., KPIs) to monitor and track progress of the solutions.

Although the UI 3600 is described as illustrated, it is understood that the illustration of the UI 3600 is merely exemplary. It is understood that the UI 3600 may be presented in other forms, may be organized in a different manner, and/or may include different information without departing from the scope of the disclosure. For example, the UI 3600 may include problems (e.g., identified at step 3002, step 3006, and/or step 3008) and/or root causes (e.g., identified at step 3012).

The process 3000 may include updating the pain-point and solution data (not shown in FIG. 30). The pain-point and solution data may be updated in accordance with an effectiveness of a recommendation. For example, if a recommended solution and/or KPI is determined to be effective (e.g., the recommendation helps a business resolve a problem and/or eliminate a pain-point), then the pain-point and solution data is updated to more likely recommend the same recommendation for a corresponding problem (e.g., a problem and pain-point corresponding to the effective recommendation are more likely matched). As another example, if a recommended solution and/or KPI is determined to be not effective (e.g., the recommendation does not help a business resolve a problem and/or eliminate a pain-point), then the pain-point and solution data is updated to less likely recommend the same recommendation for a corresponding problem (e.g., a problem and pain-point corresponding to the effective recommendation are less likely matched).

For example, the system 100 determines whether or not an effectiveness of the solution to the problem (e.g., a quantitative indicator of an effectiveness of the solution to the problem) is below an effectiveness threshold (e.g., a minimum requirement of the quantitative indicator). When the effectiveness of the solution to the problem is below the effectiveness threshold, the system 100 disassociates the solution with the problem. When the effectiveness of the solution to the problem is not below the effectiveness threshold, the system 100 forgoes disassociating the solution with the problem. By updating the pain-point and solution data in accordance with an effectiveness of a recommendation, the pain-point and solution data may be further improved (e.g., additional improvement to SME contributions to the pain-point and solution data over time) over time to account for effectiveness of the recommendations.

Exemplary Design Thinking Process

In some embodiments, the system 100 may be configured to provide a platform to enable stakeholders, (e.g., users) in the target business to perform a design thinking process. The design thinking process can provide stakeholders with a structure for identifying and solving complex problems to innovate within the target business. In some embodiments, the system 100 can provide users with a platform that enables them to address multiple problems simultaneously through the design thinking process. In some embodiments, the design thinking process can conclude with an adaptive roadmap. In some embodiments, the system 100 can provide a design thinking platform that can leverage data gathered from other processes performed by the system, e.g., benchmarking processes, capability process, KPI process, etc.

Embodiments of the design thinking process in accordance with this disclosure may integrate the design thinking process with other processes disclosed herein, including, for example, benchmarking, process decomposition, and performance measuring. For example, the design thinking process can apply outcomes and data determined during these other processes to aid in decision making throughout the design thinking process.

Figure 37:
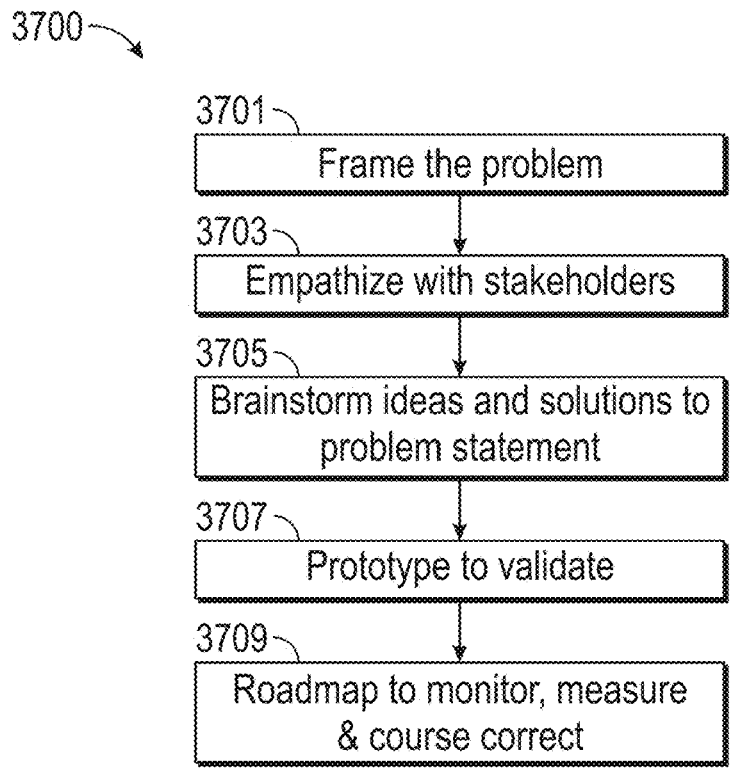
FIG. 37 illustrates a flowchart of an exemplary design thinking process, according to embodiments of this disclosure.

FIG. 37 illustrates a flowchart of process 3700 for performing a design thinking (DT) process, according to embodiments of this disclosure. Although the process 3700 is illustrated as including the described elements, it is understood that different order of elements, additional elements, or fewer elements may be included without departing from the scope of the disclosure. For example, in some embodiments, the process 3700 may be a non-linear process.

As illustrated, the process 3700 may include framing the problem (step 3701). Framing the problem may include receiving one or more problem statements from a certain user, referred to as a DT coordinator (e.g., DT champion). The step 3701 may include refining the one or more problem statements using data gathered during one or more of the processes described above. Additionally or alternatively, the problem statement(s) may be refined based on one or more sub-problem statements. The DT coordinator may be an individual responsible for completing the DT process in collaboration with identified stakeholders to resolve the one or more problem statements.

The process 3700 may include empathizing with stakeholders (step 3703). During step 3703, the system 100 can identify stakeholders affected by the one or more problem statements, receive empathy data related to the identified stakeholders, build a customer journey map for each stakeholder (e.g., as a persona), and aggregate the customer journey maps to build an aggregated problem statement experience map. In some embodiments, the system 100 can rely on data gathered during other processes to identify additional stakeholders and processes impacted by the problem statement (e.g., in the influence mapped discussed in greater detail below).

In step 3705, the system 100 can provide the identified stakeholders a platform to brainstorm and collaborate to identify potential solutions to the one or more problem statements. In some embodiments, the system 100 may enable stakeholders located around the globe to engage in the collaborative brainstorming process. The system 100 may save data for each brainstorming session to the second database 207.

In some embodiments, the system may recommend one or more potential solutions. In some embodiments, the DT coordinator can select one or more potential solutions to be prototyped in step 3707. During step 3707, the system 100 can provide a platform for prototyping the selected solution. Each iteration of the prototyping process can be saved as a separate, retrievable version in the second database.

The DT process 3700 may also include building a roadmap (step 3709). The roadmap may include one or more milestones to be completed according to a predetermined schedule. In some embodiments, the system 100 can generate the roadmap and set the schedule based on the information provided in the earlier steps of the DT process 3700. In some embodiments, the roadmap may include probabilities of the likelihood of completing each milestone based on the schedule.

Figure 38:
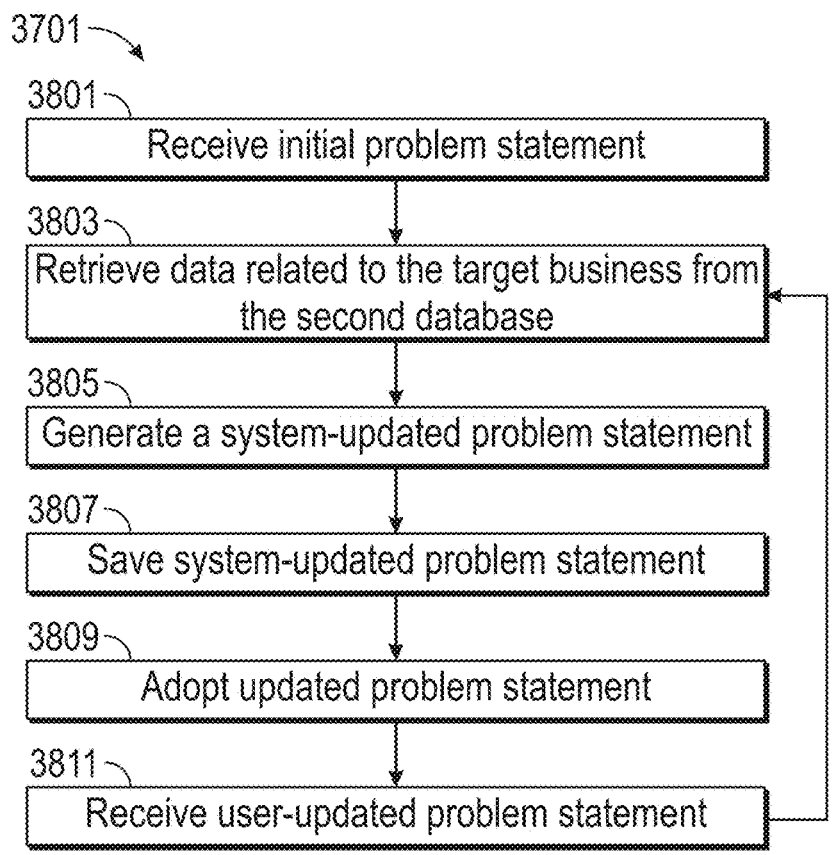
FIG. 38 illustrates a flowchart of an exemplary design thinking process, according to embodiments of this disclosure.

FIG. 38 illustrates a flowchart of process 3701 for framing the problem. Although the process 3701 is illustrated as including the described elements, it is understood that different order of elements, additional elements, or fewer elements may be included without departing from the scope of the disclosure.

As illustrated, the process 3701 may include receiving an initial problem statement (step 3801). In some embodiments the system 100 can receive the initial problem statement from the DT coordinator via the website 201. For example, the DT coordinator may input their conception of the initial problem statement into a UI provided via website 201. In some embodiments, the DT coordinator can enter one or more initial problem statements. Each initial problem statement may be broken down into one or more sub-problem statements. In some embodiments, receiving the initial problem statement may include adopting (described in more detail below) and saving the initial problem statement to the second database 207.

In step 3803, the system 100 can extract data related to the target business from the second data base 207. For example, the data related to the target business may include data gathered from other processes of performed by the system, e.g., benchmarking processes, process decomposition, KPI setting. The system 100 may access this data from the second database 207. In step 3805, the system 100 may generate updated problem statements based on the data retrieved in step 3803. In some embodiments, the updated problem statements can include one or more updated sub-problem statements.

In step 3807, the updated problem statement can be saved to the second database 207. In some embodiments, saving the updated problem statement may include saving one or more updated sub-problem statements to the second database 207. In this way, the system 100 can create a virtual paper trail of each version of the initial and updated problem statements.

At step 3809, the system 100 can adopt the updated problem statement. The adopted updated problem statement may be used going forward through the remainder of the DT process as described below. In some embodiments, the system 100 may receive an indication that a user (e.g., the DT coordinator) approves the updated problem statement, and the system 100 can adopt the approved-updated problem statement. In such embodiments, if the user does not approve the updated problem statement, the system 100 may use the most-recently adopted version of the problem statement. In some embodiments, the system 100 may automatically use the system-updated problem statement going forward through the remainder of the DT process without user input.

In some embodiments, the user can edit the system-updated problem statement with a user-updated problem statement (step 3811). In such embodiments, following receipt of the user-updated problem statement, the system 100 can repeat steps 3803-3809, as described above. As described above, the DT process 3700 can be a nonlinear process. In some embodiments, once the user has started other processes of the DT process 3700 (e.g., empathizing step 3703, brainstorming step 3705, etc.) the user may update the problem statement.

Figure 39:
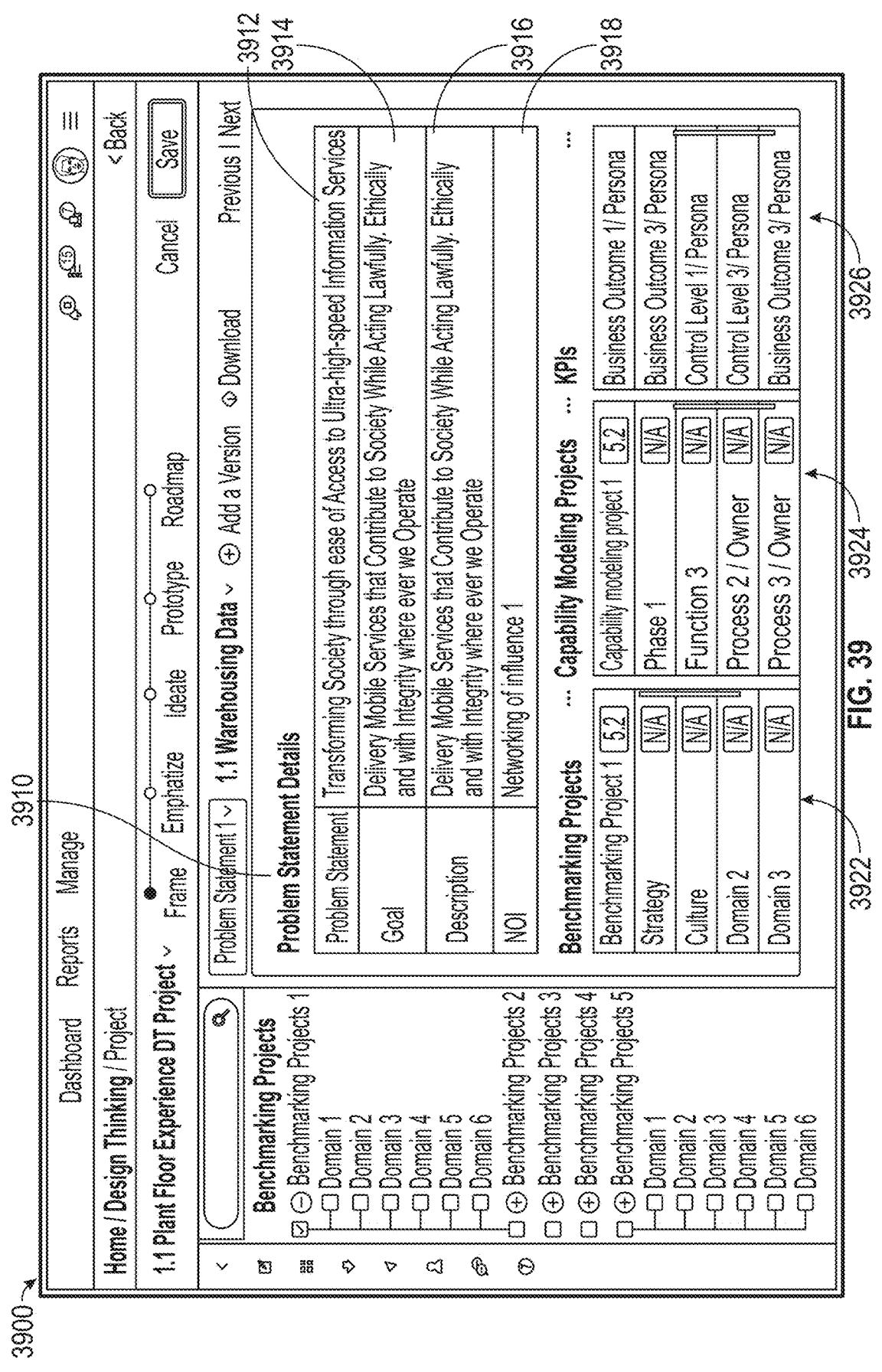

FIG. 39 illustrates an exemplary problem statement UI 3900. As illustrated, the problem statement details 3910 may include an adopted problem statements 3912, goal 3914, description 3916, and network of influence 3918 (described in more detail below). The problem statement 3912 may reflect the adopted problem statement. In some embodiments, the user may provide the system 100 with the goal(s) and description(s). In some embodiments, the system may generate the goal(s) and description(s). In some embodiments, the system may update user-provided goal(s) and description(s). In some embodiments, the problem statement UI may present one or more projects related to other processes performed by the system 100 for the target business. For example, as illustrated, the problem statement UI 3900 presents one or more benchmarking projects 3922, capability modeling projects, 3924, and KPIs 3926. In some embodiments, the system 100 may automatically populate the one or more benchmarking projects 3922, capability modeling projects 3924, and KPIs 3926, based on user inputs provided in the other processes described above. The projects may be related to the problem statement. As illustrated in the FIG. the one or more benchmarking projects 3922, capability modeling projects 3924, and KPIs 3926 may include corresponding scores. The scores may be based on benchmarking scores determined in the benchmarking and capability modeling processes.

Figure 40:
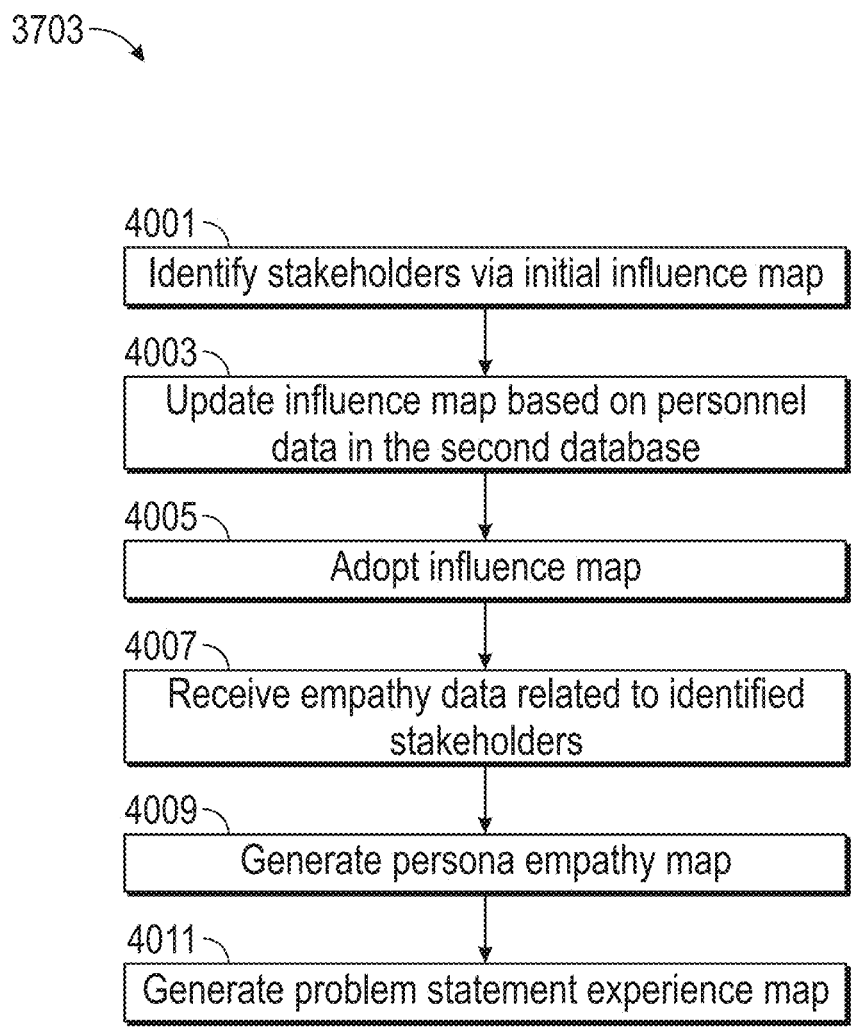
FIG. 40 illustrates a flowchart of an exemplary design thinking process, according to embodiments of this disclosure.

FIG. 40 illustrates a flowchart of process 3703 for empathizing with a stakeholder. Although the process 3703 is illustrated as including the described elements, it is understood that different order of elements, additional elements, or fewer elements may be included without departing from the scope of the disclosure.

As illustrated, the process 3703 includes identifying stakeholders. In some embodiments, the system 100 can present a user (e.g., the DT coordinator), via website 201, an influence map template corresponding to the adopted problem statement. The system 100 can identify stakeholders via an initial influence map completed by the user (step 4001). The initial influence map may be saved to the second database 207. An influence map may include a list of stakeholders of the target business that are affected by the adopted problem statement. As referred to herein, an impactee may be a stakeholder who is affected by the problem statement and an impactor may refer to a stakeholder that affects the problem statement. In some embodiments, the influence map template may allow the user to identify stakeholders, identify relationships between the stakeholders, identify the amount of control a stakeholder has over the processes related to the adopted problem statement, and identify touchpoints.

Figure 41:
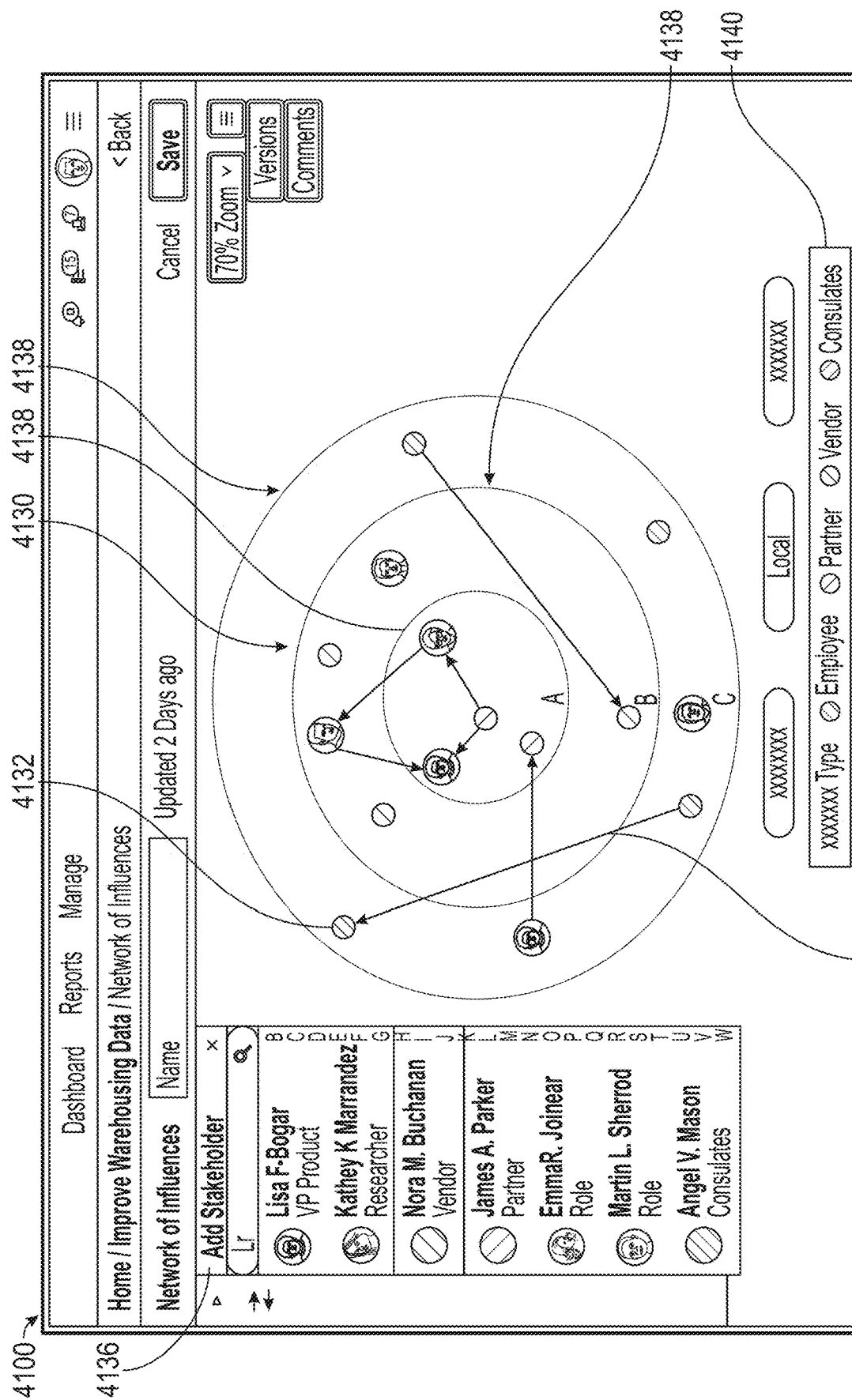
FIG. 41 illustrates an exemplary user interface, according to embodiments of this disclosure.

FIG. 41 illustrates an exemplary network of influence UI 4100. The network of influence UI 4100 may include an influence map 4130 including one or more stakeholders 4132. As illustrated, each stakeholder 4132 may be represented by a dot. The legend 4140 may identify each type of stakeholder in the adopted problem. For example, different colors or patterns in the dot may be indicative of different types. The legend 4140 can include customer (not illustrated), employee, partner, vendor, consultant, and machine types. The network of influence UI 4100 may include a searchable list of stakeholders 4136. Multiple influence maps 4130 may be generated for the adopted problem statement.

The location of the stakeholder 4132 on the UI 4100 may indicate the type and the amount of control the stakeholder has over processes related to the problem statement. The influence map 4130 may illustrate this using one or more control circles 4138. Although three control circles 4138 are illustrated, any number of control circles 4138 may be included without departing from the scope of this disclosure. In some examples, a user can drag and drop an icon that represents a stakeholder into the appropriate control circle. Stakeholders 4132 located closer to the middle may exert more control over processes related to the adopted problem statement than stakeholders located closer to the edges of the map 4130. In some embodiments, the distances between the dots may represent the magnitude and the strength of control that the impactor exerts over an Impactee. In some embodiments, each control circle 4138 may be associated with a certain level of control defined by the user. In some embodiments, the user can define which processes related to the adopted problem statement the stakeholder controls.

The influence map 4130 can also indicate the relationship of stakeholders 4132 to each other. As illustrated, arrows 4134 can indicate the relationship of stakeholders 4132 to each other. In some embodiments, the direction of an arrow can indicate a direction of influence. For example, an assembly line employee stakeholder may be impacted by a decision made by a financial partner stakeholder. In this example, an arrow 4134 may point from the financial partner stakeholder to the assembly line employee stakeholder. In some embodiments, the arrows may have different weights (e.g., thicknesses and/or color) that indicate the impact that the influence has on the stakeholder (e.g., three or more weights indicating a high medium or low intensity of control). In some embodiments, a thicker line may indicate a stronger impact and/or different and/or bolder shade of similar color.

In some embodiments, the influence map 4130 may also include one or more control points where a stakeholder interacts with at least one of: another stakeholder, a process, and a machine. In some embodiments, a user may provide a qualitative description of one or more control points. As used herein, nodes may refer to a point of interaction between two or more stakeholders. As used herein, modes may refer to a channel or touchpoint a stakeholder may interface with, such as people, process user interfaces, machines, culture, environment, ambience and hearsay. Based on the visual and qualitative descriptions of control in the influence map 4130, a user may be able to identify which stakeholders exert the most control and the intensity of this control. As a result, this visualization can aid the system 100 and users in identifying bottlenecks and inefficiencies, which in turn can enable risk mitigation.

Referring back to process 3703 in FIG. 40, in step 4003, the system 100 can update the influence map 4130 based on personnel data in the second database 207. Personnel data may relate to the one or more stakeholders and/or processes identified by the user in step 4001. The personnel data may correspond to data that was gathered in other processes (e.g., benchmarking, process decomposition, and KPIs). For example, personnel data gathered during the process decomposition may be used to associate stakeholders with a problem statement. In this way, the system 100 may be able to identify missing stakeholders and identify missing links between stakeholders. The updated influence map 4130 can be saved to the second database 207 as a new version, distinct from the initial influence map entered by the user in step 4001.

In step 4005, the system can use the influence map. In some embodiments, the system 100 may automatically use the updated influence map generated in step 4003. In some embodiments, a user can accept the suggested updates from system 100 before using the updated influence map. An influence map in accordance with embodiments of this disclosure may be used to visualize and identify causes for bottlenecks and inefficiencies in processes related to the adopted problem statement. The adopted influence map may provide the user with a visual representation of points and types of controls within processes that may indicate underlying inefficiencies.

In step 4007, the system 100 can receive empathy data from the user related to the identified stakeholders in the adopted influence map. In some embodiments, the degree of influence exerted by one stakeholder on another (e.g., indicated by the arrows 4134) can inform the empathy data. In some examples, the system 100 may present the DT coordinator with an empathy map to input empathy data related to the identified stakeholders. In some embodiments, the stakeholders may access a version of the empathy map to input their empathy data.

In some embodiments, videos of the identified stakeholders (e.g., videos of interviews of the stakeholder) may be uploaded to the system 100, and video-facial recognition algorithms and may be used to analyze facial expressions. In some embodiments, audio processing and speech recognition algorithms may be used to transcribe the interviews. In some embodiments, the system 100 can generate an empathy map based on video interviews of a stakeholder. The video-analysis may assist the DT coordinator in assessing and understanding the needs and emotions of the stakeholders, thereby increasing the efficiency and accuracy of the empathy maps. Using videos of interviews will be discussed in more detail later.

Figure 42:
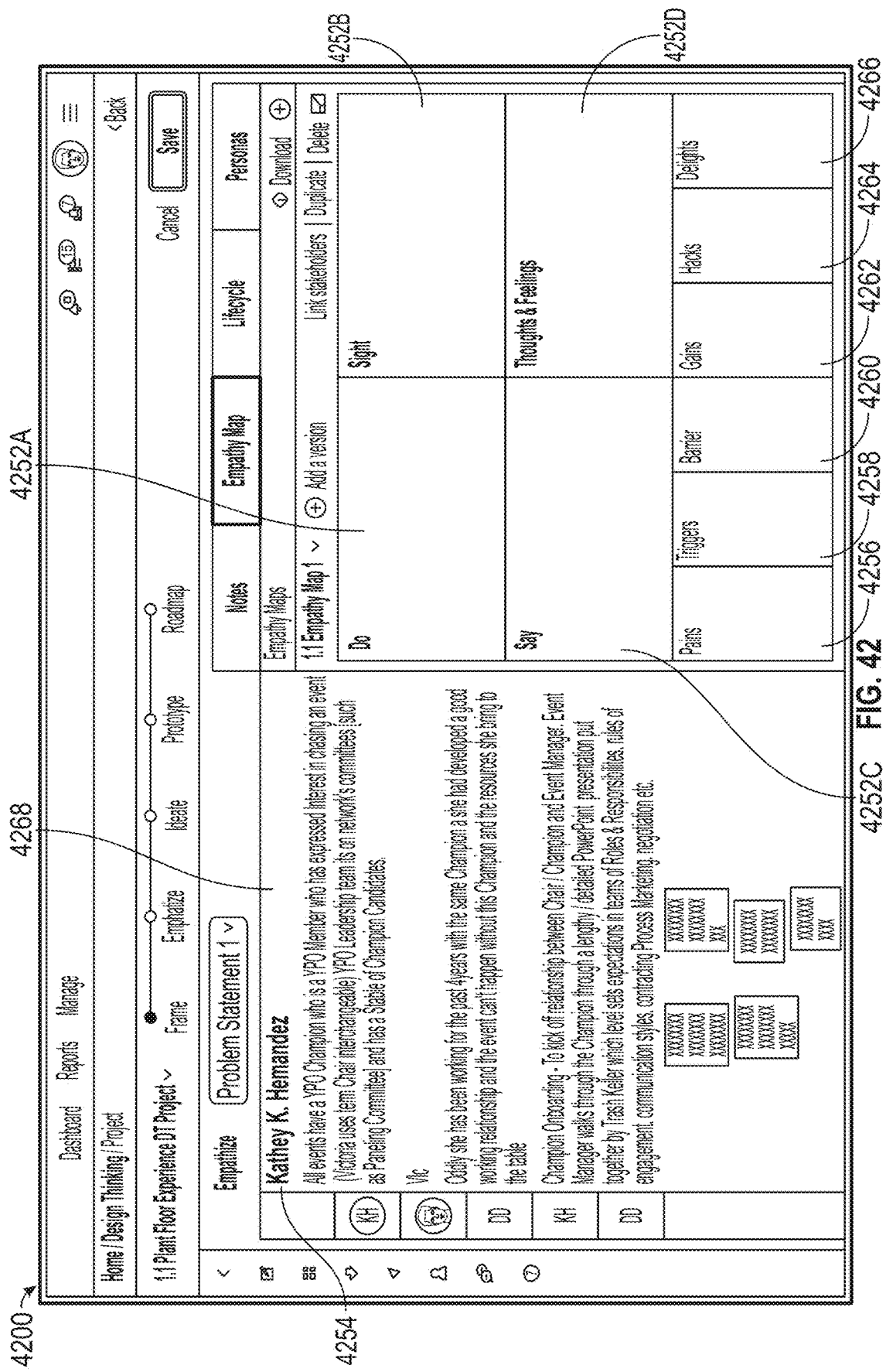
FIG. 42 illustrates an exemplary user interface, according to embodiments of this disclosure.

FIG. 42 illustrates an exemplary empathy map UI 4200. An empathy map UI 4200 may include a notes section 4268 and empathy map regions 4252A-4252D. The empathy map UI 4200 may also include one or more stakeholder triggers 4256, pains 4258, barriers 4260, gains 4262, hacks 4264, and delights 4266. The system 100 can generate an empathy map for each stakeholder. In some embodiments, the system 100 can generate separate empathy maps for different processes and different stages of processes. In some embodiments, the system 100 can generate a single empathy map that encompasses different processes and different stages within a process. In some embodiments, the empathy map can illustrate the experience and interactions of a stakeholder with one or more of other stakeholders, machines, environment, and the process itself.

The empathy notes section 4268 may include notes and/or anecdotes associated with the stakeholder 4254. The empathy map regions may be used to document the experience of a stakeholder during a process associated with the adopted problem statement. For example, as illustrated in the figure, empathy map region 4252A can be used to document what the stakeholder 4254 would do (e.g., the actions and activities completed by the stakeholder 4254) during the process. Empathy map region 4252B can be used to document what the stakeholder 4254 would see during the process; empathy map region 4252C can be used to document what the stakeholder 4254 would say during the process; and empathy map region 4252D can be used to document what the stakeholder 4254 would think and feel during the process. These empathy map regions may be based on interviews of the stakeholder 4254, direct input of the stakeholder 4254 into the system, and the like.

As illustrated in the figure, the empathy map UI 4200 may include one or more stakeholder triggers 4256, pains 4258, barriers 4260, gains 4262, hacks 4264, and delights 4266. Stakeholder triggers 4256 may refer to functional and motivational needs of a particular stakeholder 4254. Stakeholder pains 4258 may refer to feelings or emotions stakeholder 4254 may experience as related to performing a specific task. Stakeholder barriers 4260 may refer to deterrents experienced by a stakeholder 4254 when performing certain tasks. Gains 4262 may refer to unmet stakeholder needs. Stakeholder hacks 4264 may refer to certain information that can circumvent stakeholder pains. Stakeholder delights 4266 may refer to areas that provide comfort or ease to stakeholder 4254. In some examples, triggers may include loss of users due to bad experience, pains may include slow customer service, barriers may include budgetary issues, gains may include stitching various systems into one integrated experience center, hacks may include manual steps to keep customer happy, and delights may include automating experience. This list is merely exemplary and other examples of triggers, pains, barriers, gains, hacks, and delights may be used without departing from the scope of this disclosure.

Referring back to FIG. 40, the system 100 can generate a persona journey map (step 4009) based on the empathy map completed during step 4007. As used herein, a persona can refer to an archetypal user. In some embodiments, the persona journey map or persona empathy map may be based on one or more empathy maps generated in step 4007. A persona may represent a single stakeholder or may be aggregated from two or more stakeholder empathy maps. The persona journey map may include the experiences of the persona map across the lifecycle of a product or process with insights into functional, behavioral and emotional aspects of the persona. The persona journey map may organize touchpoints, stakeholder interactions, and emotional experiences of the persona in the context of the one or more processes related to the adopted problem.

Figure 43:
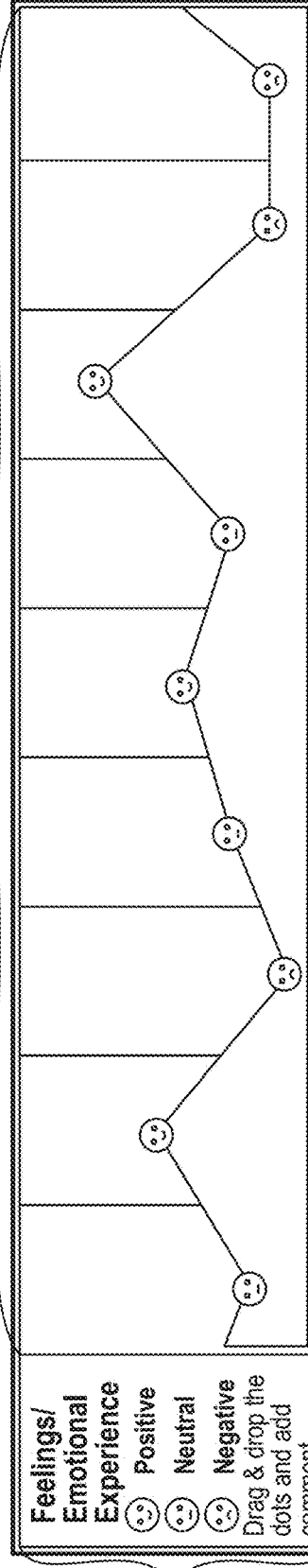
FIG. 43 illustrates an exemplary map, according to embodiments of this disclosure.

FIG. 43 is an exemplary persona journey map 4300, in accordance with embodiments of this disclosure. As illustrated in FIG. 43, an exemplary persona journey map 4300 may include the feelings or emotional experiences 4370 of a persona throughout the different stages 4378 of a process related to the adopted problem statement. The persona journey map 4300 may also include a description of the experiences 4372 during the different stages 4378 of a process related to the adopted problem statement. In some embodiments, a user and/or the system 100 can flag 4374 one or more emotional experiences. In some embodiments, the persona journey map 4300 may include the relationship between one or more stakeholders. For example, the relationship may be described in terms of which stakeholder exerts influence or an impact on another stakeholder. Describing the relationship in this manner may provide clarity to the problem statement and aid in prioritizing the problem statement (e.g., sub-problem statements) and solutions.

Figure 44:
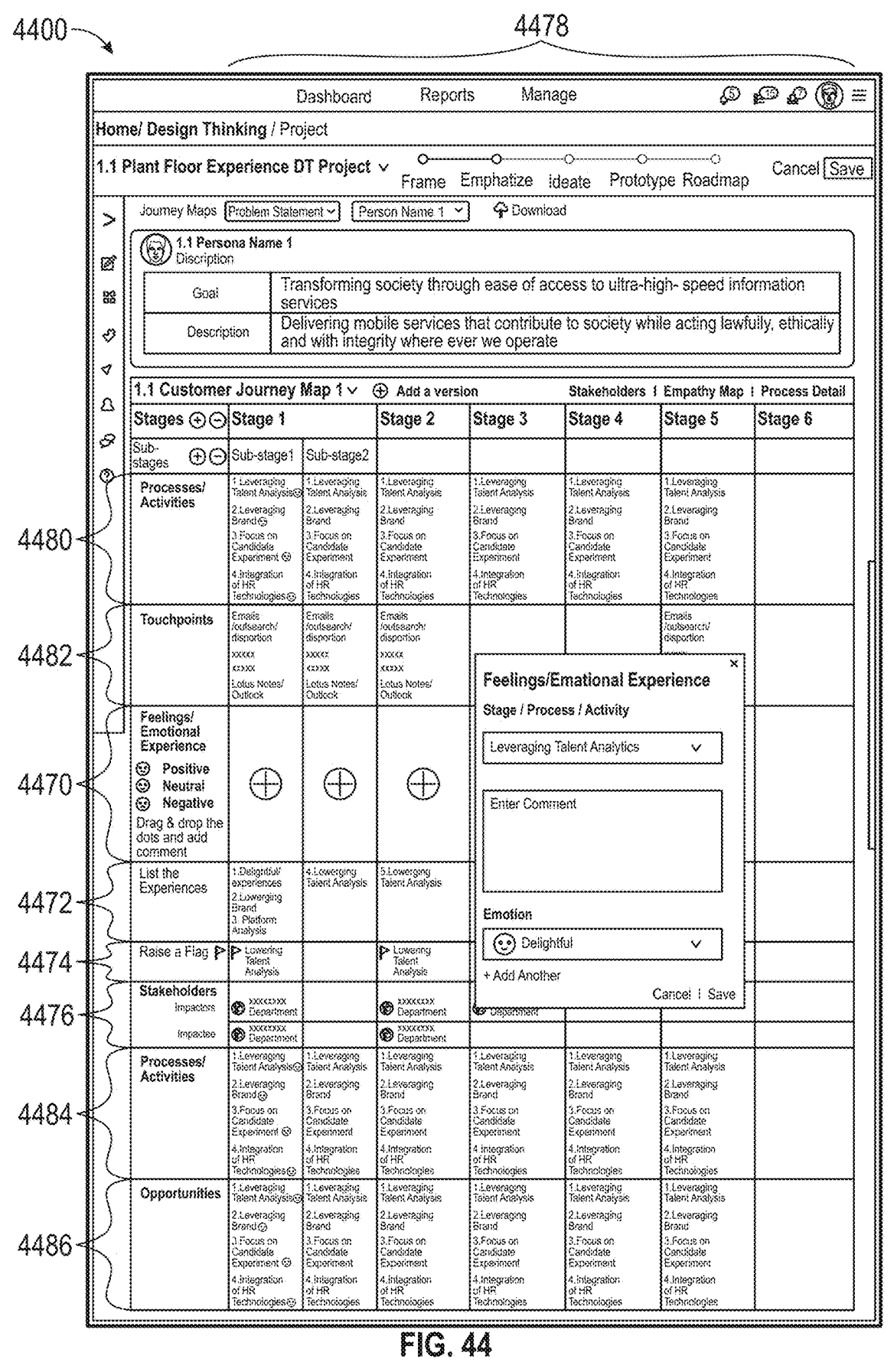

FIG. 44 is an exemplary persona journey map 4400, in accordance with embodiments of this disclosure. As illustrated in the figure, persona journey map 4400 may also include a description of the processes and/or activities the persona may engage in during each stage 4478. For example, the persona journey map 4400 may include a description of processes 4480, touchpoints 4482, emotional experiences 4470, a description of the experiences 4472, one or more flags 4474 of an experience, one or more stakeholders 4476, pain-points 4484, and opportunities 4486. As discussed above, the system 100 may automatically generate a persona journey map from one or more empathy maps.

In step 4011, the system 100 can aggregate the persona journey maps associated with the adopted problem into a problem statement experience map. The problem statement experience map may represent the problem statement as it is experienced by one or more personas throughout the stages of the one or more processes and/or lifecycles associated with the problem statement. In some embodiments, the persona journey map may represent one or more problem statements as it is experienced by one or more personas throughout the stages of the one or more processes associated with the problem statement. In some embodiments, the experience map may provide a visualization of how personas, stakeholders, and machinery overlap throughout one or more processes associated with the problem statement. In some embodiments, the system 100 can use ML to identify reoccurring opportunities and pain-points in the experience map. In some embodiments, the system 100 may prioritize the problem statement and/or solutions based on the ML analysis.

Figure 45:
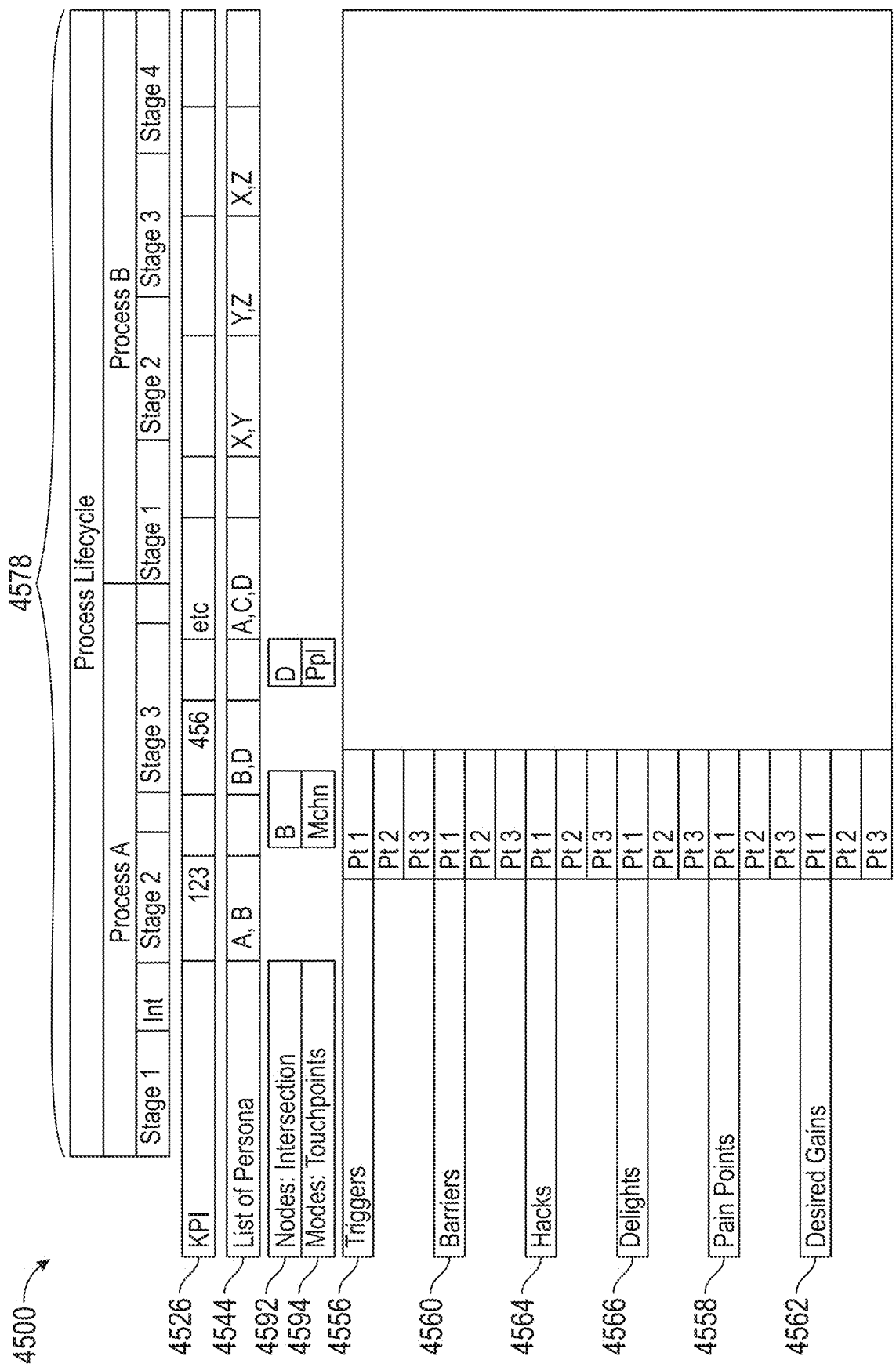
FIG. 45 illustrates an exemplary map, according to embodiments of this disclosure.

FIG. 45 illustrates an exemplary problem statement experience map 4500. As illustrated in the figure, the exemplary problem statement experience map 4500 may include a visualization of the KPIs 4526 (e.g., KPIs determined during process 3300) across the stages of one or more processes 4578. The experience map 4500 may include a list of personas 4544. In some embodiments, personas identified during step 4009 (e.g., while generating persona empathy maps) may be organized in the experience map 4500 based on their association with the stages of one or more processes 4578. The exemplary experience map 4500 may further include one or more control points 4590, as identified in the adopted influence map 4130 (step 4005 in process 3703). The exemplary problem statement map 4500 may also include one or more persona triggers 4256, pains 4258, barriers 4260, gains 4262, hacks 4264, and delights 4266 associated with each stage of the one or more processes 4578. In some embodiments, the experience map can include the persona journey map and include the actual experience (as is) of the one or more personas as well as the experience the persona would like to have (to be).

Figure 46A:
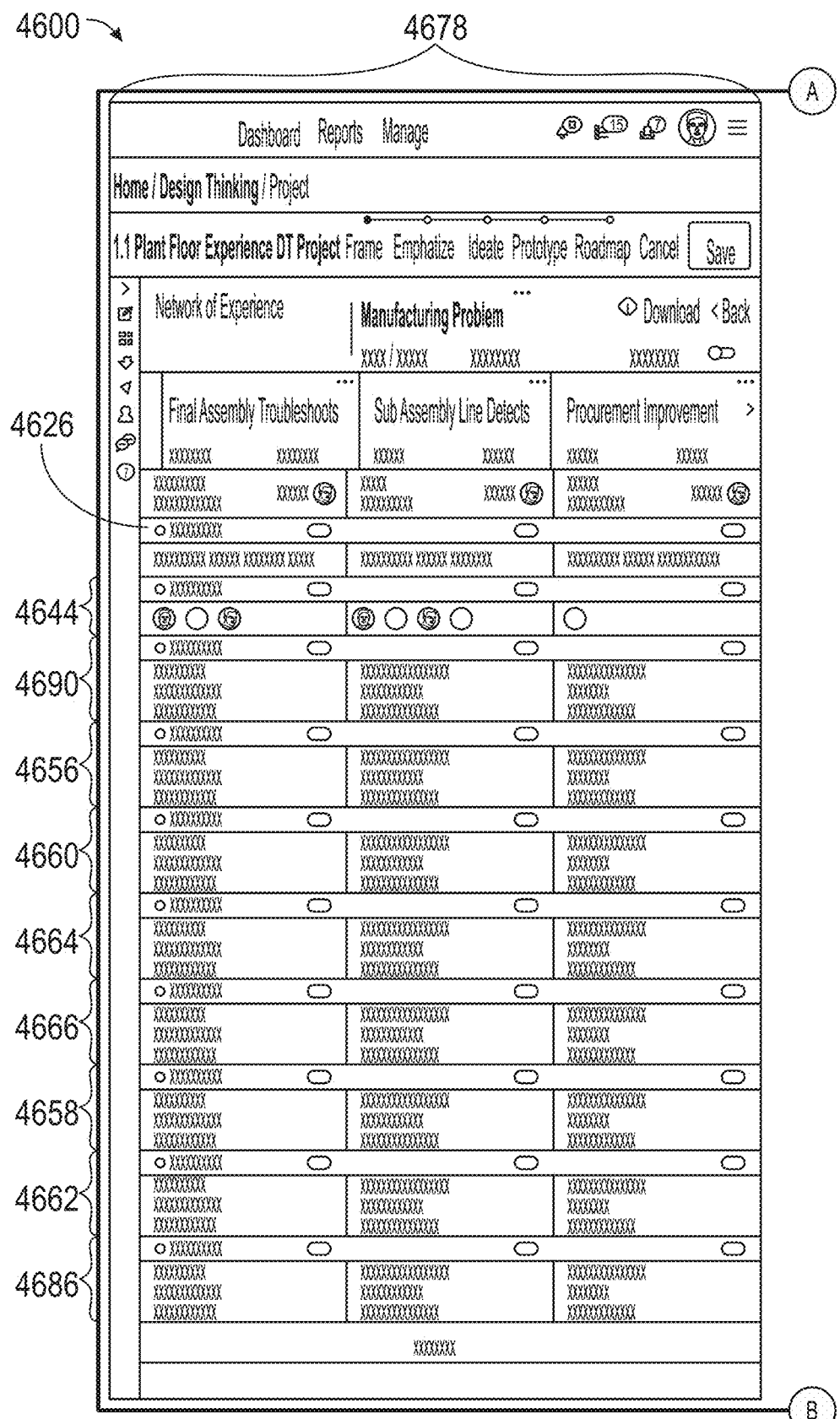
FIGS. 46A-46C illustrate an exemplary user interface, according to embodiments of this disclosure.
Figure 46B:
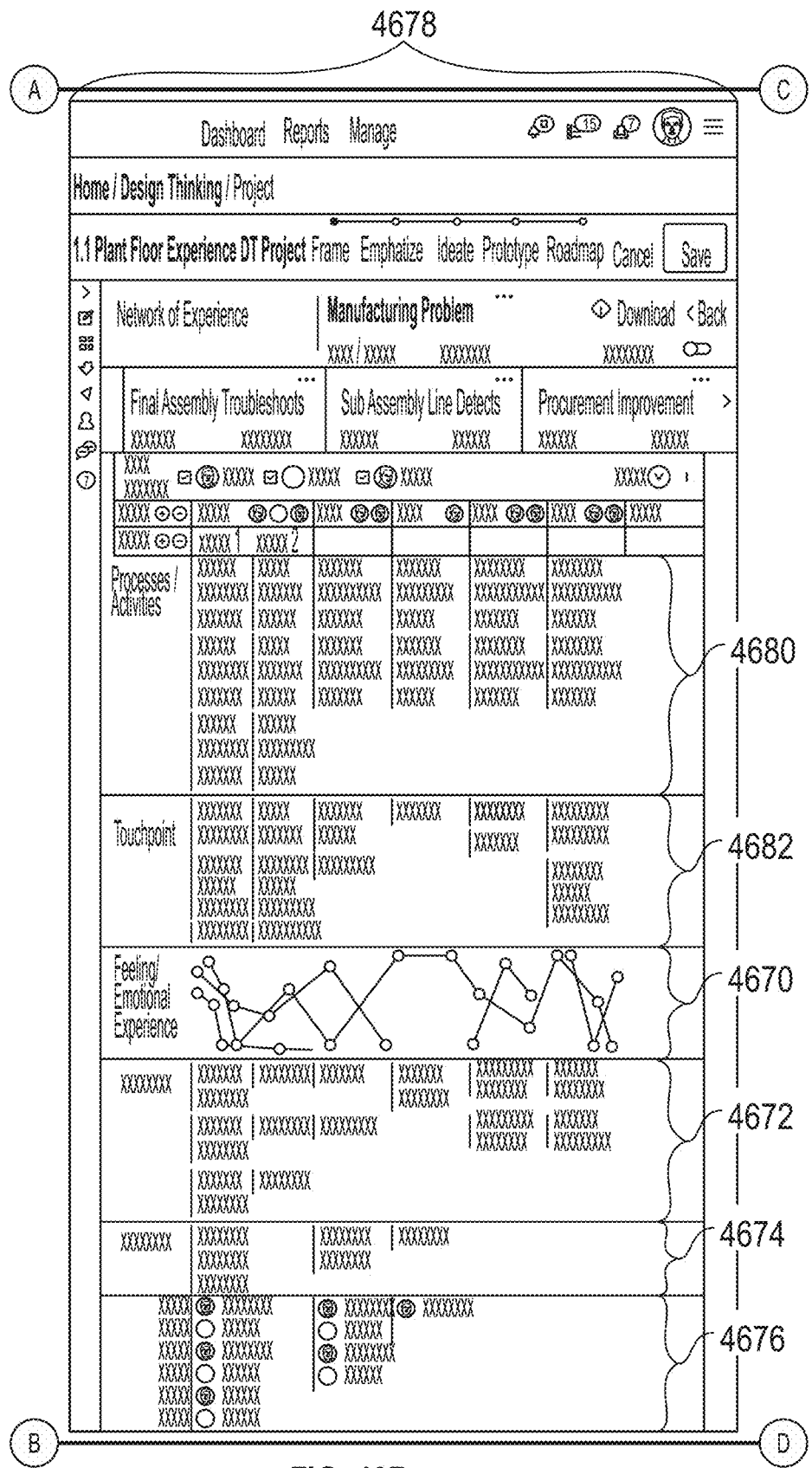
Figure 46C:
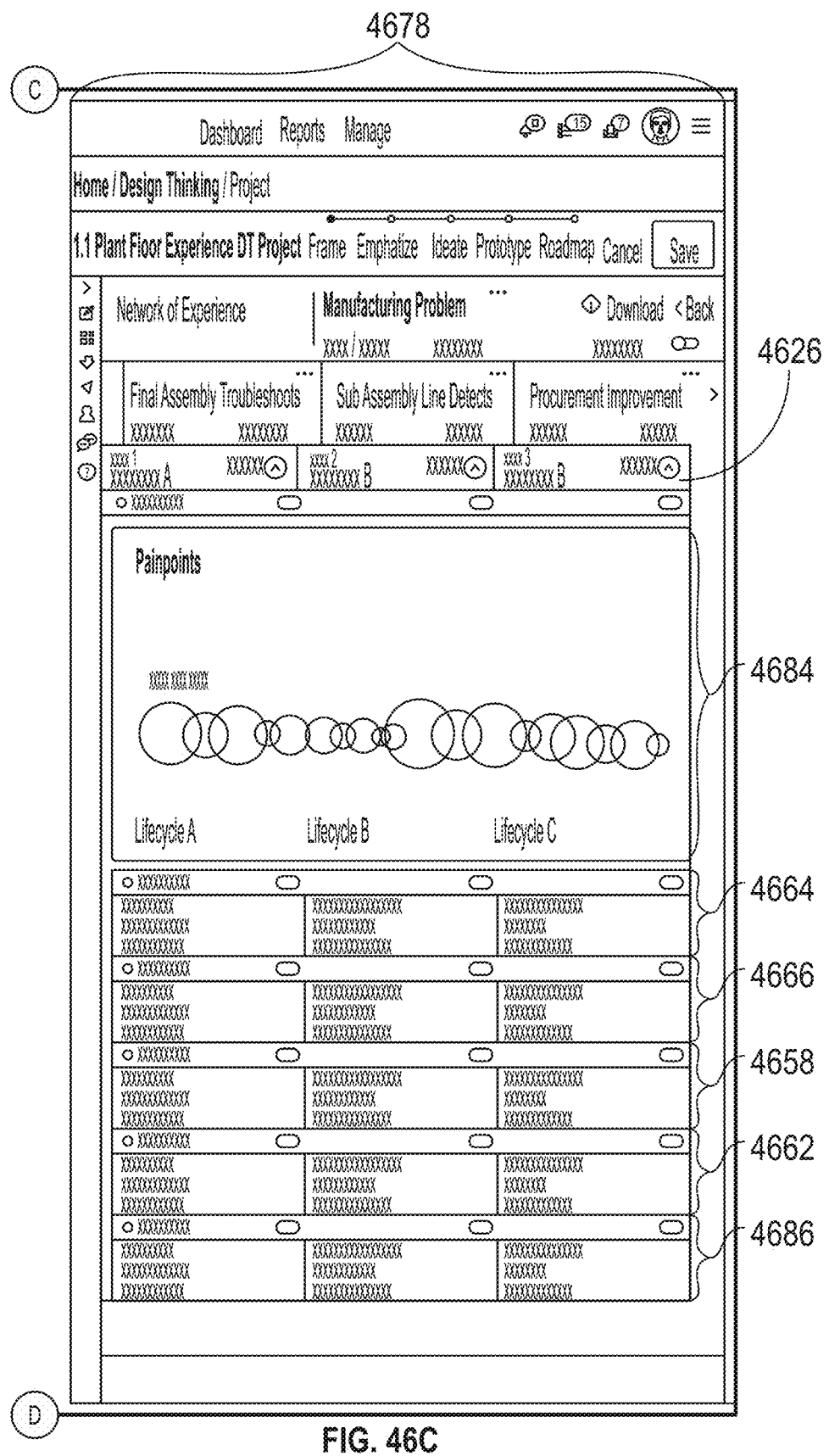

FIG. 46 is illustrates an experience map UI 4600. Although shown as three separate views, the experience map UI 4600 may be presented as a single continuous webpage, e.g., via website 201. In some embodiments, the three views may be selected separately by a user for viewing. As illustrated in the figure, experience map UI 4600 may include a list of KPIs 4526 (e.g., KPIs determined during process 3300) across the stages of one or more processes 4578. The experience map UI 4600 may include a list of personas 4644. In some embodiments, personas identified during step 4009 (e.g., while generating persona empathy maps) may be organized in the experience map UI 4600 based on their association with the stages of one or more processes 4678. The exemplary experience map UI 4600 may further include one or more control points 4690, as identified in the adopted influence map 4130 (step 4005 in process 3703). The exemplary experience map UI 4600 may also include one or more persona triggers 4656, pains 4658, barriers 4660, gains 4662, hacks 4664, delights 4666, and opportunities 4686 associated with each stage of the one or more processes 4678. In some embodiments the experience map UI 4600 may include the feelings or emotional experiences 4670 of a persona 4644 throughout the lifecycle of the process 4678. In some embodiments, the experience map UI 4600 may include a description of processes 4680, touchpoints 4682, a description of the experiences 4672, one or more flags 4674 of an experience, one or more stakeholders 4676, and pain-points 4684. As illustrated, the pain-points 4684 can be visualized by correlating the severity of the pain point 4684 to the size of the pain point 4684.

Figure 47:
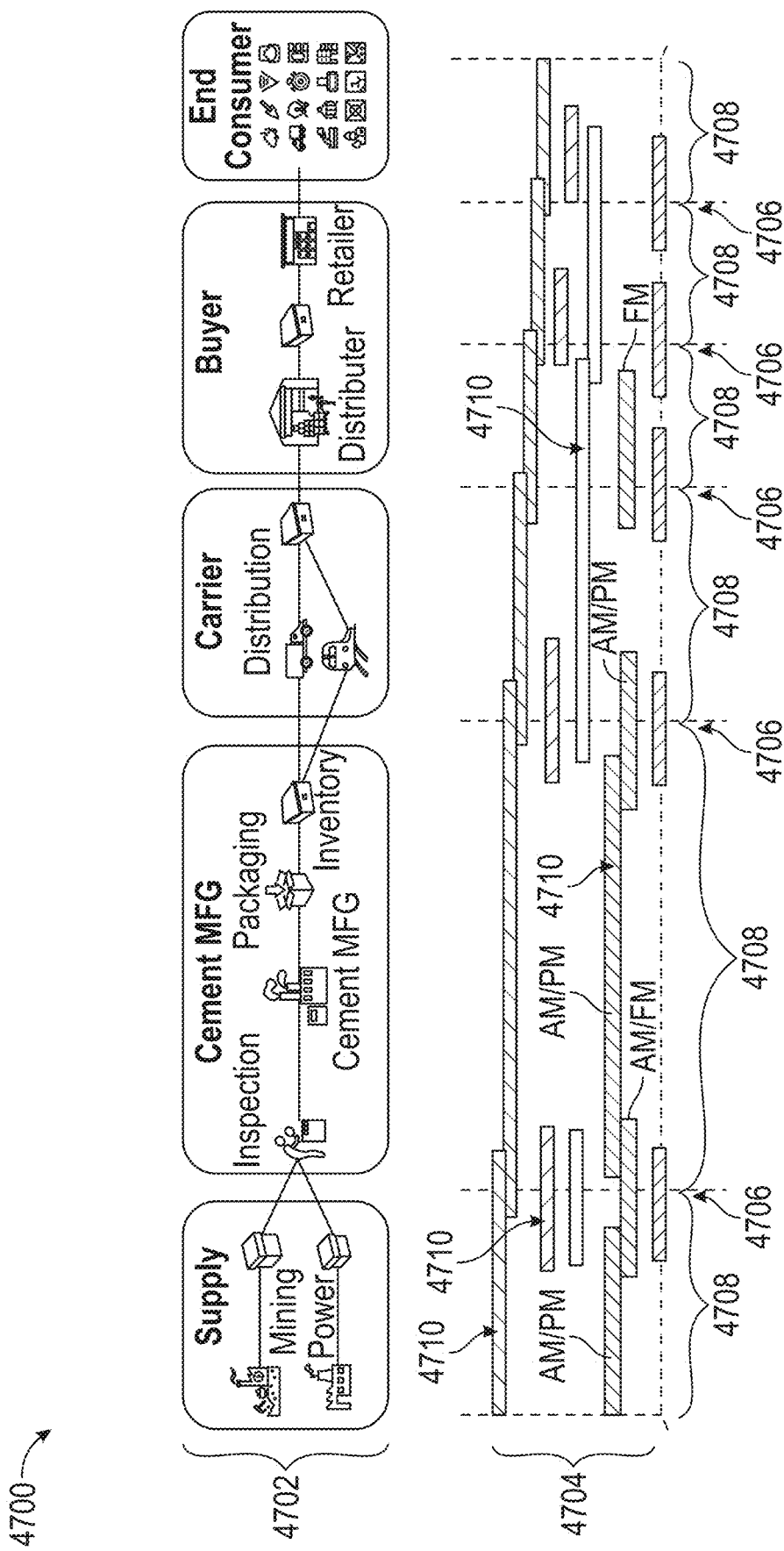
FIG. 47 illustrates a flowchart of an exemplary design thinking process, according to embodiments of this disclosure.

FIG. 47 illustrates a process lifecycle flow 4700 in accordance with embodiments of this disclosure. The process lifecycle flow 4700 can include a process visualization 4702 and an experiential visualization 4704. The dotted lines 4706 indicate breaks between separate processes 4708 of a lifecycle. Although not illustrated in process lifecycle flow 4700, each process may include one or more stages. The bars 4710 may be used to visualize the experiences of one or more personas. In some embodiments, the bars may represent the feelings, emotions and/or experience of the one or more personas. As illustrated in the figure, a different pattern may correspond to a different persona. In some embodiments a different color may be used to correspond to a different persona.

Figure 48:
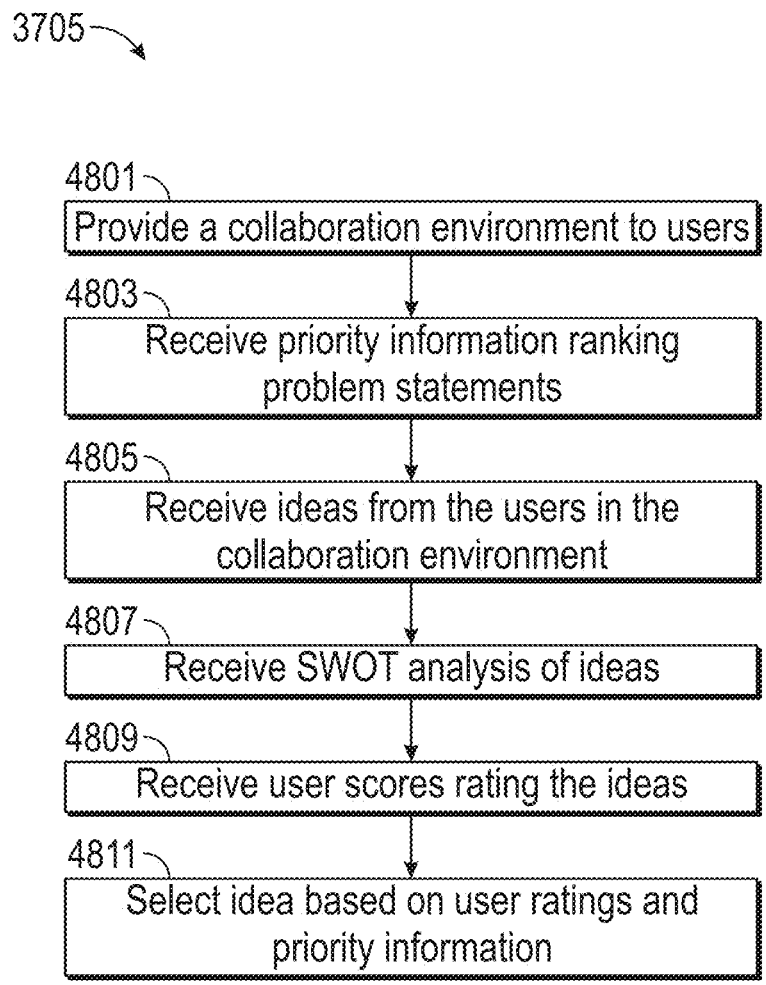
FIG. 48 illustrates a flowchart of an exemplary design thinking process, according to embodiments of this disclosure.

FIG. 48 illustrates a flowchart of process 3705 for brainstorming ideas using system 100. Although the process 3705 is illustrated as including the described elements, it is understood that different order of elements, additional elements, or fewer elements may be included without departing from the scope of the disclosure.

As illustrated, the process 3705 includes providing a collaboration environment to users (step 4801). In some examples the DT coordinator may set up a brainstorming session for one or more users (e.g., stakeholders). The DT coordinator may invite one or more stakeholders to join the brainstorming session. In some embodiments, the stakeholders may be identified based on the influence map adopted in step 4005 of process 3703. In step 4803, the system 100 can receive priority information ranking the adopted problem statement and/or sub-problem statements.

The system 100 can receive one or more ideas from the users in the collaboration environment (step 4805). In some embodiments, the system 100 may crowdsource ideas from a number of stakeholders. The ideas may be a solution to the problem statements ranked in step 4803. In some embodiments, the ideas may be received during a real-time collaboration session. In a real-time collaboration session, stakeholders in various locations, including from around the globe can collaborate online (e.g., via website 201) in real-time. In some embodiments, the ideas may be received during a passive session over a designated period of time (e.g., over a period of one to seven days). As referred to herein, during a passive session users may access and edit the collaborative environment over the designated period of time. In some embodiments, the brainstorming session may include one or more real-time sessions and passive sessions. In some embodiments, the system 100 may use ML to group similar ideas. In embodiments, the system can suggest one or more ideas based on a group of similar ideas. In some embodiments, users may be able to drag and drop ideas to group similar ideas.

In step 4807, the system may receive a Strength/Weakness/Opportunity/Threats (SWOT) analysis from the users. During the SWOT analysis, the users may evaluate the strengths and weaknesses of the ideas and identify opportunities and threats related to the ideas. In some embodiments the system may retrieve data related to the problem statement (e.g., benchmarking data, capability processing data, KPI data, influence maps, persona journey maps, experience maps, and the like) and contribute to the SWOT analysis. In this manner, the system 100 can fill in gaps missed by users.

In step 4809, system 100 may receive user scores rating the ideas generated in step 4805. For example, the ideas may be ranked by the users. For example users may rank the ideas based on categories including, but not limited to, desirability, viability and feasibility. As used herein, desirability may refer to the ability of an idea or prototype to address the needs of a persona, stakeholder, and/or target business. Feasibility may refer to whether an idea or prototype can be completed based on the strengths of the current target business and stakeholders. Viability may refer to whether the idea or prototype will add value to the persona, stakeholder, and/or target business.

In some embodiments the system 100 may retrieve data related to the problem statement (e.g., benchmarking data, capability processing data, KPI data, influence maps, persona journey maps, experience maps, and the like) and provide a system-generated score and/or system-generated priority. The system 100 may use NLP and/or statistical analyses to analyze the retrieved data and generate a system score. In this manner, the system 100 can provide an unbiased evaluation of the ideas to the users. In some embodiments, the retrieved problem-related data may include data from other, related problem statements saved in the second database 207. In some examples, the system 100 can generate a score for the ideas generated in step 4805 based on previously existing prototype data and video data in the second database 207 (e.g., generated from prior brainstorming and prototyping processes).

In some embodiments, the system 100 may save versions of the collaboration environment to the second database 207. In some embodiments, different versions may be saved for each input, after a pre-determined interval of time (e.g., every three hours if a new input is detected), after each real-time and/or passive brainstorming session, and the like. As used with respect to process 3705, an input may refer to priority information, ideas, SWOT analyses, user scores, and the like. In this manner, the system 100 may preserve a complete picture of the brainstorming collaboration process.

Figure 49:
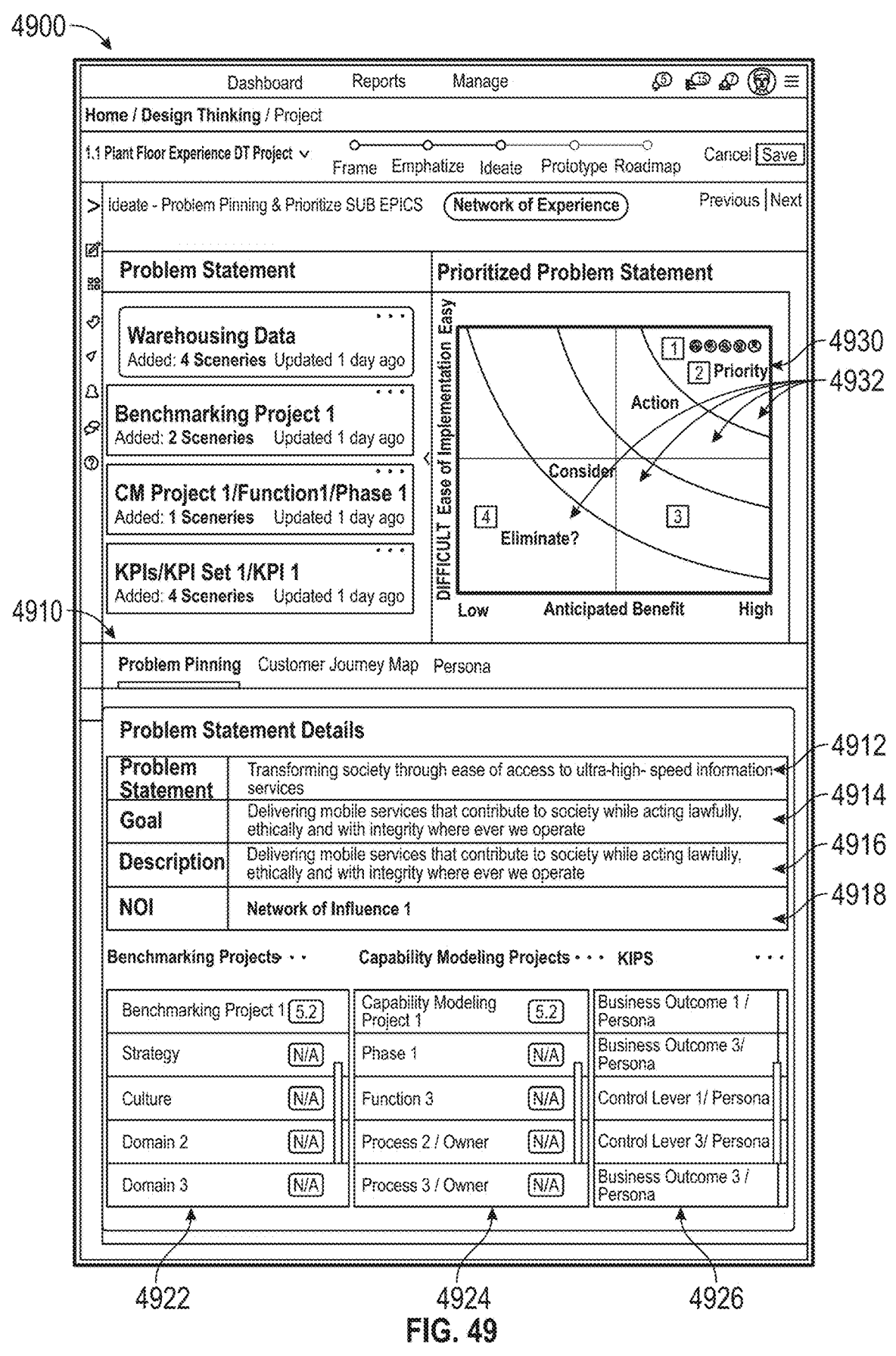

FIG. 49 illustrates an exemplary prioritization collaboration environment 4900 used during step 4803. The prioritization collaboration environment 4900 may include one or more problem statement details 4910 may include an adopted problem statements 4912, goal 4914, description 4916, and network of influence 4918 (described in more detail below). The problem statement 4912 may reflect the adopted problem statement. In some embodiments, the problem statement details 4910 may present one or more projects related to other processes performed by the system 100 for the target business. For example, one or more benchmarking projects 4922, capability modeling projects, 4924, and KPIs 4926. In some embodiments, the experience map 4600 may be used by the system 100 to suggest a priority of the problem statements.

The prioritization collaboration environment 4900 may include a problem-priority visualization 4930. The problem-priority visualization 4930 may provide a visual way to identify and prioritize the problem statements and/or sub-problem statements. The problem-priority visualization 4930 may include priority regions 4932 corresponding to different priority levels. Problem-priority visualization 4920 is merely exemplary, and although four priority regions 4932 are illustrated, more or less priority regions 4932 may be included in accordance with embodiments of this disclosure. In some examples, users can pin ideas to different priority regions 4932 of the problem-priority visualization 4920.

Figure 50:
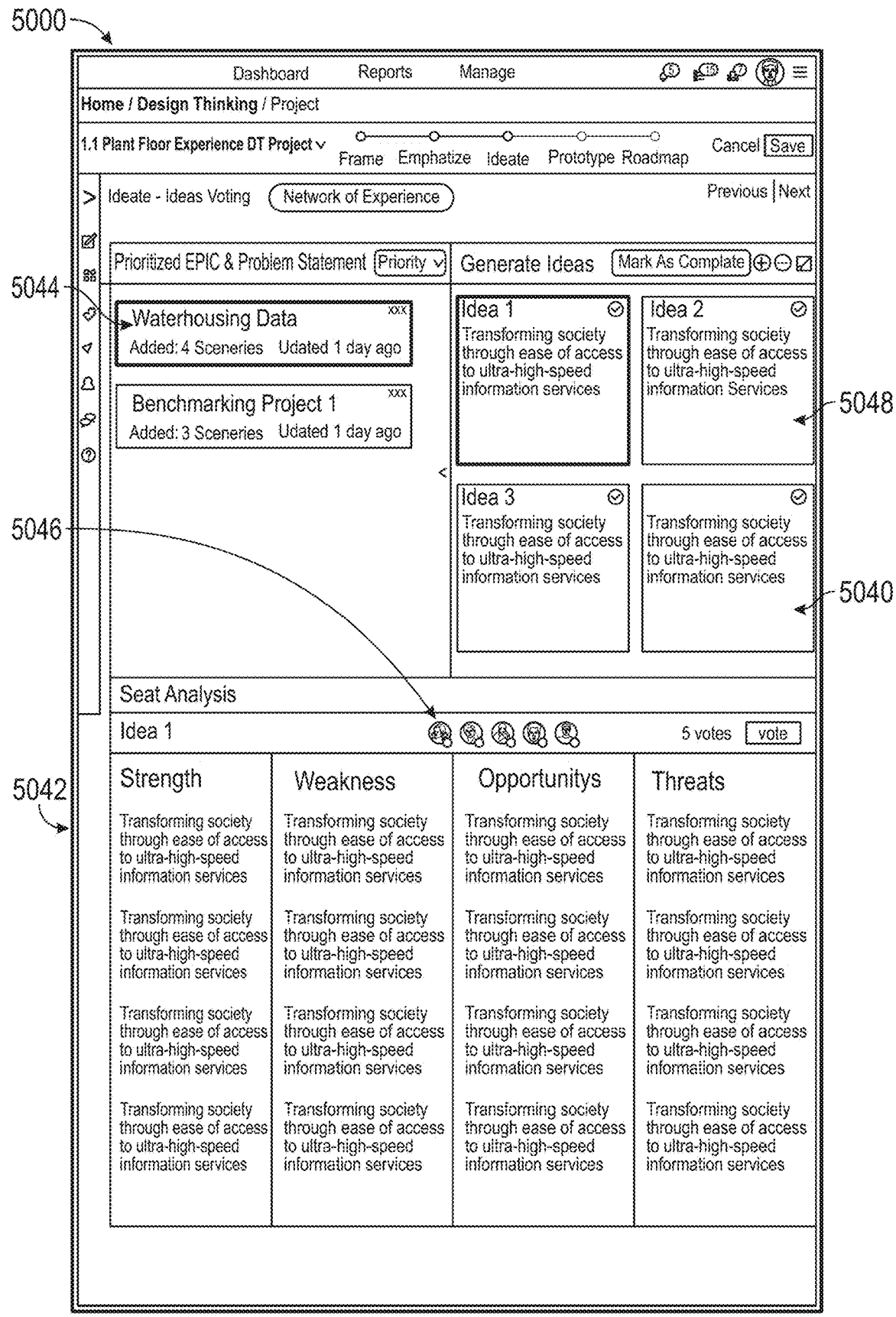
FIG. 50 illustrates an exemplary collaboration environment, according to embodiments of this disclosure.

FIG. 50 illustrates an exemplary brainstorming collaboration environment 5000. The brainstorming collaboration environment 5000 may include one or more ideas 5040 in idea generation region 5048, a SWOT analysis region 5042, and a problem statement identification region 5044. The system 100 can also indicate the users 5046 engaging with the brainstorming collaboration environment 5000.

Figure 51:
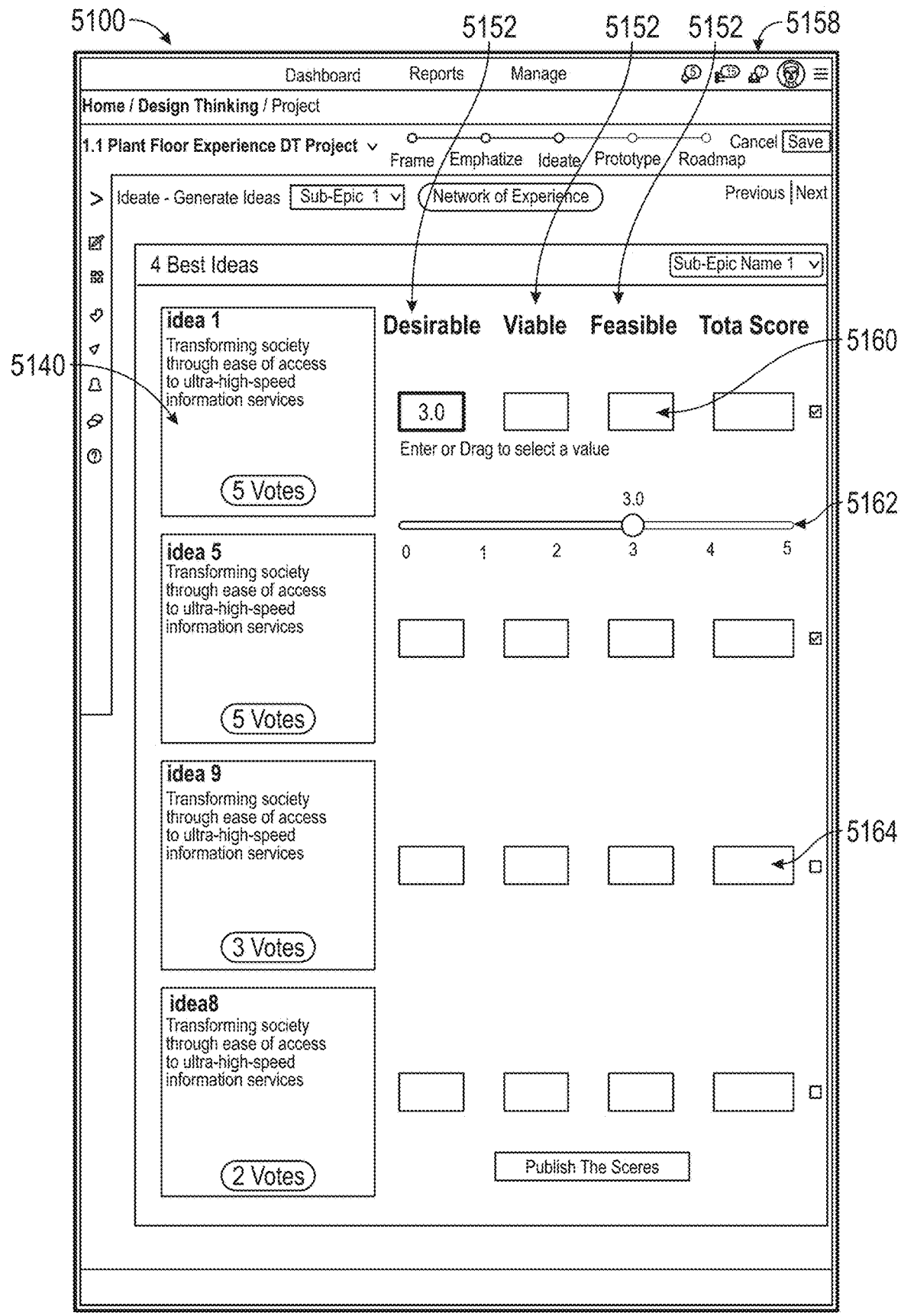
FIG. 51 illustrates an exemplary collaboration environment, according to embodiments of this disclosure.

FIG. 51 illustrates an exemplary scoring environment 5100. The scoring environment 5100 may display one or more ideas 5140 and provide a scoring region 5158. The scoring region 5158 may include one or more categories and one or more category scores 5160 corresponding to each category 5152, idea 5140 pair. As discussed above, the categories may include desirability, viability, and feasibility. A score-entering feature 5162 may be used by a user to enter a category score 5160. In some embodiments, a user may select the desired category score 5160 before entering the score using the score-entering feature 5162. A total score 5164 for each idea 5140 may be determined based on a sum of the category-scores of the idea 5140. In some embodiments, each user may enter a score. In some embodiments, each user's score may be aggregated or averaged to determine the total score. By relying on multiple user scores to determine the total score, the system 100 can reduce bias. In some embodiments, users can collaborate to determine a score together. In some embodiments, the category-scores of each stakeholder are not revealed to other stakeholders. In some embodiments, the category-scores may be shared with the DT coordinator. In some embodiments, the DT coordinator can publish the scores to the collaboration environment.

Figure 52:
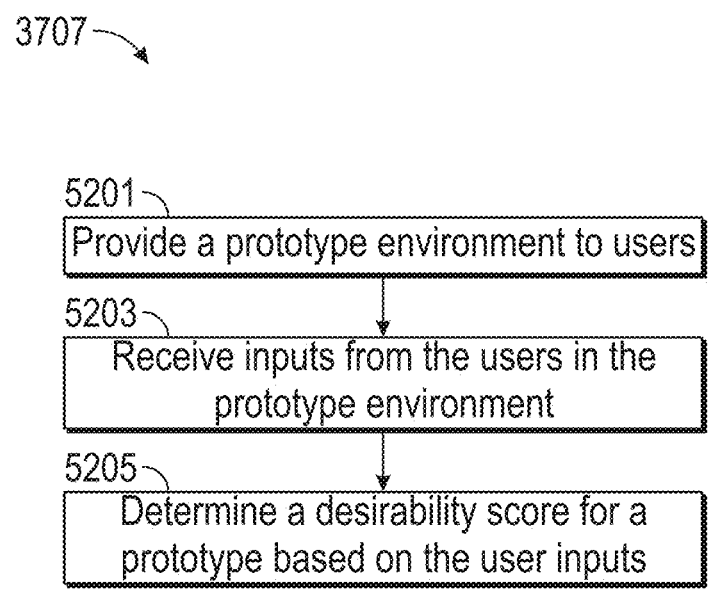
FIG. 52 illustrates a flowchart of an exemplary design thinking process, according to embodiments of this disclosure.

FIG. 52 illustrates a flowchart of process 3707 for prototyping the selected ideas in process 3707 to validate the selected ideas. Although the process 3707 is illustrated as including the described elements, it is understood that different order of elements, additional elements, or fewer elements may be included without departing from the scope of the disclosure.

As illustrated, the process 3707 includes providing a prototype environment to users (step 5201). The prototype environment may provide users an environment to prototype and iterate one or more ideas selected in process 3705. The users may include the users in process 3705. In some embodiments, there may be additional users. In step 5203, the system 100 may receive inputs from the users in the prototype environment. The user inputs may include one or more prototypes and/or edits to the one or more prototypes. In some embodiments, prototypes may include, but are not limited to, images, flow charts, and the like. Each prototype and subsequent edit (e.g., iteration) may be saved in the second database 207. In this manner, the system 100 may preserve a record of each iteration of the prototype. By providing an environment with automatic versioning that highlights challenges, users may be encouraged to continually iterate and tweak prototypes.

In step 5205, the system may determine a desirability score for the prototype. This process is will be discussed in greater detail below.

In some embodiments, the system 100 may retrieve problem-related data from the second database 207. The problem-related data may be data in the second database associated with the adopted problem statement. Examples of problem-related data are not limited to, but may include benchmarking data, capability processing data, KPI data, influence maps, persona journey maps, experience maps, and the like. The system may identify one or more challenges based on the retrieved problem-related data and user inputs. For example, the one or more challenges may include budget constraints, complexity of the problem, parallel ongoing project challenges, and financial viability of the prototype. In some embodiments, the system 100 may include a financial viability score based on projected financial outcomes during the prototyping process. For example, system 100 could use NLP and statistical computations to determine the financial viability score. In some embodiments, the system 100 can identify resources needed to implement the prototype.

Figure 53:
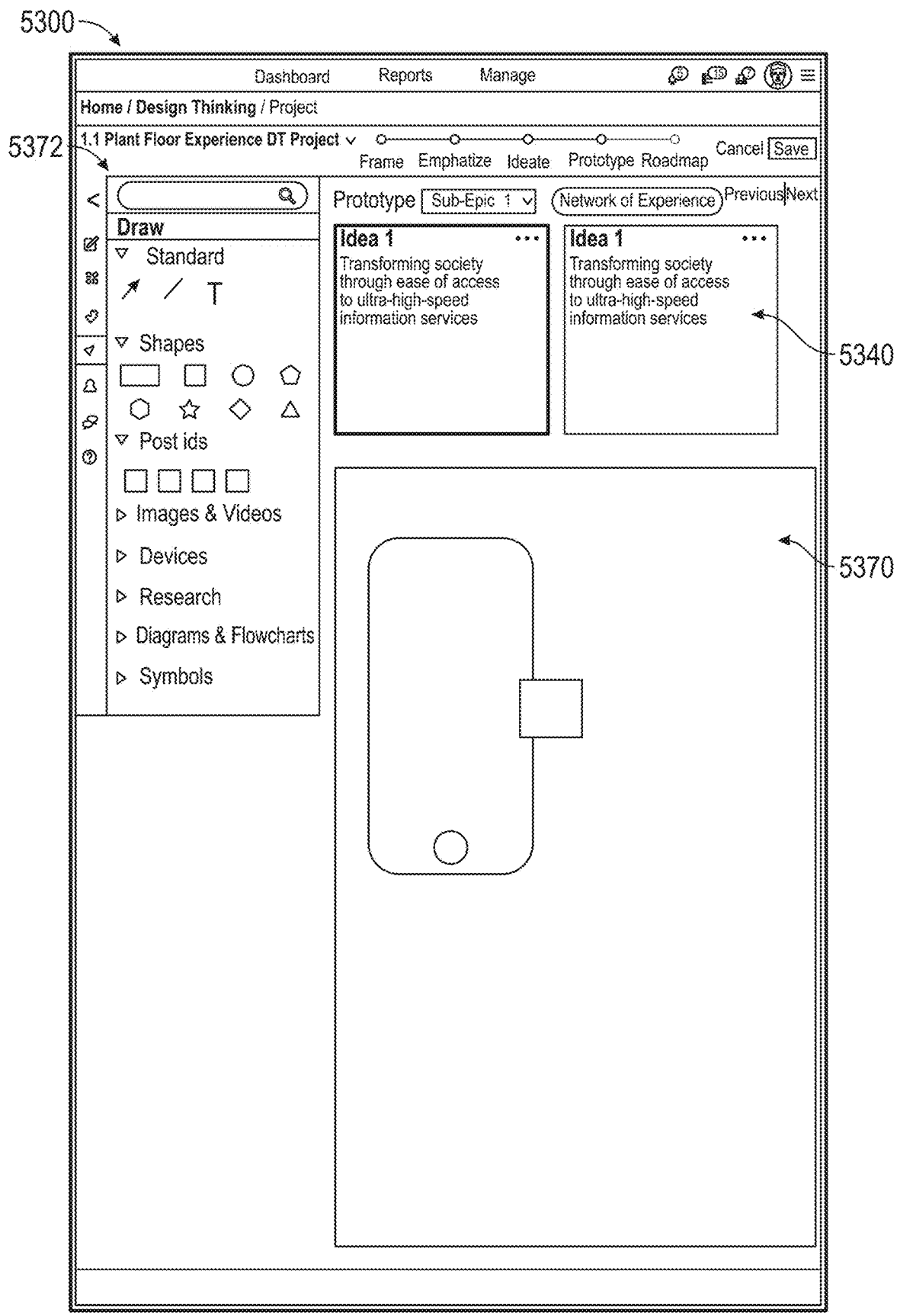
FIG. 53 illustrates an exemplary prototyping environment, according to embodiments of this disclosure.

FIG. 53 illustrates an exemplary prototyping environment 5300. The prototyping environment may include one or more ideas 5340, a workspace region 5370, and a toolkit region 5372. The workspace region may allow the users to collaboratively build their prototype in a shared virtual space. The toolkit region 5372 may include one or more tools. The one or more tools may be, for example but not limited to, drawing tools (e.g., for drawing one or more shapes tools), text input tools (e.g., for inputting text), note-flagging tools (e.g., for flagging and annotating the workspace region 5370), diagram tools (e.g., for generating a diagram), and the like.

Figure 54:
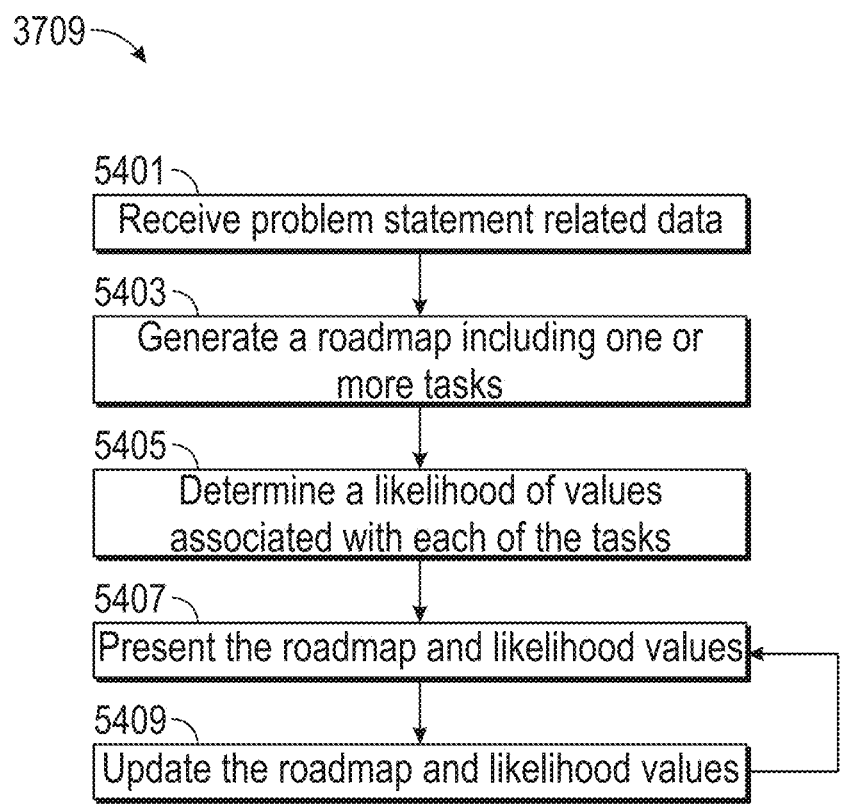
FIG. 54 illustrates a flowchart of an exemplary design thinking process, according to embodiments of this disclosure.

FIG. 54 illustrates a flowchart of process 3709 for providing a roadmap for the user to monitor progress in addressing the problem identified in the adopted problem statement. Although the process 3709 is illustrated as including the described elements, it is understood that different order of elements, additional elements, or fewer elements may be included without departing from the scope of the disclosure.

As illustrated, the process 3709 may include receiving problem-statement related data (step 5401). The problem-statement related data may include, for example, but is not limited to, benchmarking data, capability processing data, KPI data, influence maps, persona journey maps, experience maps, brainstorming data, prototyping data, and the like. In step 5403, the system 100 can generate a roadmap including one or more tasks. Each of the tasks may correspond to a deadline in the process lifecycle. In some embodiments, tasks may correspond to one or more stages of a process associated with the one or more problem statements. In some embodiments, the tasks may correspond to a period of time, e.g., a fiscal quarter.

In step 5405, the system 100 may determine a likelihood value associated with each of the tasks. The likelihood value may represent a probabilistic likelihood that the target business can complete a particular task by the deadline. Completion of the task may indicate that the target business is making progress in addressing the problem identified in the adopted problem statement.

In step 5407, the system 100 can present the roadmap and likelihood values. In some embodiments, the roadmap can be presented to a user via the website 207. In some embodiments, the system 100 can update the roadmap and likelihood values (5409) based on additional user inputs. The additional user inputs may include updated problem statement related data and/or progress data indicating the target business' completion of tasks.

Figure 55:
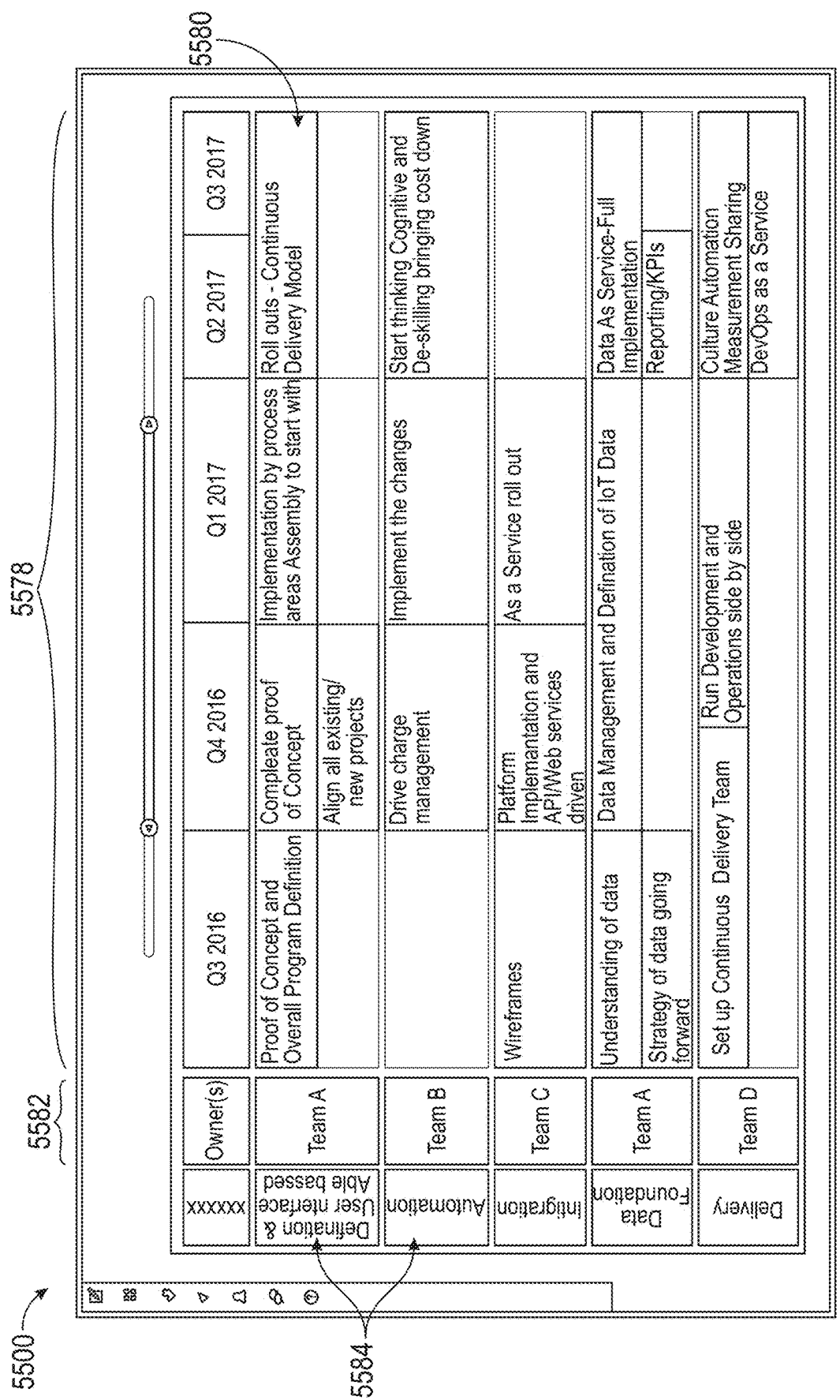
FIG. 55 illustrates an exemplary map, according to embodiments of this disclosure.

FIG. 55 illustrates an exemplary road map 5500. As illustrated in the figure, the exemplary road map 5500 may include one or more tasks 5580. Each of the one or more tasks may be organized by one or more of ownership 5582, category 5584, and timeline 5578. Ownership 5582 may refer to which stakeholders and/or teams (comprising one or more stakeholders) are responsible for completing the task. Category 5584 may refer to the type of task. For example, exemplary categories 5584 illustrated in exemplary road map 5500 include, but are not limited to, automation, integration, data foundation, and deliver. Timeline 5578 may refer to a timeline for completing the tasks 5580. As illustrated, the timeline is broken up by quarters.

Exemplary Process for Identifying Emotions from Video Interviews

As discussed above, videos of the identified stakeholders (e.g., videos of interviews of the stakeholder) may be uploaded to the system 100, and video-facial recognition algorithms, audio processing, speech recognition, NLP, and the like may be used to analyze the video to identify the emotions of the stakeholder. Unlike having, for example, the DT coordinator evaluate the video interview for the emotions of the stakeholder, the system 100 may be able to accurately, and without bias identify the emotions of the stakeholder during the interview.

Figure 56:
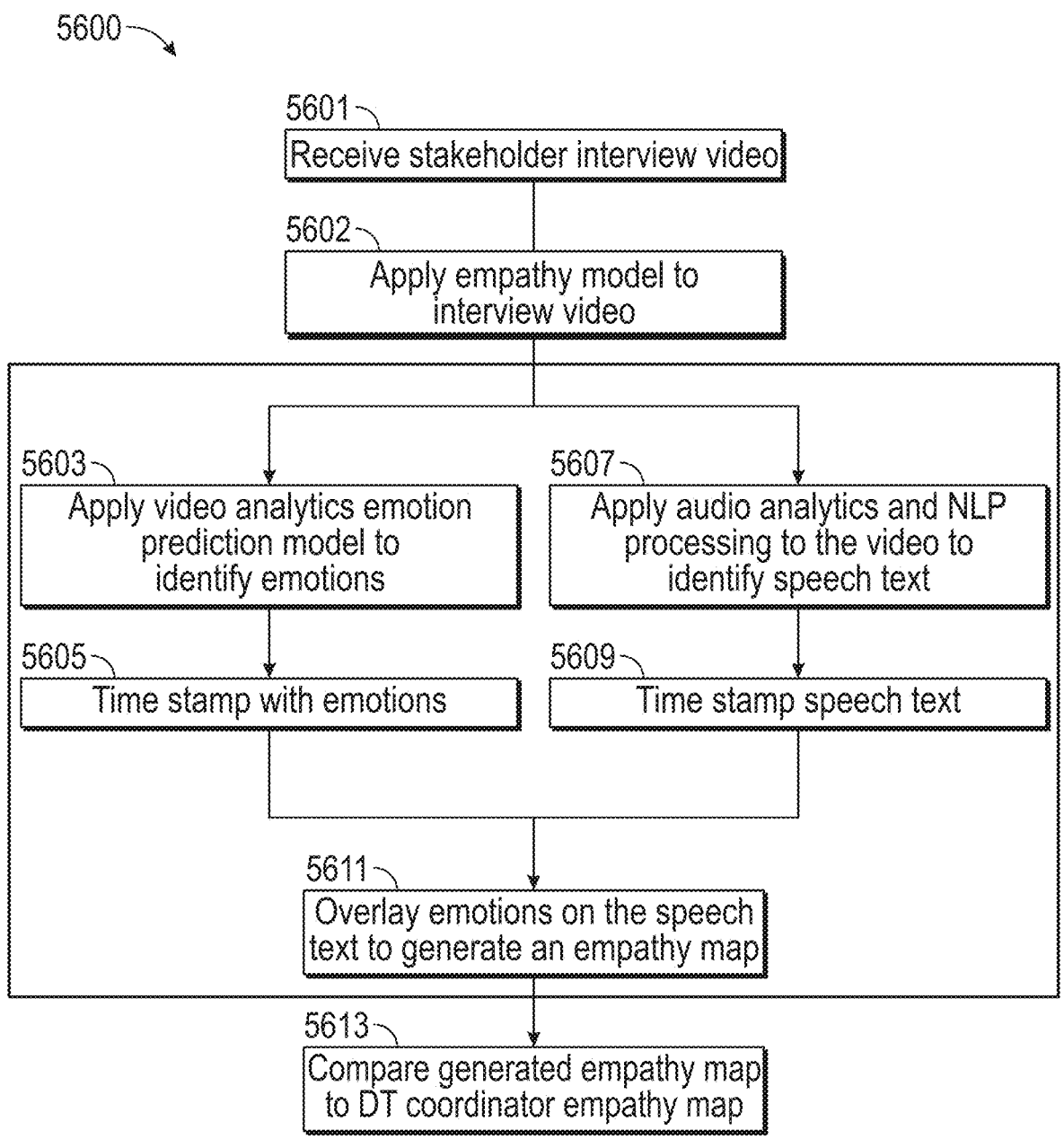
FIG. 56 illustrates a flowchart of an exemplary design thinking process, according to embodiments of this disclosure.

FIG. 56 illustrates a flowchart of process 5600 for generating an empathy map based on a video (e.g., video interview) of a stakeholder. Although the process 5600 is illustrated as including the described elements, it is understood that different order of elements, additional elements, or fewer elements may be included without departing from the scope of the disclosure.

As illustrated, the process 5600 may include receiving a stakeholder video interview (step 5601). The stakeholder video interview may be received, for example, from a DT coordinator. In some examples, the system 100 can receive the video interview from the stakeholder being interviewed, for example, via the website 201. In some embodiments, the stakeholder interview video can be saved to the second database 207.

In step 5602, the system 100 can apply an empathy model to the interview video. Training the empathy model will be discussed in more detail below. The empathy model may include one or more analyses. For example, the analyses may include, but are not limited to, facial recognition, audio processing, speech recognition, NLP, and the like.

In step 5603, the system 100 can apply video analytics of the empathy model to identify emotions exhibited by the stakeholder during the video. In some embodiments, an image of the video may be extracted at a regular interval (e.g., one image per second, one image every five seconds, one image every ten seconds, etc.). The image may be converted into a string, numerical value, pixelstring, or any suitable format. The converted image may be associated with an emotion. For example, the emotions may include, but are not limited to, at least anger, disgust, fear, happiness, sadness, surprise, and neutral. In step 5605, each emotion can be timestamped to correspond to the time in the video interview that the image corresponding to the emotion was taken.

In step 5607, the empathy model can perform speech recognition analysis to convert the words spoken by the stakeholder during the interview into a speech text (e.g., an interview transcript). The interview transcript may be broken down by sentences. In some embodiments, deep learning (DL) analysis and NLP may be used to associate each sentence with an action category. For example, the categories may include, but are not limited to, doing, saying, seeing, thinking, pain, and delight. The sentences may be further categorized by emotion, e.g., anger, disgust, boredom, fear, happiness, sadness, surprise, and neutral. Each sentence may be categorized based on, for example, keywords files, sentiment libraries, and the like. In step 5609, each sentence can be timestamped to correspond to the time in the video interview that the sentence was spoken. In some embodiments, the video analytics and speech recognition can be performed in parallel as illustrated in FIG. 56.

In step 5611, the system 100 can overlay the emotions over the interview transcript. For example, the system 100 can align the emotions and actions based on their respective timestamps. In some embodiments, the system 100 may generate a mapping matrix that matches the identified emotion (based on an image) to an identified action (based on a sentence). In some embodiments, the mapping matrix can be based on psychological analysis data provided by a SME. The psychological analysis data can map the transcript-based identified emotions and actions in step 5607 to the emotions based on the video analysis (e.g., facial recognition) in step 5603 and perform a gap analysis to determine a resultant emotion. For example, a "happy" emotion identified in the video analysis outcome and a "boring process" identified in the transcript at the same timestamp ranges may be associated with a "frustrated" resultant emotion. In this instance, for example, the mapping matrix may determine that the difference in emotion results from "sarcasm," which may indicate frustration. In this manner, the system 100 can map each of identified emotions to the identified actions. Using this mapping, the system 100 can generate an empathy map. For example, the system may use NLP to generate text used to populate the empathy map based on the mapping matrix.

In some embodiments, the system can compare the empathy model generated empathy map to an empathy map received from the DT coordinator via empathy map UI 4200 (step 5613). In some examples, if the empathy model generated empathy map varies widely from the DT coordinator's empathy map, the system 100 may recommend one or more changes to the DT coordinator's empathy map.

Figure 57:
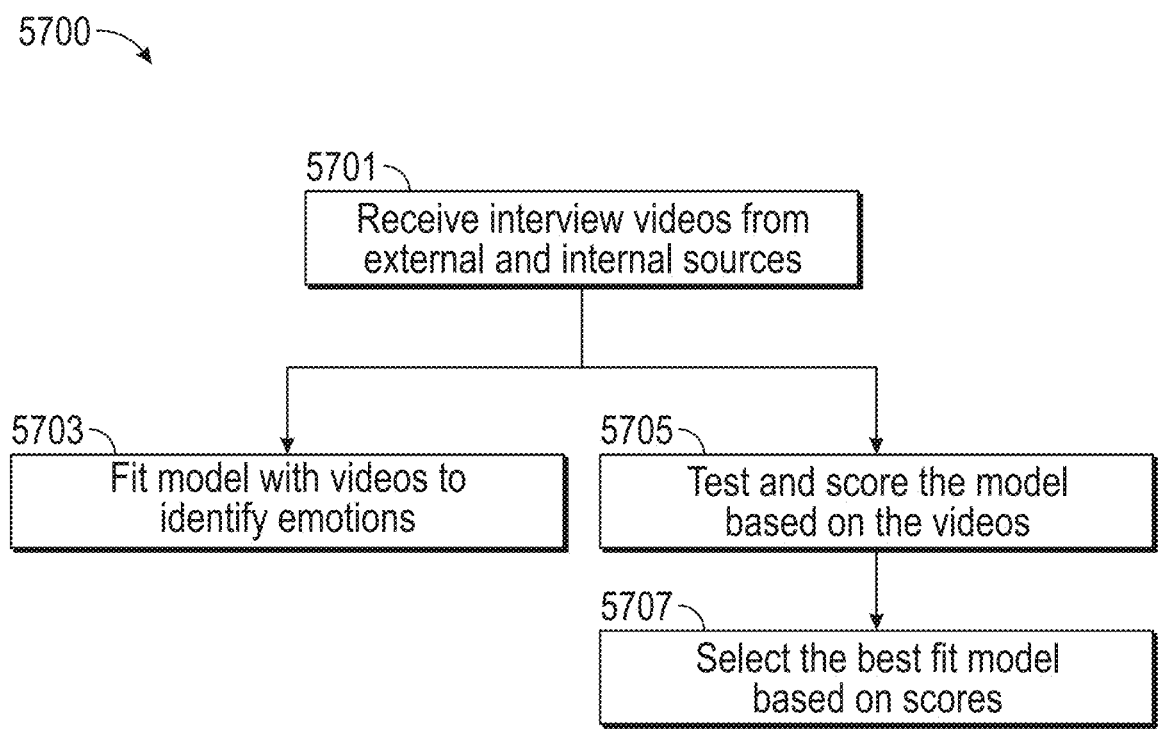
FIG. 57 illustrates a flowchart of an exemplary design thinking process, according to embodiments of this disclosure.

FIG. 57 illustrates a flowchart of process 5700 for training an empathy model, according to embodiments of this disclosure. Although the process 5700 is illustrated as including the described elements, it is understood that different order of elements, additional elements, or fewer elements may be included without departing from the scope of the disclosure.

As illustrated, the process 5700 may include receiving interview videos from external and internal sources (step 5701). Each of the interview videos may include at least on subject. In some examples, the subject may be a stakeholder of the target company. In some embodiments, the empathy training model may receive interview videos from one or more external data providers and/or stakeholder videos stored on the second database 207. For example, stakeholder interview videos provided for generating an empathy map as described in process 5600 may also be used to train and test the empathy model.

In step 5703, system 100 can use the received videos to fit the model to identify emotions of the interview subject. In step 5705, the system can score the empathy model based on the accuracy of the model. In step 5709, the system 100 can evaluate a best fit model and select the appropriate model based on model accuracy. The selected model can be applied in process 5600 in step 5602.

Exemplary Process for Determining a Prototype Desirability Score

As discussed above, ideas and prototypes may be assessed based on their ability to satisfy the three prongs of desirability (appearance), viability (financial), and feasibility (technical). In order to provide an unbiased desirability assessment of a prototype, according to embodiments of this disclosure, a desirability scoring model may be applied to prototypes received via the prototyping environment 5300. In some embodiments, the desirability score may refer to the quality of the prototype and/or how well the prototype fulfills its intended purpose. In some embodiments, the desirability-scoring model may be applied to flowcharts, images, and the like.

Figure 58:
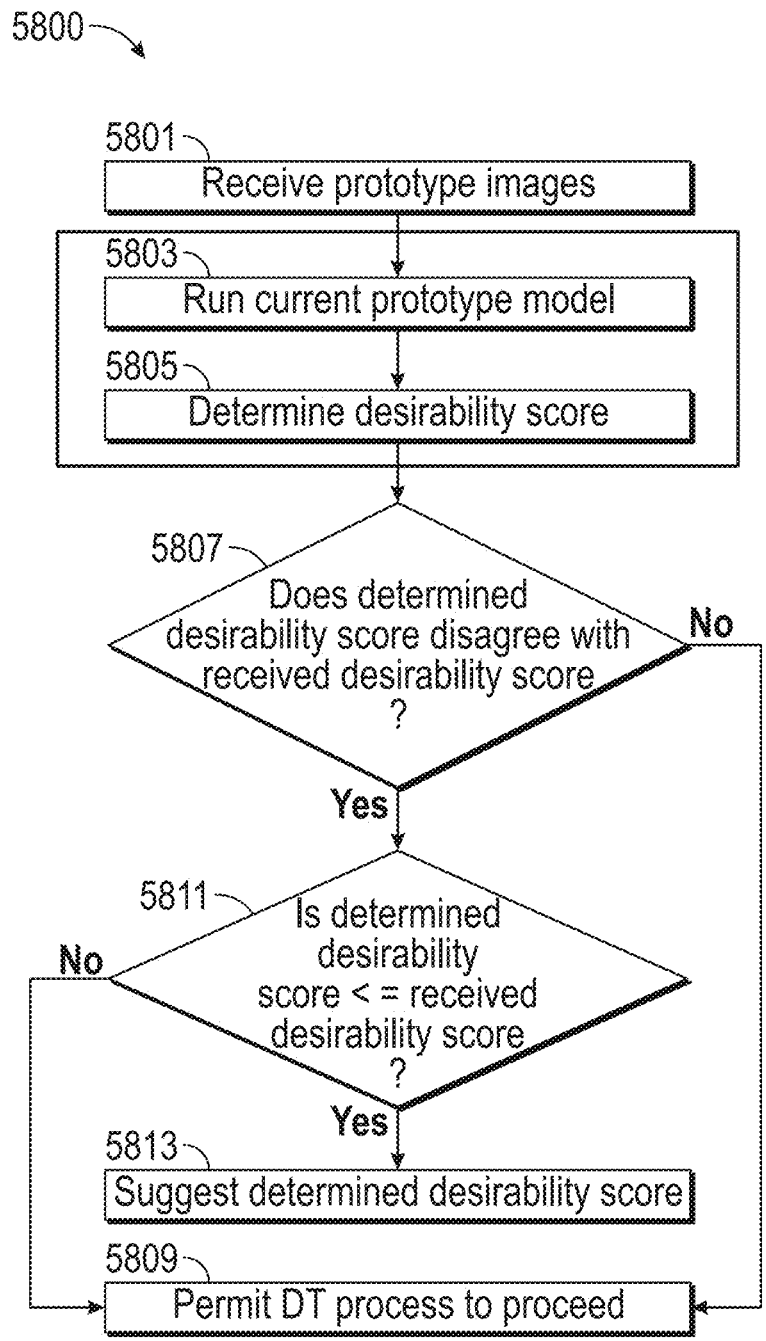
FIG. 58 illustrates a flowchart of an exemplary design thinking process, according to embodiments of this disclosure.

FIG. 58 illustrates a flowchart of process 5800 for applying prototype-scoring model to a prototype. Although the process 5800 is illustrated as including the described elements, it is understood that different order of elements, additional elements, or fewer elements may be included without departing from the scope of the disclosure.

As illustrated, the process, 5800 may include receiving a prototype data (step 5801). The prototype data may be received, for example, via the prototyping environment 5300. The prototype data can include, but is not limited to, flowcharts, images, and the like.

In step 5803, the system 100 can apply a prototype scoring model to the prototype data. The training the prototype scoring model will be discussed in more detail below. In step 5803, the prototype scoring model can determine the desirability score. The desirability score as used herein, may refer to the quality of the prototype and/or how well the prototype fulfills its intended purpose.

At step 5807, the system 100 may ask whether the desirability score generated by the prototype scoring disagrees with the desirability score received from a user for a corresponding idea. For example, in some embodiments, the DT coordinator and/or stakeholders may enter a desirability score for an idea to prototype. If the determined desirability score agrees with the received desirability score of the prototype, then the DT process may be permitted to proceed (step 5809) with the prototype that was scored in step 5805.

If the determined desirability score disagrees with the received desirability score, then the system 100 may ask at step 5811 is less than or equal to an expected desirability score. The expected desirability score may be based on the received desirability score (e.g., from a user) or a predetermined desirability index. If the determined desirability score is greater than or equal to the expected desirability score, then the DT process may be permitted to proceed (step 5809). If the determined desirability score is greater than or equal to the expected desirability score, then the system 100 can suggest that the user (e.g., DT coordinator) implement an alternate approach to prototyping the solution for the idea and/or choose a different idea for prototyping. In some embodiments, the desirability score and viability score may be evaluated based on the net present value (NPV) of the prototype. The NPV may be determined based on a financial statement created for the prototype. A viability score based on NPV value is expected to be greater than or equal to the expected viability score received from a user or based on predetermined viability index. In some embodiments, if both computed desirability and computed viability scores are less than their expected counterpart values, the prototype may be recommended to be discarded.

Figure 59:
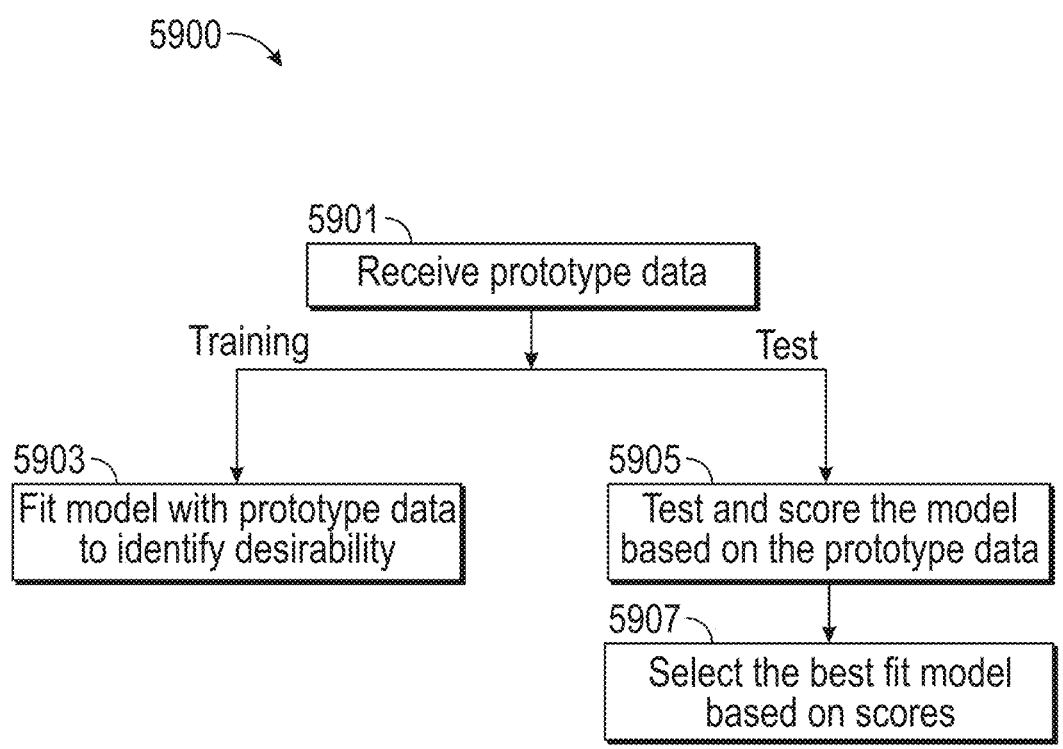
FIG. 59 illustrates a flowchart of an exemplary design thinking process, according to embodiments of this disclosure.

FIG. 59 illustrates a flowchart of process 5900 for training a prototype-scoring model, according to embodiments of this disclosure. Although the process 5900 is illustrated as including the described elements, it is understood that different order of elements, additional elements, or fewer elements may be included without departing from the scope of the disclosure.

As illustrated, the process 5900 may include receiving prototype data (step 5901). The prototype data can include flowcharts, images, and the like. In some embodiments, the prototype-scoring training model may receive prototype data from one or more external data providers and/or stakeholder videos stored on the second database 207. For example, prototype data provided for generating a desirability score as described in process 5800 may also be used to train and test the prototype-scoring model.

In step 5903, system 100 can use the received prototype data to fit the model to identify the desirability of the prototype data. In step 5705, the system can score the prototype scoring model based on the accuracy of the model. In step 5709, the system 100 can evaluate a best fit model and select the appropriate prototype scoring model based on best fit. The selected prototype scoring model can be applied in process 5800 in step 5802.

Embodiments in accordance this disclosure may be directed to systems and methods for identifying a benchmark competitor and determining a performance score for the benchmark competitor. For example, the benchmarking method may include identifying at least one attribute associated with a target business, where the at least one attribute corresponds to a business industry. The benchmarking method may further comprise receiving performance data related to competitors of the target business, the competitors being in the business industry. The performance data may include the at least one attribute and performance variables. In some embodiments, the at least one attribute and the performance variables may be associated with the competitors. The benchmarking method may further comprise determining factor weights, where each of the factor weights may correspond to each performance variable.

According to some embodiments, determining the factor weights may include determining at least one factor based on the performance variables. Determining the factor weights may further include determining eigenvalues corresponding to each of the factors, selecting a first set of the factors based on a factor threshold, applying a factor rotation to the first set of factors, determining at least one variance associated with the first set of factors, and determining a first set of the factor weights based on the factor rotation and the at least one variance.

According to some embodiments the benchmarking method may further comprise determining MCDA-AHP weights, where each of the MCDA-AHP weights may correspond to each of the performance variables. In some embodiments, determining the MCDA-AHP weights may further include generating a pairwise comparison matrix, normalizing the pairwise comparison matrix; and determining the MCDA-AHP weights by performing a first operation on the normalized pairwise comparison matrix.

The benchmarking method may further include determining adaptive weights based on the factor weights and the MCDA-AHP weights. The benchmarking method may further include applying each of the adaptive weights to each of the performance variables for each competitor. The benchmarking method may further include determining a performance score for each of the competitors, the performance score for each of the competitors being based on the adaptive weights and the performance variables, wherein the performance score for each of the competitors is a quantization representative of a performance of a respective competitor. The benchmarking method may include selecting a benchmark competitor based on the performance scores of the competitors.

In some embodiments, determining the factor weights and the determining the MCDA-AHP weights are in performed in parallel in the benchmarking method. In some embodiments, determining the factor weights may further include generating a correlation matrix based on the performance variables of the competitors, and removing at least one of the performance variables, the at least one of the performance variables having a correlation coefficient less a correlation threshold. In some embodiments, the benchmarking method may further include pre-processing the performance data by performing at least one selected from managing outliers, standardizing the data, and addressing data gaps.

The methods discussed above may be implemented by a system (not shown). The system may include a server computer, a network, one or more databases, and one or more devices. The device(s) may be coupled to the server computer using the network. The server computer can be capable of accessing and analyzing data from the database and the device(s). Embodiments of the disclosure can include any number of server computers, databases, networks, and devices.

The device may be an electronic device, such as a cellular phone, a tablet computer, a laptop computer, or a desktop computer. The device can include a software (e.g., a web browser to access website 201), a display, a touch screen, a transceiver, and storage. The display may be used to present a UI to the user, and the touch screen may be used to receive input from the user. The transceiver may be configured to communicate with the network. Storage may store and access data from the server computer, the database(s), or both.

The server computer may be a machine such as a computer, within which a set of instructions, causes the machine to perform any one of the methodologies discussed herein, may be executed, according to embodiments of the disclosure. In some embodiments, the machine can operate as a standalone device or may be connected (e.g., networked) to other machines. In a networked configuration, the machine may operate in the capacity of a server or a client machine in a server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, a switch or bridge, or any machine capable of executing a set of instructions (sequential or otherwise) that specify actions to be taken by that machine. The term "machine" shall also be taken to include any collection of machines that individually or jointly execute a set (or multiple sets) of instructions to perform any one of the methodologies discussed herein.

The exemplary computer includes a processor (e.g., a central processing unit (CPU), a graphics processing unit (GPU), or both), a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.), which can communicate with each other via a bus.

The computer may further include a video display (e.g., a liquid crystal display (LCD) or a cathode ray tube (CRT)). The computer also includes an alpha-numeric input device (e.g., a keyboard), a cursor control device (e.g., a mouse), a disk drive unit, a signal generation device (e.g., a speaker), and a network interface device.

The drive unit includes a machine-readable medium on which is stored one or more sets of instructions (e.g., software) embodying any one or more of the methodologies or functions described herein. The software may also reside, completely or at least partially, within the main memory and/or within the processor during execution thereof by the computer, the main memory and the processor also constituting machine-readable media. The software may further be transmitted or received over a network via the network interface device.

The term "machine-readable medium" should be taken to include a single medium or multiple media (e.g., a centralized or distributed database and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Embodiments in accordance with this disclosure may include methods and systems directed to determining a domain score of an identified benchmark competitor. The domain scoring method may include identifying competitors of a target business. The competitors may include at least one benchmark competitor and one or more non-benchmark competitors, where the competitors and the target business operate in a business industry. The domain scoring method may further include receiving unstructured data associated with the competitors and processing the unstructured data to produce processed data.

In some embodiments, the processing the unstructured data may include separating the unstructured data by domains of the target business to produce domain-structured data associated with each of the competitors and for each of the domains, separating the domain-structured data by least one of: a positive sentiment and a negative sentiment, wherein the separating the domain-structure data results in the processed data. In some embodiments, for each of the domains, the processed data may be used to train a respective domain model. The processed data may be associated with the one or more non-benchmark competitors. For each domain, domain-structured data may be applied to the respective domain model and the domain score for the at least one benchmark competitor can be determined. The domain scores may be based on the domain-structured data.

In some embodiments, the unstructured data may include qualitative data, and processing the unstructured data may include separating the unstructured data into components using NLP. The processing may further include associating the components of the unstructured data to the domains. In some embodiments, the associating may be based on at least one keyword identified in each of the components to produce the domain-structured data. The processing the data may further include associating each component of the domain-structured data with a positive sentiment or a negative sentiment.

In some embodiments, the domain-scoring method further includes dynamically selecting the domain model based on at least one of: accuracy, the processed data, computation costs, and functionality.

In some embodiments, applying the domain-structured data may include applying the domain-structured data of the benchmark competitor and determining at least one of a positive or a negative sentiment associated with the domain-structured data of the benchmark competitor.

Embodiments in accordance this disclosure may be directed to systems and methods for determining an updated performance score. For example, the method for determining the updated performance score may include providing assessment data, the assessment data including information associated with assessments of a target business and performance drivers. The method may further include providing capability process data, the capability process data including information associated with processes of the target business and the performance drivers. The method may further include identifying domains of the target business in the assessment data. The method may further include identifying the domains of the target business in the capability process data. The method may further include for each of the domains in the assessment data and for each of the assessments of the target business, determining numbers of occurrences of the performance drivers in the assessment data. The method may further include for each of the domains in the capability process data and for each of the processes of the target business, determining numbers of occurrences of the performance drivers in the capability process data. The method may further include for each of the assessments of the target business, determining assessment data performance driver weights, wherein the determination of each of the assessment data performance driver weight is based on an occurrence number of a respective performance driver for each of the assessments. The method may further include for each of the processes of the target business, determining capability process data performance driver weights, wherein the determination of each of the capability process data performance driver weights is based on an occurrence number of a respective performance driver for each of the processes. The method may further include for each of the domains and each of the performance drivers, determining a respective assessment data aggregate performance driver weight, wherein the determination of the respective assessment data aggregate performance driver weight is based on the assessment data performance driver weights associated with each of the performance drivers. The method may further include for each of the domains and each of performance drivers, determining a respective capability process data aggregate performance driver weight, wherein the determination of the respective capability process data aggregate performance driver weight is based on the capability process data performance driver weights associated with each of the performance drivers. The method may further include for each of the domains and for each of the performance drivers, determining deviations between the assessment data aggregate performance driver weights and the capability process data aggregate performance driver weights. The method may further include determining a net deviation based on the deviations. The method may further include determining an initial performance score of the target business based on the assessments of the target business. The method may further include determining an updated performance score of the target business based on the net deviation and the initial performance score of the target business.

In some embodiments, the performance drivers include at least one of cost, quality, and time.

In some embodiments, the determining the numbers of occurrence of the performance drivers in the assessment data comprises using NLP to identify the performance drivers in the assessment data, and the determining the numbers of occurrence of the performance drivers in the capability process data comprises using NLP to identify the performance drivers in the capability process data.

In some embodiments, the method for determining an updated performance score further includes identifying the processes in the capability process data.

Embodiments in accordance this disclosure may be directed to systems and methods for identifying a solution to a problem of a target business and providing a KPI recommendation. For example, the method may include providing problem data, the problem data including information associated with a problem of a target business. The method may further include providing pain-point and solution data, wherein the pain-point and solution data including a pain-point and a solution associated with the problem, and at least one of the pain-point and the solution is provided by a subject matter expert. The method may further include comparing the problem data to the pain-point and solution data, wherein the comparing the problem data to the pain-point and solution data comprises matching the pain-point to the problem. The method may further include identifying the solution associated with the pain-point, the solution associated with the problem matched to the pain-point. The method may further include determining whether or not the solution is associated with a KPI, the KPI being at least one of: a solution KPI and a pain-point KPI. The method may further include providing a recommendation of the KPI, when the solution is associated with the KPI. The method may further include forgoing the recommendation of the KPI, when the solution is not associated with the KPI.

In some embodiments, the comparing the problem data and the pain-point and solution data further comprises using NLP to match the pain-point to the problem.

In some embodiments, the method further includes determining whether or not an effectiveness of the solution to the problem is below an effectiveness threshold. The method may further include disassociating the solution with the problem, when the effectiveness of the solution to the problem is below the effectiveness threshold. The method may further include forgoing the disassociating the solution with the problem, when the effectiveness of the solution to the problem is not below the effectiveness threshold.

In some embodiments, the solution is associated with a domain of the target business. The method may further include presenting the solution. The method may further include receiving an input to filter out the presentation of second information associated with the domain. The method may further include in response to the receiving the input to filter out the presentation of information associated with the domain, ceasing the presentation of the solution.

Embodiments in accordance with this disclosure may include methods and systems directed to providing a target business a platform to enable stakeholders, (e.g., users) in the target business to perform a DT process. The DT method may include generating an influence map. Generating the influence map may include receiving first data, wherein the first data identifies individuals associated with the problem statement, receiving second data, wherein the second data identifies a relationship between at least one of the individuals, at least one process, and at least one machine, where the at least one process and the at least one machine are associated with the problem statement.

The DT method may further include updating the influence map based on third data, the third data associated with a target business. The DT method may further include receiving empathy data related to the individuals, where the empathy data is associated with at least one emotion of the at least one of the individuals. In some embodiments, the empathy data may be received during a lifecycle of the at least one process, where the at least one process associated with the problem statement. The DT method may include generating two or more persona maps based on the empathy data and the updated influence map, wherein the at least one persona map traces at least one selected from the at least one emotion, experiences, touchpoints, pain-points, and opportunities of a persona during the lifecycle of the at least one process. The DT method may further include generating an experience map based on the two or more persona maps, wherein the experience map aggregates the two or more persona maps.

The DT method may further include receiving at least one idea associated with a solution to the problem statement via a collaboration environment. The DT method may further include receiving an evaluation of the at least one idea, where the evaluation comprises at least one of: a desirability score, a viability score, and a functionality score. The DT method may further include prototyping the at least one idea and providing a roadmap. The roadmap may be configured to identify at least one task associated with the at least one process associated with the problem statement, identify one or more of the individuals from the first data to complete the at least one task, and associate the at least one task with a likelihood value, wherein the likelihood value may be based on a likelihood that the identified one or more individuals complete the at least one task.

In some embodiments, the generating the two or more persona maps of the DT method may include receiving at least one video interview of the at least one of the individuals, identifying at least one emotion using video-facial recognition, and associating the at least one emotion with at least one point of the lifecycle.

In some embodiments, the DT method may further include generating a second evaluation of the at least one idea, wherein the second evaluation may be based on fourth data, wherein the fourth data is analyzed using NLP.

In some embodiments, generating the influence map of the DT process may further include receiving an indication of a direction of influence between individuals from the first data, receiving an indication of an intensity of influence between individuals from the first data, and receiving an indication of intersections of individuals from the first data, machines associated with the problem statement, and processes associated with the problem statement, wherein the indication the intersections includes the direction of influence and the intensity of influence. In some embodiments, the updating the influence map may further include comparing the generated influence map to the third data, the third data related to at least one of the individuals, machines, and processes associated with the problem statement.

In some embodiments generating the influence map of the DT process may further include identifying first impactor individuals, where an impactor individual may be associated with the direction of influence originating at the impactor individual, and second identifying impactor individuals based on the intensity of influence between individuals from the first data. In some embodiments, the influence map may be adapted to highlight inefficiencies in a target business.

Although the disclosed examples have been fully described with reference to the accompanying drawings, it is to be noted that various changes and modifications will become apparent to those skilled in the art. For example, like numbers connote like features. Although some modifications may described with respect to particular examples, one skilled in the art will understand that the same modifications may be applied to other embodiments though not described with particularity. Such changes and modifications are to be understood as being included within the scope of the disclosed examples as defined by the appended claims.

The invention claimed is:

1. A method for determining a benchmark competitor of a target business with a computer system, the method comprising:
    determining, by the computer system, at least one attribute associated with the target business and a business industry;
    receiving, by the computer system, performance data related to competitors of the target business, the competitors being in the business industry, wherein the performance data includes the at least one attribute and performance variables associated with the competitors;
    pre-processing the performance data, wherein the pre-processing the performance data comprising:
        providing the performance data to a Natural Language Processing (NLP) model;
        identifying, using the NLP model, outliers in the performance data;
        removing the outliers identified using the NLP model;
        identifying, using the NLP model, missing data in the performance data;
        linking the performance data to reduce effects of the missing data identified using the NLP model;
        identifying, using the NLP model, structural errors in the performance variables, the structural errors comprising one or more of skipped delimiter, duplicate delimiter, absence of a unique ID, typos, mislabeled data, same attributes with different name, and mixed data types;
        correcting the structural errors identified using the NLP model, comprising correcting the one or more of skipped delimiter, duplicate delimiter, absence of a unique ID, typos, mislabeled data, same attributes with different name, and mixed data types;
        standardizing, using the NLP model, the performance variables of the competitors by normalizing the performance variables; and
        receiving, from the NLP model, pre-processed performance data;
    determining, by the computer system, factor weights, the factor weights corresponding to the performance variables of the pre-processed performance data;
    determining, by the computer system, multiple-criteria decision-analysis and analytic hierarchy process (MCDA-AHP) weights, the MCDA-AHP weights corresponding to the performance variables of the pre-processed performance data;
    determining, by the computer system, adaptive weights based on the factor weights and the MCDA-AHP weights;

applying, by the computer system, each of the adaptive weights to each of the performance variables of the pre-processed performance data related to each competitor to generate adaptively-weighted performance variables;

determining, by the computer system, a performance score for each of the competitors, the performance score for each of the competitors being based on the adaptively-weighted performance variables, wherein the performance score for each of the competitors is a quantization representative of a performance of a respective competitor; and determining, by the computer system, the benchmark competitor based on the performance scores of the competitors.

2. The method of claim 1, wherein the factor weights are determined concurrently with the determining of the MCDA-AHP weights.

3. The method of claim 1, wherein the determining the factor weights further comprises:

generating a correlation matrix based on the performance variables of the pre-processed performance data related to the competitors, the correlation matrix comprising a correlation coefficient; and determining removal of at least one of the performance variables from consideration, the at least one of the performance variables having the correlation coefficient less a correlation threshold.

4. The method of claim 1, wherein the determining the factor weights comprises:

determining at least one factor based on the performance variables of the pre-processed performance data;

determining eigenvalues corresponding to each of the factors, the eigenvalues indicating predictiveness associated with respective factors;

determining, based on the performance variables of the pre-processed performance data, a correlation matrix corresponding to the factors, the correlation matrix indicating a variance of the performance variables;

determining a factor threshold based on the correlation matrix;

determining a first set of the factors from the factor based on the factor threshold comprising determining that each of the eigenvalues corresponding to the first set of factors is above the factor threshold;

applying a factor rotation to the first set of factors, the application of the factor rotation increasing the variance of the first set of factors;

determining at least one variance associated with the first set of factors; and determining a first set of the factor weights based on the factor rotation and the at least one variance, wherein each of the factor weights indicate an importance of a corresponding performance variable.

5. The method of claim 1, wherein the determining the MCDA-AHP weights further comprises:

generating a pairwise comparison matrix;

normalizing the pairwise comparison matrix; and performing an operation on the normalized pairwise comparison matrix to determine the MCDA-AHP weights.

6. The method of claim 1, wherein:

the at least one attribute and the performance data are determined based on an output of a model, and the output of the model is determined based on an input to the model, the input comprising data associated with the competitors.

7. The method of claim 1, further comprising:

determining, based on an output of a domain-scoring model, a domain score of the benchmark competitor, wherein:

the domain-scoring model is trained using:

a best fit algorithm, the best fit algorithm dynamically selected based on one or more of accuracy, the data point set, computational costs, and functionality, and processed data associated with the benchmark competitor, wherein the processing the data comprises:

removing components in data associated with the benchmark competitor not associated with domain or sentiment, and separating the data associated with the benchmark competitor based on domains, and the domain-scoring model comprises one or more of logistic regression, decision trees, random forests, naïve Bayes, support vector machines, and neural networks; and displaying, on a user interface on a display of the computer system, the domain score.

8. The method of claim 7, further comprising determining, based on a second output of the domain-scoring model, sentiment associated with the performance data, wherein the performance score for each of the competitors is determined further based on a second output of the domain-scoring model.

9. The method of claim 1, further comprising:

receiving speech from a first user of the target business;

determining, based a first output of an empathy model, an emotion of the first user, wherein the empathy model is trained using videos of one or more users of the target business;

receiving a problem from a second user of the target business;

determining, based on a second output of the empathy model, a suggestion to solve the problem; and displaying, on a user interface on a display of the computer system, the suggestion.

10. A system for determining a benchmark competitor of a target business, the system comprising one or more processors configured to perform a method comprising:

determining at least one attribute associated with the target business and a business industry;

receiving performance data related to competitors of the target business, the competitors being in the business industry, wherein the performance data includes the at least one attribute and performance variables associated with the competitors;

pre-processing the performance data, wherein the pre-processing the performance data comprising:

providing the performance data to a Natural Language Processing (NLP) model;

identifying, using the NLP model, outliers in the performance data;

removing the outliers identified using the NLP model;

identifying, using the NLP model, missing data in the performance data;

linking the performance data to reduce effects of the missing data identified using the NLP model;

identifying, using the NLP model, structural errors in the performance variables, the structural errors comprising one or more of skipped delimiter, duplicate delimiter, absence of a unique ID, typos, mislabeled data, same attributes with different name, and mixed data types;

correcting the structural errors identified using the NLP model, comprising correcting the one or more of skipped delimiter, duplicate delimiter, absence of a unique ID, typos, mislabeled data, same attributes with different name, and mixed data types;

standardizing, using the NLP model, the performance variables of the competitors by normalizing the performance variables; and receiving, from the NLP model, pre-processed performance data;

determining factor weights, the factor weights corresponding to the performance variables of the pre-processed performance data;

determining multiple-criteria decision-analysis and analytic hierarchy process (MCDA-AHP) weights, the MCDA-AHP weights corresponding to the performance variables of the pre-processed performance data;

determining adaptive weights based on the factor weights and the MCDA-AHP weights;

applying each of the adaptive weights to each of the performance variables of the pre-processed performance data related to each competitor to generate adaptively-weighted performance variables;

determining a performance score for each of the competitors, the performance score for each of the competitors being based on the adaptively-weighted performance variables, wherein the performance score for each of the competitors is a quantization representative of a performance of a respective competitor; and determining, the benchmark competitor based on the performance scores of the competitors.

11. The system of claim 10, wherein the factor weights are determined concurrently with the determining of the MCDA-AHP weights.

12. The system of claim 10, wherein the determining the factor weights further comprises:

generating a correlation matrix based on the performance variables of the pre-processed performance data related to the competitors, the correlation matrix comprising a correlation coefficient; and determining removal of at least one of the performance variables from consideration, the at least one of the performance variables having the correlation coefficient less a correlation threshold.

13. The system of claim 10, wherein the determining the factor weights comprises:

determining at least one factor based on the performance variables of the pre-processed performance data;

determining eigenvalues corresponding to each of the factors, the eigenvalues indicating predictiveness associated with respective factors;

determining, based on the performance variables of the pre-processed performance data, a correlation matrix corresponding to the factors, the correlation matrix indicating a variance of the performance variables;

determining a factor threshold based on the correlation matrix;

determining a first set of the factors from the factor based on the factor threshold comprising determining that each of the eigenvalues corresponding to the first set of factors is above the factor threshold;

applying a factor rotation to the first set of factors, the application of the factor rotation increasing the variance of the first set of factors;

determining at least one variance associated with the first set of factors; and determining a first set of the factor weights based on the factor rotation and the at least one variance, wherein each of the factor weights indicate an importance of a corresponding performance variable.

14. The system of claim 10, wherein the determining the MCDA-AHP weights further comprises:

generating a pairwise comparison matrix;

normalizing the pairwise comparison matrix; and performing an operation on the normalized pairwise comparison matrix to determine the MCDA-AHP weights.

15. The system of claim 10, wherein:

the at least one attribute and the performance data are determined based on an output of a model, and the output of the model is determined based on an input to the model, the input comprising data associated with the competitors.

16. A non-transitory computer-readable medium storing instructions that, when executed by one or more processors, cause the one or more processors to perform a method comprising:

determining at least one attribute associated with the target business and a business industry;

receiving performance data related to competitors of the target business, the competitors being in the business industry, wherein the performance data includes the at least one attribute and performance variables associated with the competitors;

pre-processing the performance data, wherein the pre-processing the performance data comprising:

providing the performance data to a Natural Language Processing (NLP) model;

identifying, using the NLP model, outliers in the performance data;

removing the outliers identified using the NLP model;

identifying, using the NLP model, missing data in the performance data;

linking the performance data to reduce effects of the missing data identified using the NLP model;

identifying, using the NLP model, structural errors in the performance variables, the structural errors comprising one or more of skipped delimiter, duplicate delimiter, absence of a unique ID, typos, mislabeled data, same attributes with different name, and mixed data types;

correcting the structural errors identified using the NLP model, comprising correcting the one or more of skipped delimiter, duplicate delimiter, absence of a unique ID, typos, mislabeled data, same attributes with different name, and mixed data types;

standardizing, using the NLP model, the performance variables of the competitors by normalizing the performance variables; and receiving, from the NLP model, pre-processed performance data;

determining factor weights, the factor weights corresponding to the performance variables of the pre-processed performance data;

determining multiple-criteria decision-analysis and analytic hierarchy process (MCDA-AHP) weights, the MCDA-AHP weights corresponding to the performance variables of the pre-processed performance data;

determining adaptive weights based on the factor weights and the MCDA-AHP weights;

applying each of the adaptive weights to each of the performance variables of the pre-processed performance data related to each competitor to generate adaptively-weighted performance variables;

determining a performance score for each of the competitors, the performance score for each of the competitors being based on the adaptively-weighted performance variables, wherein the performance score for each of the competitors is a quantization representative of a performance of a respective competitor; and determining, the benchmark competitor based on the performance scores of the competitors.

17. The non-transitory computer-readable medium of claim 16, wherein the factor weights are determined concurrently with the determining of the MCDA-AHP weights.

18. The non-transitory computer-readable medium of claim 16, wherein the determining the factor weights further comprises:

generating a correlation matrix based on the performance variables of the pre-processed performance data related to the competitors, the correlation matrix comprising a correlation coefficient; and determining removal of at least one of the performance variables from consideration, the at least one of the performance variables having the correlation coefficient less a correlation threshold.

19. The non-transitory computer-readable medium of claim 16, wherein the determining the factor weights comprises:

determining at least one factor based on the performance variables of the pre-processed performance data;

determining eigenvalues corresponding to each of the factors, the eigenvalues indicating predictiveness associated with respective factors;

determining, based on the performance variables of the pre-processed performance data, a correlation matrix corresponding to the factors, the correlation matrix indicating a variance of the performance variables;

determining a factor threshold based on the correlation matrix;

determining a first set of the factors from the factor based on the factor threshold comprising determining that each of the eigenvalues corresponding to the first set of factors is above the factor threshold;

applying a factor rotation to the first set of factors, the application of the factor rotation increasing the variance of the first set of factors;

determining at least one variance associated with the first set of factors; and determining a first set of the factor weights based on the factor rotation and the at least one variance, wherein each of the factor weights indicate an importance of a corresponding performance variable.

20. The non-transitory computer-readable medium of claim 16, wherein the determining the MCDA-AHP weights further comprises:

generating a pairwise comparison matrix;

normalizing the pairwise comparison matrix; and performing an operation on the normalized pairwise comparison matrix to determine the MCDA-AHP weights.

\* \* \* \* \*